US012805545B2

(12) United States Patent
Astwood et al.

(10) Patent No.: US 12,805,545 B2
(45) Date of Patent: Nov. 24, 2026

(54) PONGAMIA PROTEIN PRODUCTS, AND METHODS FOR PRODUCING AND USING THEREOF

(71) Applicant: Terviva, Inc., Oakland, CA (US)

(72) Inventors: James D. Astwood, Alameda, CA (US); Keswara Rao Vadlamani, Marlton, NJ (US); Pamela Bernadette Meluh, Alameda, CA (US); Renske Hermine Janssen, Wageiningen (NL); Freddie Van De Velde, Ede (NL)

(73) Assignee: Terviva, Inc., Alameda, CA (US)

( * ) Notice: Subject to any disclaimer, the term of this patent is extended or adjusted under 35 U.S.C. 154(b) by 944 days.

(21) Appl. No.: 17/916,524

(22) PCT Filed: Apr. 2, 2021

(86) PCT No.: PCT/US2021/025572
§ 371 (c)(1),
(2) Date: Sep. 30, 2022

(87) PCT Pub. No.: WO2021/202994
PCT Pub. Date: Oct. 7, 2021

(65) Prior Publication Data

US 2023/0148625 A1 May 18, 2023

Related U.S. Application Data

(60) Provisional application No. 63/004,780, filed on Apr. 3, 2020, provisional application No. 63/004,792, filed
(Continued)

(51) Int. Cl.
*A23J 1/14* (2006.01)
*A21D 2/26* (2006.01)
(Continued)

(52) U.S. Cl.
CPC .............. *A23J 1/142* (2013.01); *A21D 2/266* (2013.01); *A23C 11/103* (2013.01); *A23L 2/39* (2013.01);
(Continued)

(58) Field of Classification Search
CPC .......... A23L 2/66; A23L 33/185; A23L 11/05; A23J 1/142; A23C 11/103
See application file for complete search history.

(56) References Cited

U.S. PATENT DOCUMENTS

| | | | |
|---|---|---|---|
| 1,504,588 | A | 8/1924 | Tunison |
| 2,200,391 | A | 5/1940 | Freeman |

(Continued)

FOREIGN PATENT DOCUMENTS

| | | | |
|---|---|---|---|
| CN | 1589644 | A | 3/2005 |
| CN | 1635136 | A | 7/2005 |

(Continued)

OTHER PUBLICATIONS

Derwent abstract of IN 201102763, publication date Mar. 22, 2013. pp. 1-3. (Year: 2013).*

(Continued)

*Primary Examiner* — Jenna A Watts
(74) *Attorney, Agent, or Firm* — Morrison & Foerster LLP

(57) ABSTRACT

Provided herein are protein-enriched pongamia compositions, including pongamia protein concentrates and isolates, suitable for animal consumption, in particular human consumption. Provided herein are also various food and beverage products that can be fortified with such protein-enriched pongamia compositions. Provided herein are also methods of producing the protein-enriched pongamia compositions,
(Continued)

as well as methods of producing such protein-enriched pongamia compositions from pongamia beans or various forms of pongamia meal.

5 Claims, 16 Drawing Sheets

Related U.S. Application Data on Apr. 3, 2020, provisional application No. 63/004, 785, filed on Apr. 3, 2020.

(51) Int. Cl.

| | |
|---|---|
| ***A23C 11/10*** | (2021.01) |
| ***A23L 2/39*** | (2006.01) |
| ***A23L 2/66*** | (2006.01) |
| ***A23L 11/00*** | (2021.01) |
| ***A23L 33/185*** | (2016.01) |

(52) U.S. Cl.
CPC ................. *A23L 2/66* (2013.01); *A23L 11/05* (2016.08); *A23L 33/185* (2016.08)

(56) References Cited

U.S. PATENT DOCUMENTS

| | | | |
|---|---|---|---|
| 2,548,434 | A | 4/1951 | Leaders |
| 4,101,673 | A | 7/1978 | Chang |
| RE30,386 | E | 8/1980 | Brandt et al. |
| 4,219,469 | A | 8/1980 | Kadan et al. |
| 4,221,731 | A | 9/1980 | Short et al. |
| 4,543,264 | A | 9/1985 | Stahel |
| 4,646,631 | A | 3/1987 | Ward |
| 4,785,726 | A | 11/1988 | Wear et al. |
| 5,437,885 | A | 8/1995 | Lusas et al. |
| 6,080,430 | A | 6/2000 | Ogawa et al. |
| 8,481,768 | B2 | 7/2013 | Sarangan et al. |
| 8,690,967 | B2 | 4/2014 | Anitescu et al. |
| 9,328,312 | B2 | 5/2016 | Kumar et al. |
| 9,365,799 | B2 | 6/2016 | Randhava et al. |
| 9,725,664 | B2 | 8/2017 | Anitescu et al. |
| 9,914,897 | B2 | 3/2018 | Kumar et al. |
| 10,294,442 | B2 | 5/2019 | Bastioli et al. |
| 10,577,558 | B2 | 3/2020 | Boerner et al. |
| 12,052,994 | B2 | 8/2024 | Sikka et al. |
| 12,610,971 | B2 | 4/2026 | Sikka et al. |
| 2004/0047972 | A1 | 3/2004 | Wasche et al. |
| 2004/0121058 | A1 | 6/2004 | Jayalekshmy et al. |
| 2004/0156920 | A1 | 8/2004 | Kane |
| 2005/0233052 | A1* | 10/2005 | Shen ......................... A23L 2/68 426/590 |
| 2007/0099278 | A1 | 5/2007 | Aare |
| 2007/0154579 | A1 | 7/2007 | Palu et al. |
| 2007/0166417 | A1 | 7/2007 | Palu et al. |
| 2008/0233202 | A1 | 9/2008 | Wurms et al. |
| 2011/0281017 | A1 | 11/2011 | Brooker |
| 2013/0296374 | A1 | 11/2013 | Owen et al. |
| 2014/0196359 | A1 | 7/2014 | Anitescu et al. |
| 2016/0031950 | A1 | 2/2016 | Jaramillo Freydell et al. |
| 2016/0122687 | A1 | 5/2016 | Carbone et al. |
| 2017/0280756 | A1 | 10/2017 | Jaramillo Freydell et al. |
| 2017/0283340 | A1 | 10/2017 | Patil et al. |
| 2018/0042266 | A1 | 2/2018 | Hetherington et al. |
| 2018/0207070 | A1 | 7/2018 | Bernoud et al. |
| 2019/0144778 | A1 | 5/2019 | Heymann et al. |
| 2019/0269594 | A1 | 9/2019 | Gadgil et al. |
| 2022/0000146 | A1 | 1/2022 | Sikka et al. |
| 2022/0125059 | A1 | 4/2022 | Sikka |
| 2022/0369662 | A1 | 11/2022 | Sikka et al. |
| 2023/0148638 | A1 | 5/2023 | Astwood et al. |
| 2023/0217944 | A1 | 7/2023 | Dragull et al. |

FOREIGN PATENT DOCUMENTS

| | | | |
|---|---|---|---|
| CN | 1762406 | A | 4/2006 |
| CN | 101011454 | A | 8/2007 |
| CN | 102241686 | A | 11/2011 |
| CN | 102372720 | A | 3/2012 |
| CN | 103194497 | A | 7/2013 |
| CN | 104892620 | A | 9/2015 |
| CN | 108024950 | A | 5/2018 |
| EA | 201991248 | A1 | 11/2019 |
| EP | 4125370 | A1 | 2/2023 |
| IN | 1826/DEL/2006 | A1 | 4/2008 |
| IN | 1074/KOL/2008 | A | 8/2008 |
| IN | 2010/DEL/2009 | A | 4/2011 |
| IN | 0420/MUM/2012 | A | 11/2013 |
| IN | 1084/CHE/2009 | A | 1/2014 |
| IN | 3616/DEL/2012 | A | 8/2014 |
| IN | 0287/DEL/2014 | A | 7/2016 |
| IN | 2381/DEL/2015 | A | 2/2017 |
| IN | 201721016763 | A | 11/2018 |
| JP | S46-006915 | A | 12/1971 |
| JP | S60-083541 | A | 5/1985 |
| JP | 2002256281 | A | 9/2002 |
| JP | 2016013076 | A | 1/2016 |
| JP | 2018521079 | A | 8/2018 |
| JP | 2023521035 | A | 5/2023 |
| JP | 7470699 | B2 | 4/2024 |
| JP | 7828885 | B2 | 3/2026 |
| RU | 2529898 | C2 | 10/2014 |
| RU | 2700094 | C1 | 9/2019 |
| WO | WO-2001076715 | A2 | 10/2001 |
| WO | WO-2002054884 | A1 | 7/2002 |
| WO | WO-2004057976 | A1 | 7/2004 |
| WO | WO-2008120223 | A2 | 10/2008 |
| WO | WO-2011027362 | A2 | 3/2011 |
| WO | WO-2013096993 | A1 | 7/2013 |
| WO | WO-2016042001 | A1 | 3/2016 |
| WO | WO-2017013264 | A1 | 1/2017 |
| WO | WO-2017041776 | A1 | 3/2017 |
| WO | WO-2017057600 | A1 | 4/2017 |
| WO | WO-2019195947 | A1 | 10/2019 |
| WO | WO-2020072827 | A1 | 4/2020 |
| WO | WO-2021067698 | A1 | 4/2021 |
| WO | WO-2021202994 | A1 | 10/2021 |
| WO | WO-2021202996 | A1 | 10/2021 |
| WO | WO-2021202998 | A1 | 10/2021 |

OTHER PUBLICATIONS

Feedipedia, "Karanja (*Milletia pinnata*)". Available online as of Jun. 25, 2018 from www.feedipedia.org. pp. 1-2. (Year: 2018).*

Feedipedia, Karanja (*Millettia pinnata*), available online as of Jun. 25, 2018 from www.feedipedia.com. pp. 1-2. (Year: 2018).*

Akram et al., (2021). "Pongamia pinnata: an updated review on its phytochemistry and pharmacological uses," Pharm. Pharmacol. Int. J., 9(5):194-199.

Altemimi et al., (2017). "Phytochemicals: Extraction, Isolation, and Identification of Bioactive Compounds from Plant Extracts," Plants, 6(42), 23 pages.

Aneela et al., (2011). "Acute oral toxicity studies of Pongamia pinnata and Annona Squamosa on albino Wistar rats," Int. J. Res. Pharm. Chem., 1(4):820-824.

Ansari et al., (2019). "Statistical approach towards optimization of extraction process of karanjin from Pongamia pinnata seeds," Pharmacognosy Magazine, 419-425. Abstract Only.

Araujo et al., (2010). "High-fat diet increases thyrotropin and oxygen consumption without altering circulating 3,5,3'-triiodothyronine (T3) and thyroxine in rats: the role of iodothyronine deiodinases, reverse T3 production, and whole-body fat oxidation," Endocrinol, 151:3460-3469.

Avula et al., (2009). "Quantitative Determination of Flavonoids by Column High-Performance Liquid Chromatography with Mass Spectrometry and Ultraviolet Absorption Detection in Artemisia afra and Comparative Studies with Various Species of *Artemisia* Plants," Journal of AOAC International, 92(2):633-644.

(56) References Cited

OTHER PUBLICATIONS

Baki et al., (2007). "Sub-Acute toxicological studies of pongamol isolated from Pongamia pinnata," Res. J. Med. Med. Sci., 2(2):53-57.

Bartlett, (1937). "Properties of sufficiency and statistical tests," Proceedings of the Royal Society of London, 160(901):268-282.

Bureau of Indian Standards (2014). "Groundnut Oil—Specification (Third Revision)," Indian Standard, IS 544, 11 pages.

Carrín et al., (2010). "Peanut oil: Compositional data," European Journal of Lipid Science and Technology, 112(7):697-707.

Chaudhari et al., (2014). "Effect of certain natural products and organic solvents on quorum sensing in Chromobacterium violaceum," Asian Pac J Trop Med., 7(S1):S204-211.

Da Silva, (2021). "Feeding the world sustainably," available online at <https://www.un.org/en/chronicle/article/feeding-world-sustainably>, 2 pages.

Database Biosis, (1990). Database accession No. PREV199090106184; Natanam et al., "The Feeding Value Of Karanja India Pongamia-Glabra Vent Oil For White Leghorn Pullets," Indian Veterinary Journal, 67(4):335-338, 2 pages.

Database Biosis, (1997). "Database accession No. PREV199800011011; Dhara et al., "Deoiled Karanja (*Pongamia glabra Vent.*) cake in the ration of Japanese quail,"" Indian Journal Of Poultry Science, 32(2):132-136, 1 page.

De et al., (1998). "Nutritional quality of detoxified karanja (*Pongamia glabra*) oil," Fett/Lipid, 100:48-51.

De et al., (2009). "Optimization of solvent requirement for refining of karanja (*Pongamia glabra*) oil by liquid-liquid extraction," Journal of Scientific & Industrial Research, 68:319-324. Abstract Only, 2 pages.

Di Dalmazi et al., (2021). "Plant constituents and thyroid: a revision of the main phytochemicals that interfere with thyroid function," Food Chem. Toxicol., 152:112158, 13 pages.

Dineshkumar et al., (2013). "Effect of detoxified karanja (*Pongamia* spp.) cake on testicular architecture and semen production in ram lambs," Animal, 7(10): 1697-1703.

Directive 2009/32/EC Of The European Parliament And Of The Council (Apr. 23, 2009) on the approximation of the laws of the Member States on extraction solvents used in the production of foodstuffs and food ingredients, 12 pages.

Dunford, (2016). "Edible Oil Quality," Available online at <https://extension.okstate.edu/fact-sheets/edible-oil-quality.html>, 4 pages.

Dunford, (2016). "Oil and Oilseed Processing II," Available online at <https://extension.okstate.edu/fact-sheets/oil-and-oilseed-processing-ii.html>, 4 pages.

Dunn, (1964). "Multiple contrasts using rank sums," Technometrics, 6:241-252.

Dunnett, (1964). "New tables for multiple comparisons with a control," Biometrics, 20(3):482-491.

Dunnett, (1980). "Pairwise multiple comparisons in the unequal variance case," J. Am. Stat. Assoc., 75:796-800. Abstract Only.

Dutta et al., (2012). "Use of *Pongamia glabra* (karanj) and *Azadirachta indica* (neem) seed cakes for feeding livestock," Biofuel Coproducts as Livestock Feed—Opportunities and Challenges, pp. 379-402.

Dutton et al., (1954). "Countercurrent fractionation of lipids," Progress In The Chemistry Of Fats And Other Lipids, 2:292-325.

El-Sayed et al., (2020). "Effect of high-fat diet-induced obesity on thyroid gland structure in female rats and the possible ameliorating effect of metformin therapy," Folia Morphol., 79(3):476-488.

EPA, (2002). "Health effects test guidelines OPPTS 870.1100, Acute Oral Toxicity," rev. EPA 712-C-02-190, Dec. 2002, 37 pages.

Extended European Search Report and Opinion received for European Patent Application No. 19869239.4 mailed on May 10, 2022, 12 pages.

Extended European Search Report and Opinion received for European Patent Application No. 20870766.1 mailed on Oct. 10, 2023, 15 pages.

Extended European Search Report and Opinion received for European Patent Application No. 21779137.5 mailed on Nov. 28, 2023, 16 pages.

Extended European Search Report and Written Opinion received for European Patent Application No. 21779138.3 mailed on Dec. 7, 2023, 15 pages.

Extended European Search Report and Written Opinion received for European Patent Application No. 21781819.4 mailed on Dec. 22, 2023, 14 pages.

Food and Agriculture Organization of the United Nations (FAO) et al., (2020). "The State of Food Security and Nutrition in the World 2020. Transforming Food Systems for Affordable Healthy Diets," available online at <https://www.unicef.org/reports/state-of-food-security-and-nutrition-2020>, 320 pages.

Fresh Fry (2025). "The Perfect Frying Oil Temp for Common Cooking Oils," available online at <https://freshfry.me/blogs/news/the-perfect-frying-oil-temp-for-common-cooking-oils>, accessed Apr. 11, 2025, 7 pages.

Fu et al., (2021). "Fuel properties of Pongamia (*Milletia pinnata*) seeds and pods grown in Hawaii," ACS Omega, 6:9222-9233, 12 pages.

Gaitan, (1990). "Goitrogens in food and wat er," Annu. Rev. Nutr., 10:21-39. Abstract Only.

Gandhi et al., (2000). "Red cell haemolysis test as an in vitro approach for the assessment of toxicity of karanja oil," Toxicology in Vitro, 14:513-516.

Gautam et al., (2014). "Physical characterization and comparison of biodiesel produced from edible and non-edible oils of *Madhuca indica* (mahua), *Pongamia pinnata* (karanja), and *Sesamum indicum* (til) plant oilseeds," Biomass Conv Bioref, 4:193-200.

Ghosh et al., (2018). "Role of nitric oxide scavenging activity of Karanjin and Pongapin in the treatment of Psoriasis," 3 Biotech, 8(8):338, 4 pages.

Gopan et al., (2019). "Karanj protein isolate prepared from karanj seed cake: Effect on growth, body composition and physiometabolic responses in Labeo rohita fingerlings," Aquaculture Nutrition, 26:737-751.

Gore et al., (2008). "Determination of Pongamol and Karanjin in Karanja Oil By Reverse Phase HPLC," Analytical Letters, 33(2):337-346.

Gupta et al., (1981). "Biological evaluation of karanj (Pongamia glabra) cake," Indian J. Anim. Health, 20:75-77.

Habib et al., (2016). "Performance of broiler fed on diet containing deoiled Koroch (*Pongamia Pinnata*) seed cake treated with NaOH and HCI," Res. Agric. Livest. Fish, 3(2):323-329.

Han et al., (2012). "Excess iodine and high fat diet combination modulates lipid profile, thyroid hormone, and hepatic LDLr expression values in mice," Biol. Trace Elem. Res., 147:233-239. Abstract Only.

Harbone, (1973). "Phytochemical Methods: A Guide to Modern Techniques of Plant Analysis," 3rd edition, 317 pages.

Housman et al., (2020). "Expeller-pressed and solvent-extracted Pongamia seedcake as a protein supplement for cattle consuming a basal diet of forage," Animal Feed Science and Technology, 266:114521, 12 pages.

Husna et al., (2017). "Performance of broiler fed on diet containing Koroch (*Pongamia pinnata*) seed cake," Bangladesh J. Anim. Sci., 46(2):88-94.

International Search Report and Written Opinion for International Patent Application No. PCT/US2019/54579, mailed on Dec. 10, 2019, 13 pages.

International Search Report and Written Opinion for International Patent Application No. PCT/US2020/016385, mailed on Apr. 16, 2020, 12 pages.

International Search Report and Written Opinion for International Patent Application No. PCT/US2020/053945, mailed on Dec. 30, 2020, 7 pages.

International Search Report and Written Opinion for International Patent Application No. PCT/US2021/025576, mailed on Aug. 6, 2021, 14 pages.

International Search Report and Written Opinion for International Patent Application No. PCT/US2021/025578, mailed on Aug. 6, 2021, 12 pages.

International Search Report and Written Opinion for International Patent Application No. PCT/US2021/25572, mailed on Aug. 4, 2021, 11 pages.

(56) References Cited

OTHER PUBLICATIONS

Interstate Standard GOST 1129-2013. (2019). "Sunflower Oil, Specifications," M.: Standartinform, 40 pages.
Interstate Standard GOST ISO 9832-2015. (2019). "Animal And Vegetable Fats And Oils, Determination of residual technical hexane content (ISO 9832:2002, UT)," M.: Standartinform, 32 pages.
Kadirvel et al., (1989). "The Effect of Kernels of Karanja (*Pongamia glabra Vent*) on Growth and Feed Efficiency in Broiler Chicks to 4 Weeks of Age," Animal Feed Science and Technology, 25:201-206.
Kaul et al., (2011). "Effect of low frequency ultrasonic assisted extraction on the quality of seed oils of Indian origin," Fuel Processing Technology, 92:1813-1820.
Kesari et al., (2011). "Coordinated changes in storage proteins during development and germination of elite seeds of *Pongamia pinnata*, a versatile biodiesel legume," AoB Plants, plr026, 16 pages.
Khan et al., (2015). "Optimization of Process Conditions for Isolation of Leaf Protein Concentrate from Pongamia pinnata and its Proximate Nutritional Composition," IOSR Journal of Applied Chemistry, 8:24-33.
Klonoff (2007). "Replacements for trans fats—will there be an oil shortage?" J Diabetes Sci Technol, 1(3):415-422.
Kruskal et al., (1952). "Use of ranks in one-criterion variance analysis," J. Am. Stat. Assoc., 47:583-621.
Kumar et al., (2017). "Green solvents and technologies for oil extraction from oilseeds," Chemistry Central Journal, 11:9, 7 pages.
Kumar et al., (2018). "Microwave assisted extraction of oil from pongamia pinnata seeds," Materials Today: Proceedings, 5:2960-2964.
LibreTexts Medicine (2025). "How Lipids Work," available online at <https://med.libretexts.org/Courses/Sacramento_City_College/SCC%3A_Nutri_300_(Coppola)/Text/05%3A_Lipids/5.3%3A_How_Lipids_Work>, accessed Apr. 12, 2025, 5 pages.
Liu et al., (2017). "The History, Current Status and Prospects of Plant Extracts as Commercial Botanical Insecticides and "Farming Products" for Insect Control," World Pesticides, 39(1):9-13. English translation.
Mahli et al., (1989). "Pharmacological effects of karanjin and pongamol (from seed oil of Pongamia pinnata)," Indian J. Anim. Sci., 59(6):657-660.
Mandal et al., (1974). "Studies on the utilization of karanja (*Pongamia glabra*) oil cake in poultry rations," Indian J. Poult. Sci., 9:141-147.
Mandal et al., (1984). "Chemical and Nutritional Evaluation of Pongamia glabra Oil and Acacia auriculaeformis Oil," JAOCS, 61(9):1447-1449.
Mandal et al., (1985). "Effect of Refined Hydrogenated Karanja Oil on Lipid Metabolism in Adult Male Albino Rats," Acta Alimentaria, 14(1):3-13.
Mandal et al., (1985). "Protease Inhibitors and in vitro Protein Digestibility of Defatted Seed Cakes of Akashmoni and Karanja," JAOCS, 62(7):1124-1126.
Mann et al., (1947). "On a test whether one of two random variables is stochastically larger than the other," Ann. Math. Stat., 18:50-60.
Marone et al., (2022). "Safety and toxicologic evaluation of Edible Pongamia Oil: A novel food ingredient," Food and Chemical Toxicology, 166:113213, 11 pages.
Misra et al., (2007). "Integrated management approach against sigatoka leaf spot of banana," Journal of Mycology and Plant Pathology, 45(1):104-106. Abstract only.
Moudgal et al., (1958). "Studies on goitrogenic agents in food. III. Goitrogenic action of some glycosides isolated from edible nuts," J. Nutri., 66:291-303.
Murakami (2015). "Counter-Current Distribution Extraction: From Solvent Extraction to Chromatography (Chemistry of Separation and Analysis)," Chemistry and Education, 63(1):32-37, English abstract.
Natanam et al., (1989). "Chemical Composition of Karanja (*Pongamia glabra Vent*) Kernel and Cake as Animal Feed," Indian J. Anim. Nutr., 6(3):270-273.
Natanam et al., (1989). "The Effect of Karanja (*Pongamia glabra Vent*) cake on the performance of White Leghorn pullets," Animal Feed Science And Technology, 27:89-93.
Natanam et al., (1989). "The toxic effects of Karanja (*Pongamia glabra vent*) oil and cake on growth and feed efficiency in broiler chicks," Anim. Feed Sci. Technol., 27(1-2):95-100. Abstract Only.
National Research Council, (1995). "Chapter 2: Nutrient Requirements of the Laboratory Rat," Nutrient Requirements of Laboratory Animals: Fourth Revised Edition, pp. 11-79.
Natural Sourcing, (2018). "Karanja Oil," Available online at <https://www.praannaturals.com/downloads/specsheets/SPEC_Organic_Karanja_OILORGOILKARANJACPIN1056.pdf>, 1 page.
Nirmal et al., (2007). "Anthelmintic activity of Pongamia glabra," Songklanakarin Journal of Science and Technology, 29(3):755-757.
OECD, (1997). OECD Guidelines for Testing of Chemicals, Test No. 471: Bacterial Reverse Mutation Test, available online at <https://www.oecd-ilibrary.org/environment/test-no-471-bacterial-reverse-mutation-test_9789264071247-en>, 11 pages.
OECD, (1998). "OECD Series on Principles of Good Laboratory Practice and Compliance Monitoring—No. 1," ENV/MC/CHEM(98)17, 41 Pages.
OECD, (2000). "Guidance Document on the Recognition, Assessment and Use of Clinical Signs as Humane Endpoints for Experimental Animals Used in Safety Evaluation," ENV/JM/MONO(2000)7, 39 pages.
OECD, (2002)." OECD Series on Principles of Good Laboratory Practice and Compliance Monitoring, No. 13," ENV/JM/MONO(2002)9, 17 pages.
OECD, (2008). "OECD Guidelines for the Testing of Chemicals, Test No. 407: Repeated Dose 28-day Oral Toxicity Study in Rodents", available online at <https://www.oecd-ilibrary.org/environment/test-no-407-repeated-dose-28-day-oral-toxicity-study-in-rodents_9789264070684-en>, 13 pages.
OECD, (2016). "OECD Guidelines for Testing of Chemicals, Test No. 475: Mammalian Bone Marrow Chromosome Aberration Test," available online at <https://www.oecd.org/env/ehs/testing/test-no-475-mammalian-bone-marrow-chromosomal-aberration-test-9789264264786-en.htm>, 18 pages.
OECD, (2018). "OECD Guidelines for the Testing of Chemicals, Test No. 408: Repeated Dose 90-day Oral Toxicity Study in Rodents," available online at <https://www.oecd-ilibrary.org/environment/test-no-408-repeated-dose-90-day-oral-toxicity-study-in-rodents_9789264070707-en>, 16 pages.
Official Journal of the European Union, (2010). "Directive 2010/63/EU of the European Parliament of the Council of Sep. 22, 2010 on the Protection of Animals Used for Scientific Purposes," L276:33-79.
Official Journal of the European Union, (2017). "Commission Regulation (EU) No. 2017/735, Annex B, 'Mammalian Bone Marrow Chromosomal Aberration Test,'" L 112:39-51.
Osman et al., (2009). "Pongamia seed cake as a valuable source of plant nutrients for sustainable agriculture," Ind. J. Fert., 5(2):25-32.
Panda et al., (2006). "Quantification of Karanjin, Tannin and Trypsin Inhibitors in Raw and Detoxified Expeller and Solvent Extracted Karanj (*Pongamia glabra*) Cake," Asian-Aust. J. Anim. Sci., 19(12):1776-1783.
Panpraneecharoen et al., (2014). "Variability of Oil Content, Fatty Acid Composition and Karanjin Content in Pongamia pinnata and Its Relationship with Biodiesel Quality," Annual Research & Review in Biology, 4(14):2283-2294.
Paswan, (2012). "Thesis: Studies on Detoxification and Nutritive Potential of Karanj (*Pongamia glabra*) Cake," Deemed University Indian Veterinary Research Institute, 203 pages.
Patel et al., (2015). "Simple, Efficient and Economic Method For Isolation and Analysis of Karanjin and Pongamol from Karanja Seed Oil and Screening of Antimicrobial Potential," International Journal of Pharmacy and Pharmaceutical Sciences, 7(7):248-252.
Pavithra et al., (2010). "Seed Protein Profiling of *Pongamia Pinnata* (L.) Pierre for Investigating Inter and Intra-specific Population Genetic Diversity," International Journal of Science and Nature, 1(2):246-252.

(56) References Cited

OTHER PUBLICATIONS

Pavithra et al., (2012). "Oil, Fatty Acid Profile and Karanjin Content in Developing *Pongamia pinnata* (L.) Pierre Seeds," J Am Oil Chem Soc., 89:2237-2244.
Prabhu et al., (2002). "Quantification of Karanjin Using High Performance Liquid Chromatography in Raw and Detoxified Karanj (*Pongamia glabra vent*) Seed Cake," Asian-Aust. J. Anim. Sci., 15(3):416-420.
Prabhu et al., (2013). "Rumen fermentation, immunity and urine characteristics of lambs fed detoxified karanj (*Pongamia glabra vent*) seed cake as protein supplement, " Indian Journal of Animal Nutrition, 30(3):325-329. Abstract only.
Raj et al., (2016). "Effect of incorporation of detoxified karanja (*Pongamia pinnata*) and neem (*Azadirachta indica*) seed cakes in total mixed rations on milk yield, composition and efficiency in crossbred dairy cows," Indian J. Anim. Sci., 86(4):489-492.
Rasheed et al., (2017). "Method validation and simultaneous determination of two bio-active marker compounds in pongamia pinnata: seed and karanj oil by UPLC-MS," World Journal of Pharmaceutical Research, 6(17):846-857.
Ravi et al., (2000). "Performance of lambs fed expeller pressed and solvent extracted karanj (*Pongamia pinnata*) oil cake," Animal Feed Science and Technology, 88:121-128.
Sangwan et al., (2010). "A Review on *Pongamia Pinnata* (L.) Pierre: A Great Versatile Leguminous Plant," Nature and Science, 8(11):130-139.
Sasmal et al., (1997). "Preliminary study on the effect of purified Pongamia oil on liver and kidney functions in rats," Fitoterapia, 68(1):35-38.
Search Report and Written Opinion received for Singaporean Patent Application No. 11202253630F issued on Jun. 19, 2024, 10 pages.
Search Report and Written Opinion received for Singaporean Patent Application No. 11202253725J issued on Jun. 17, 2024, 11 pages.
Search Report received for Chinese Patent Application No. 2020800114843 issued on Apr. 26, 2022, 4 pages. English translation.
Search Report received for Eurasian Patent Application No. 202491700 issued on Nov. 27, 2024, 6 pages.
Search Report received for Taiwan Patent Application No. 110112422 issued on Mar. 3, 2025, 1 page.
Shao et al., (2014). "Dietary high-fat lard intake induces thyroid dysfunction and abnormal morphology in rats," Acta Pharmacol. Sin., 35:1411-1420.
Shapiro et al., (1965). "An analysis of variance test for normality (complete samples)," Biometrika, 52(3-4):591-611.
Shejawal et al., (2014). "Bioavailability of karanjin from *Pongamia pinnata* L. in Sprague Dawley rats using validated RP-HPLC method," J. Appl. Pharmaceut. Sci., 4(3):10-14.
Shenoy et al., (2010). "Study of sunscreen activity of aqueous, methanol, and acetone extracts of leaves of *Pongamia pinnata* (L.) Pierre, Fabaceae," International Journal of Green Pharmacy, 4(4):270-274.
Singh et al., (2017). "Modification of *Pongamia pinnata* (Linn.) Seed Chemicals and Their Fungicidal Activities," Nature Environment and Pollution Technology, 16(2):523-527.
Singh et al., (2021). "Karanjin," Phytochem., 183:112641. Abstract Only.
Speakman, (2019). "Use of high-fat diets to study rodent obesity as a model of human obesity," Int. J. Obes., 43:1491-1492.
Sreedevi et al., (2009). "Participatory research and development to evaluate Pongamia seed cake as a source of plant nutrient in integrated watershed management," J. Sat Agric. Res., 7:1-13.
Srivastava et al., (1990). "Utilisation of deoiled karanj (*Pongamia glabra*) cake in kid grower rations," Indian J. Anim. Nutr., 7:15-20.
Sulzer Ltd. (2025). "Kühni Agitated cols. from Sulzer," Available online at <https://www.news-medical.net/kuhni-agitated-columns-from-sulzer>, 3 pages.
Suryawanshi et al., (2018). "Formulation And Evaluation Of *Pongamia pinnata* (Karanj) Seed Oil In Water Nanoemulsion," International Journal of Pharmacy And Biological Sciences, 8(4):488-494.
Susarla et al., (2012). "A method for isolation of karanjin from the expelled cake of Pongamia glabra," European Journal of Lipid Science and Technology, 114:1097-1101.
Szalay, (2015). "What are Flavonoids?" Available online at <https://www.livescience.com/52524-flavonoids.html>, 5 pages.
Thakur et al., (2021). "Karanj (*Pongamia pinnata*)—an ayurvedic and modern overview," Asian J. Pharmaceut. Clin. Res., 14(6):14-21.
The Engineering ToolBox (2025). "Food Products—Viscosities," available online at <https://www.engineeringtoolbox.com/absolute-viscosity-foods-d_1827.html> accessed Apr. 11, 2025, 6 pages.
Tiwari et al., (2024). "Phytopharmacological insights into Pongamia pinnata and Rubia cordifolia: Antibacterial and antioxidant activities with mechanistic perspectives," International Journal of Green Pharmacy, 18(4):208-215.
U.S. Food and Drug Administration (FDA), (2000). Redbook 2000, IV.C.1.a. "Bacterial Reverse Mutation Test, Toxicological Principles for the Safety Assessment of Food Ingredients," available online at <https://www.fda.gov/regulatory-information/search-fda-guidance-documents/redbook-2000-ivc1a-bacterial-reverse-mutation-test>, 15 pages.
U.S. Food and Drug Administration (FDA), (2003). "Redbook 2000: IV.C.4.a. Subchronic Toxicity Studies with Rodents, Toxicological Principles for the Safety Assessment of Food Ingredients," available online at <https://www.fda.gov/regulatory-information/search-fda-guidance-documents/redbook-2000-ivc4a-subchronic-toxicity-studies-rodents>, 17 pages.
U.S. Food and Drug Administration (FDA), (2017). "Redbook 2000: IV.C.3.a. Short-Term Toxicity Studies with Rodents, Toxicological Principles for the Safety Assessment of Food Ingredients," available online at <https://www.fda.gov/regulatory-information/search-fda-guidance-documents/redbook-2000-ivc3a-short-term-toxicity-studies-rodents>, 17 pages.
U.S. Food and Drug Administration (FDA), (2024). "21 CFR Part 58, Good Laboratory Practice for Nonclinical Laboratory Studies," available online at <https://www.ecfr.gov/current/title-21/chapter-I/subchapter-A/part-58>, 19 pages.
United States Department of Agriculture (USDA), (2020). "DGA, Dietary Guidelines for Americans. 2020-2025," available online at <https://www.dietaryguidelines.gov/sites/default/files/2020-12/Dietary_Guidelines_for_Americans_2020-2025.pdf>, 164 pages.
Usharani et al., (2019). "*Pongamia pinnata* (L.): Composition and advantages in agriculture: A review," Journal of Pharmacognosy and Phytochemistry, 8:2181-2187.
Vinay et al., (2008). "Effect of detoxification on the functional and nutritional quality of proteins of karanja seed meal," Food Chemistry, 106:77-84.
Vismaya et al., (2010). "Extraction and recovery of karanjin: A value addition to karanja (*Pongamia pinnata*) seed oil," Industrial Crops and Products, 32:118-122.
Vismaya et al., (2011). "Gastroprotective Properties of Karanjin from Karanja (*Pongamia pinnata*) Seeds; Role as Antioxidant and H+, K+-ATPase Inhibitor," Evidence-Based Complementary and Alternative Medicine, 2011:747246, 10 pages.
Wang et al., (2015). "Chapter 11: Microwave Extraction," Bioactive Component Separation Technology, p. 145. English translation.
Watson, (2021). "New Kid on the Plant-Based Block? TerViva to Commercialize Oils (2022) and Proteins (2023) from Pongamia Trees," available online at <https://www.foodnavigator-usa.com/Article/2021/04/29/New-kid-on-the-plant-based-block-TerViva-to-commercialize-oils-2022-and-proteins-2023-from-Pongamia-trees>, 6 pages.
Wilcoxon, (1945). "Individual comparisons by ranking methods," Biometrics Bull., 1:80-83.
Xu et al., (2012). "Ionic Liquid-Based Microwave-assisted Extraction of Flavonoids from *Bauhinia championii* (Benth.) *Benth*.," Molecules, 17:14323-14335.
Yin et al., (2004). "Study on Flavonoids from Stem Bark of Pongamia pinnata," Zhong Yao Cai (Journal of Chinese Medicinal Materials), 27(7):493-495. English abstract.
Zhang et al., (2005). "Quantitative and qualitative analysis of flavonoids in leaves of Adinandra nitida by high performance liquid

(56) References Cited

OTHER PUBLICATIONS chromatography with UV and electrospray ionization tandem mass spectrometry detection," Analytica Chimica Acta, 532:97-104.

Zhang et al., (2018). "A high-fat diet rich in saturated and mono-unsaturated fatty acids induces disturbance of thyroid lipid profile and hypothyroxinemia in male rats," Mol. Nutr. Food Res., 62(6):1700599, 9 pages.

Traditional Knowledge Digital Library (2009). "Abstract ID: VJ/86B 'Karanjja Bija Guna Karma'," accessed Dec. 18, 2025, 1 page.

De et al., (1999). "Modification of karanja oil (*Pongamia glabra*) by fractionation, blending, and transesterification," Lipid/Fett, 101(9):332-335.

Shahidi et al., (2016). "Tocopherols and Tocotrienols in Common and Emerging Dietary Sources: Occurrence, Applications, and Health Benefits," Int. J. Mol. Sci., 17(10):1745, 29 pages.

Babu (2014). "Thesis: Evaluation of Detoxified Karanj (*Pongamia glabra*) Cake in Commercial Layer Chicken Diet," Sri Venkateswara Veterinary University, Hyderabad, India, available online at <https://krishikosh.egranth.ac.in/server/api/core/bitstreams/5932469d-0348-4b07-b946-922414df87ec/content>, 108 pages.

Bobade et al., (2012). "Detail study on the Properties of *Pongamia pinnata* (Karanja) for the Production of Biofuel," Research Journal of Chemical Sciences, 2(7):16-20.

Ministry of Agriculture, Forestry and Fisheries. "Status of Trans Fats in Various Countries and Regions: Switzerland," available online at <https://www.maff.go.jp/j/syouan/seisaku/trans_fat/overseas/switzerland.html>, accessed Jun. 9, 2026. 1 page of English translation.

* cited by examiner

PONGAMIA PROTEIN PRODUCTS, AND METHODS FOR PRODUCING AND USING THEREOF

CROSS-REFERENCE TO RELATED APPLICATIONS

This application is a national stage application under 35 U.S.C. § 371 of International Application No. PCT/US2021/025572, filed internationally on Apr. 2, 2021, which claims priority to and the benefit of U.S. Provisional Application 63/004,780, filed Apr. 3, 2020; U.S. Provisional Application 63/004,785, filed Apr. 3, 2020; and U.S. Provisional Application 63/004,792, filed Apr. 3, 2020, the disclosures of which are incorporated herein by reference in their entireties.

FIELD

The present disclosure relates generally to pongamia protein products. More specifically, the present disclosure relates to pongamia compositions with high protein content, such as pongamia protein concentrates or isolates, as well as methods for producing thereof, and methods for using thereof in food and beverage products.

BACKGROUND

As global population is expected to grow to over 9 billion by 2050, the demand for edible protein continues to rise. Production of animal protein requires significant resources including land and water and has significant impact on the environment. Plants offer an alternate and viable source of protein as they provide more yield per acre with positive impact on the environment. Consumer interest in sustainability and plant-based diets is expanding around the globe. In the United States, the plant-based foods market was estimated to be around $4.5 billion in 2019. In the United States, approximately 55 million people are considered vegetarian or flexitarian and looking for more plant-based protein-enriched food options.

Pongamia, *Millettia pinnata* (L.), is a multipurpose tree that grows in the tropics, producing oil- and protein-rich beans. Pongamia has several advantageous features: it is easy to grow, has a short generation time, and produces large quantities of oil- and protein-rich beans. Pongamia beans, also referred to as pongamia oilseeds, contain approximately 35-40% oil and 20% protein. Pongamia bean cake, a byproduct of oil extraction from pongamia beans, offers a potential renewable source of plant protein for use in animal feed and foodstuffs for human consumption. However, pongamia beans and bean cake are extremely hitter in taste and considered inedible, due to many intrinsic active chemical components such as karanjin and pongamol. These intrinsic active compounds must be removed or significantly reduced, in order to produce edible pongamia protein products.

Currently, there are no commercially viable processing methods available to extract and produce edible clean tasting concentrated pongamia protein products from pongamia beans. Hence, there is a need for commercially viable methods to extract and remove intrinsic active chemical components, such as karanjin and pongamol, from pongamia beans and produce value added edible protein compositions.

BRIEF SUMMARY in some aspects, provided herein are pongamia compositions with high protein content, such as pongamia protein concentrates or isolates, that can serve as an edible protein source for animals, in particular humans. In some variations, the pongamia protein products described herein have functional properties, including for example solubility, viscosity, and emulsifying properties, that are comparable or improved as compared to other commercial plant protein ingredients, such as soy, pea, lupin, and sunflower. These pongamia protein products can serve as useful ingredients in a variety of food and beverage products, and address the substantial unmet need in the industry for emerging plant proteins that are superior in protein quality with great taste and great texture.

In some aspects, provided is a protein-enriched pongamia composition, comprising at least 50% of pongamia proteins on a dry weight basis. In some aspects, provided is a protein-enriched pongamia composition, comprising at least 70% of pongamia proteins on a dry weight basis. In some embodiments, the composition is a pongamia protein concentrate. In other embodiments, the composition is a pongamia protein isolate.

In certain aspects, provided is method of producing a protein-enriched pongamia composition, comprising: preparing an aqueous slurry of pongamia meal; adjusting the pH of the aqueous slurry to a pH between 8 and 10; separating the slurry into a protein liquid fraction and an insoluble wet cake fraction; neutralizing, concentrating and/or pasteurizing the protein liquid fraction; and drying the protein liquid fraction to provide a protein-enriched pongamia composition.

In certain aspects, provided is a method of producing a protein-enriched pongamia composition, comprising: preparing an aqueous slurry of pongamia meal; adjusting the pH of the aqueous slurry to a pH between 8 and 10, separating the slurry into a protein liquid fraction and insoluble wet cake fraction; precipitating a portion of pongamia proteins from the liquid fraction by adjusting pH to between 3.5 to 4.5 to obtain purified pongamia proteins; washing, neutralizing and/or pasteurizing the purified pongamia proteins; and drying the purified pongamia proteins to provide a protein-enriched pongamia composition.

In certain aspects, provided is a method of producing a protein-enriched pongamia composition, comprising: preparing an aqueous slurry of pongamia meal; adjusting the pH of the aqueous slurry to a pH between 6 and 10, separating the slurry into a protein liquid fraction and an insoluble wet cake fraction; passing the protein liquid fraction through a membrane system to obtain a retentate comprising pongamia protein; washing, neutralizing and/or pasteurizing the retentate; and drying the retentate to provide a protein-enriched pongamia composition.

In one aspect, provided is a protein-enriched pongamia composition produced according to the methods described herein.

In certain aspects, provided are also various products incorporating any of the protein-enriched pongamia compositions described herein. In some embodiments, the product is food product, a beverage product, or a dietary supplement product. In some variations, the product is a baked good, a protein supplement, a protein bar, or a non-dairy beverage. In yet other variations, the product is a medical food, an infant formula, a cosmetic or a pharmaceutical product.

In one aspect, provided is a protein-enriched pongamia ingredient, comprising at least 40% of pongamia proteins on a dry weight basis, wherein the ingredient has: (i) less than 500 ppm of karanjin; or (ii) less than 500 ppm of pongamol; or (iii) less than 500 ppm of karanjin and pongamol combined: and wherein the ingredient has less than or equal to 40% of carbohydrates on a dry weight basis. In some embodiments of the present aspect, the protein-enriched pongamia ingredient comprises at least 70% of pongamia proteins on a dry weight basis, wherein the ingredient has: (i) less than 500 ppm of karanjin; or (ii) less than 500 ppm of pongamol; or (iii) less than 500 ppm of karanjin and pongamol combined; and wherein the ingredient has less than or equal to 15% of carbohydrates on a dry weight basis.

In some embodiments, the ingredient has (i) a viscosity of between about 2 mPa*s and about 100 mPa*s at a shear rate of 100 $s^{-1}$; (ii) a foaming capacity of between about 100% and about 200% of volume of 0.1% protein solution; (iii) a bulk density of at least about 0.2 g/$cm^3$; (iv) a protein solubility of at least about 35% at pH 7; (v) a median emulsion droplet size of less than or equal to about 5 μm; (vi) a median emulsion droplet size of less than or equal to about 5 μm after 7 days of storage; (vi) a water-holding capacity of at least about 1.5 g water per gram of protein-enriched pongamia ingredient; (vii) an oil-holding capacity of at least about 1.5 g oil per gram of protein-enriched pongamia ingredient; (viii) a minimum gelling concentration of at least about 10 g protein-enriched pongamia ingredient per 100 grams; (ix) a powder dispersibility of at least about 10%; or (x) a neutral, non-bitter taste: or any combinations of (i)-(x) thereof.

In other embodiments, the ingredient has: (i) a viscosity of between about 2 mPa*s and about 100 mPa*s at a shear rate of 100 $s^{-1}$; (ii) a foaming capacity of between about 100% and about 200% of volume of 0.1% w/v pongamia protein solution; (iii) a bulk density of at least about 0.2 g/$cm^3$; (iv) a protein solubility of at least about 35% at pH 7; (v) a median emulsion droplet size of less than or equal to about 5 μm; (vi) a median emulsion droplet size of less than or equal to about 5 μm after 7 days of storage: (vii) a neutral, non-bitter taste: or any combinations of (i)-(vii) thereof.

In yet other embodiments, the ingredient has: (i) a viscosity of between about 2 mPa*s and about 100 mPa*s at a shear rate of 100 $s^{-1}$; (ii) a foaming capacity of between about 100% and about 200% of volume of 0.1% w/v protein solution; (iii) a bulk density of at least about 0.2 g/$cm^3$; (iv) a protein solubility of at least about 35% at pH 7; (v) a median emulsion droplet size of less than or equal to about 5 μm; (vi) a median emulsion droplet size of less than or equal to about 5 μm after 7 days of storage; (vii) a water-holding capacity of at least about 1.5 g water per gram of protein-enriched pongamia ingredient; (viii) a minimum gelling concentration of at least about 10 g protein-enriched pongamia ingredient per 100 grams; or (ix) a neutral, non-bitter taste or any combination of (i)-(ix) thereof.

In still other embodiments, the ingredient has (i) a bulk density of at least about 0.2 g/$cm^3$; (ii) a protein solubility of at least about 35% at pH 7; (iii) a water-holding capacity of at least about 1.5 g water per gram of protein-enriched pongamia ingredient; (iv) an oil-holding capacity of at least about 1.5 g oil per gram of protein-enriched pongamia ingredient; (v) a minimum gelling concentration of at least about 10 g protein-enriched pongamia ingredient per 100 grams; or (vi) a neutral, non-bitter taste; or any combination of (i)-(vi) thereof.

In some embodiments, the ingredient has: (i) a foaming capacity of between about 100% and about 200% of volume of 0.1% w/v protein solution; (ii) a minimum gelling concentration of at least about 7 g protein-enriched pongamia ingredient per 100 grams; or (iii) a neutral, non-hitter taste; or any combination of (i)-(iii) thereof.

In one aspect, provided herein is a method of producing a protein-enriched pongamia composition, comprising: preparing an aqueous slurry of pongamia meal, wherein the pongamia meal is defatted and debittered and has (i) less than 500 ppm of karanjin; or (ii) less than 500 ppm of pongamol; or (iii) less than 500 ppm of karanjin and pongamol combined; adjusting the pH of the aqueous slurry to a pH between 6 and 10; separating the slurry into a protein liquid fraction and an insoluble wet cake fraction; neutralizing, concentrating and/or pasteurizing the protein liquid fraction; and drying the protein liquid fraction to provide a protein-enriched pongamia composition.

In another aspect, provided herein is a method of producing a protein-enriched pongamia ingredient, comprising: preparing an aqueous slurry of pongamia meal, wherein the pongamia meal is defatted and debittered and has (i) less than 500 ppm of karanjin; or (ii) less than 500 ppm of pongamol; or (iii) less than 500 ppm of karanjin and pongamol combined; adjusting the pH of the aqueous slurry to a pH between 6 and 10, separating the slurry into a protein liquid fraction and an insoluble wet cake fraction; precipitating at least a portion of pongamia protein from the protein liquid fraction to obtain purified pongamia protein solids; neutralizing and pasteurizing the purified pongamia protein solids; and drying the purified pongamia protein solids to provide a protein-enriched pongamia ingredient.

In another aspect, provided herein is a method of producing a protein-enriched pongamia ingredient, comprising: preparing an aqueous slurry of pongamia meal; adjusting the pH of the aqueous slurry to a between 6 and 10, separating the slurry into a protein liquid fraction and an insoluble wet cake fraction; passing the protein liquid fraction through a membrane system to obtain a retentate comprising pongamia protein; optionally washing, neutralizing and/or pasteurizing the retentate; and drying the retentate to provide a protein-enriched pongamia ingredient.

DESCRIPTION OF THE FIGURES

The present application can be understood by reference to the following description taken in conjunction with the accompanying figures.

DETAILED DESCRIPTION

Figure 1:
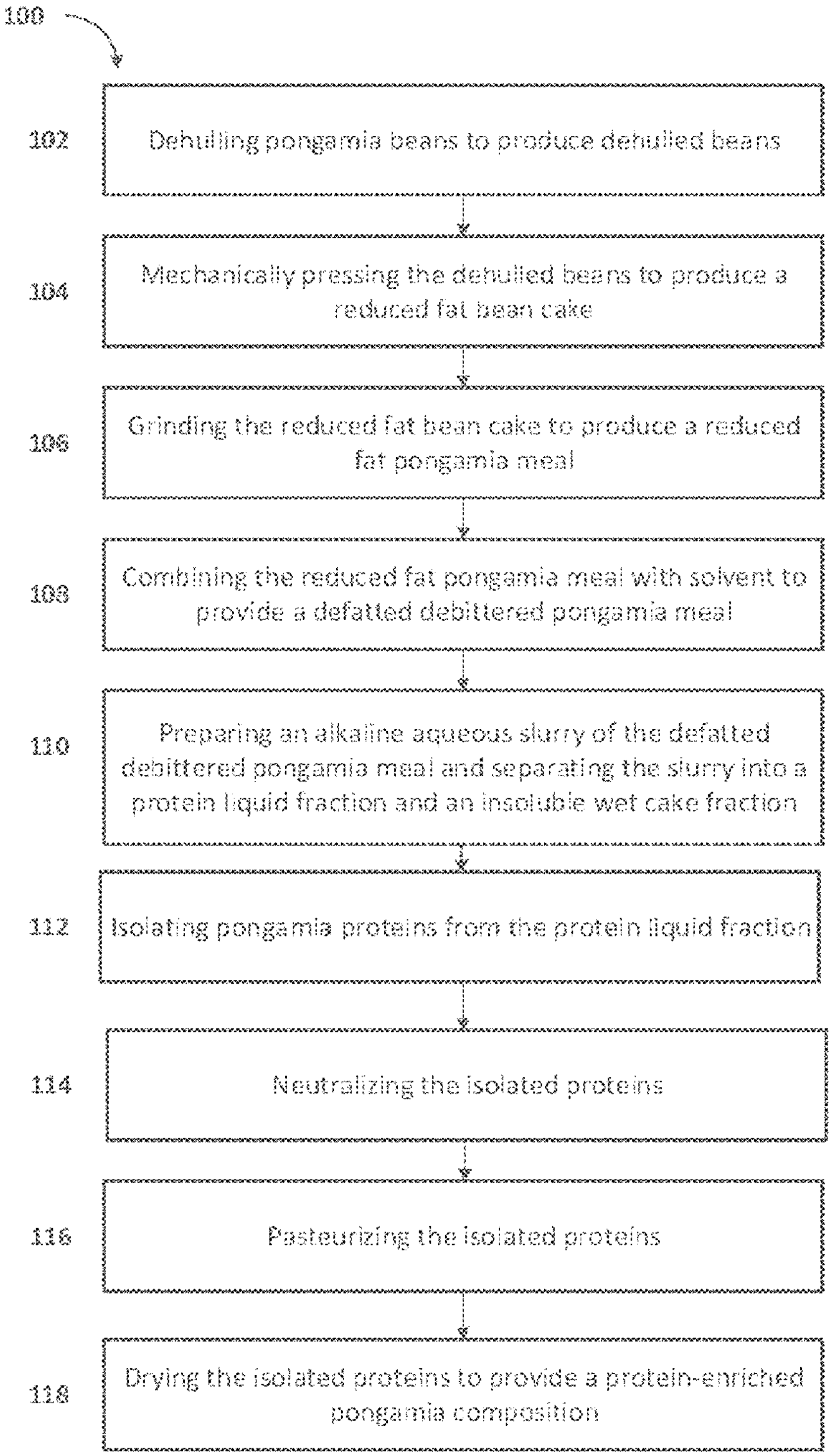
FIG. 1 provides an overview of an exemplary process for producing pongamia compositions with high protein content from pongamia beans.

The following description sets forth exemplary methods, parameters and the like. It should be recognized, however, that such description is not intended as a limitation on the scope of the present disclosure but is instead provided as a description of exemplary embodiments.

In some aspects, provided herein are pongamia compositions with high protein content, including, for example, pongamia protein concentrates or isolates, that can be used as alternative plant-based protein sources for consumption by animals including, in particular, humans. In certain aspects, provided herein are methods for producing such protein-enriched pongamia compositions, as well as methods of using such compositions in various food and beverage products.

In some aspects, the protein-enriched pongamia compositions provided herein are protein-enriched pongamia ingredients. As used herein, "protein-enriched pongamia composition" may be interchangeably referred to as "protein-enriched pongamia ingredient". The protein-enriched pongamia ingredients of the present disclosure are distinguished from pongamia bean cake, pongamia meal or pongamia flour in that the protein content of the pongamia ingredients provided herein is enriched while other components such as carbohydrates and fat are reduced relative to naturally occurring amounts in pongamia beans, bean cake, meal or flour. Pongamia bean cakes, meals and flours are typically prepared with processes to detoxify (or debitter) and defat the source pongamia beans, but are not substantially enriched in their protein content nor reduced in their carbohydrate content. For example, a typical pongamia bean contains approximately 25% protein content by weight on a dry basis. Typical processes to detoxify and/or defat the pongamia beans produce pongamia cakes, meals, or flours having protein contents of 30-35%.

In addition, the protein-enriched pongamia ingredients exhibit a number of physical properties, that reflect the protein enrichment and reduction of fat and carbohydrates that enable their use in a broader variety of food applications than pongamia bean cake, meal or flour.

Protein-Enriched Pongamia Compositions

The components and properties of the protein-enriched pongamia compositions are described in further detail below. The functional properties, such as solubility, viscosity, and emulsifying properties, of the protein-enriched pongamia compositions described herein were unexpectedly found to be comparable to, if not better than, that of commercial plant protein ingredients, such as soy, pea, lupin and sunflower. These properties of the protein-enriched pongamia compositions described herein suggest that such products can find their application in a wide variety of food and beverage products.

Pongamia Protein Content

The protein-enriched pongamia compositions provided herein have a high pongamia protein content, including relative to the pongamia protein content of the pongamia meal from which the enriched composition was obtained.

In some variations, the protein-enriched pongamia composition has at least 40%, at least 45%, at least 50%, at least 55%, at least 60%, at least 65%, at least 70%, at least 75%, at least 80%, at least 85%, or at least 95% of pongamia proteins on a dry weight basis. In certain variations, the protein-enriched pongamia composition has between 50% and 99%, between 50% and 95%, between 50% and 90%, between 50% and 85%, between 50% and 80%, between 50% and 75%, between 45% and 70%, between 45% and 60%, between 40% and 70%, between 40% and 95%, between 45% and 90%, of pongamia proteins on a dry weight basis.

In certain variations, the protein-enriched pongamia composition is pongamia protein concentrate, having at least 40%, at least 45%, at least 50%, at least 55%, at least 60%, or at least 65%; or between 45% and 70%, between 45% and 60%, between 50% and 70%, between 55% and 70%, between 55% and 65%, between 55% and 60%, between 60% and 70%, or between 65% and 70% of pongamia proteins on a dry weight basis.

In other variations, the protein-enriched pongamia composition is pongamia protein isolate, having at least 70%, at least 75%, at least 80%, at least 85%, or at least 95%; or between 70% and 95%, between 75% and 95%, between 80% and 95%, between 85% and 95%, between 90% and 95%, between 70% and 90%, between 75% and 90%, between 80% and 90%, between 85% and 90%, between 70% and 85% between 75% and 85%, between 80% and 85%, between 70% and 80%, or between 75% and 80% of pongamia proteins on a dry weight basis.

In certain variations of the foregoing, the protein-enriched pongamia composition has at least 1.1 times, at least 1.25 times, at least 1.5 times, at least 2 times, at least 2.5 times, at least 3 times, at least 3.5 times, or at least 4 times more pongamia protein than the pongamia meal from which the enriched composition was obtained. In certain variations, the protein-enriched pongamia composition has between 1.25 and 5 times more pongamia protein than the pongamia meal from which the enriched compositions were obtained.

Protein Solubility

Protein solubility may be measured using any suitable techniques known in the art. For example, in one variation, solubility is measured in accordance with the protocol set forth in Example 4 below.

In some embodiments, at least 35%, at least 40%, at least 50%, at least 60%, at least 70%, at least 75%, at least 80%, or at least 85% of the proteins present in the protein-enriched pongamia composition are soluble in water at a pH greater than or equal to pH 6. In certain variations, at least 35%, at least 40%, at least 50%, at least 60%, or at least 70%, at least 75%, at least 80%, or at least 85% of the proteins present in the protein-enriched pongamia composition are soluble in water at pH 7. In other embodiments, less than or equal to 50%, less than or equal to 45%, less than or equal to 40%, or less than or equal to 30% of the proteins present in the protein-enriched pongamia composition are soluble in water at a pH between 3 and 5. In certain variations, less than or equal to 50%, less than or equal to 45%, less than or equal to 40%, or less than or equal to 30% of the proteins present in the protein-enriched pongamia composition are soluble in water at pH 4.5.

Carbohydrate Content

In tandem with the enrichment of protein in the protein-enriched pongamia compositions provided herein, the protein-enriched pongamia compositions have a reduced carbohydrate content, including relative to the carbohydrate content of the pongamia meal from which the enriched composition was obtained.

In some embodiments, the protein-enriched pongamia composition has less than or equal to about 50%, less than or equal to about 40%, less than or equal to about 35%, less than or equal to about 30%, less than or equal to about 25%, less than or equal to about 20%, less than or equal to about 15%, or less than or equal to about 10% of carbohydrates on a dry weight basis.

In some embodiments, the protein-enriched pongamia composition has at least 40% of pongamia proteins on a dry weight basis and less than or equal to about 50% of carbohydrates on a dry weight basis. In certain embodiments, the protein-enriched pongamia composition has at least 40% of pongamia proteins on a dry weight basis and less than or equal to about 40% of carbohydrates on a dry weight basis. In other embodiments, the protein-enriched pongamia composition has at least 70% of pongamia proteins on a dry weight basis and less than or equal to about 20% of carbohydrates on a dry weight basis. In certain other embodiments, the protein-enriched pongamia composition has at least 70% of pongamia proteins on a dry weight basis and less than or equal to about 15% of carbohydrates on a dry weight basis.

Fat Content

In some embodiments, the protein-enriched pongamia composition has less than or equal to 0.5%, less than or equal to 0.75% or less than or equal to 1% of fat on a dry weight basis. In other embodiments, the protein-enriched pongamia composition has less than or equal to 4%, less than or equal to 3%, less than or equal to 2%, or less than or equal to 1% of fat on a dry weight basis. In certain embodiments, the protein-enriched pongamia composition has between 0.5% and 4%, between 0.5% and 3%, between 0.5% and 2%, between 0.5% and 1%, between 0.75% and 4%, between 0.75% and 3%, between 0.75% and 2%, between 0.75% and 1%, between 1% and 4%, between 1% and 3%, between 1% and 2%, between 0% and 1% of fat on a dry weight basis.

In other embodiments of the foregoing protein-enriched pongamia compositions, depending on the composition of the pongamia meal used, the protein-enriched pongamia composition may have:

(i) less than 4%, less than 3%, less than 2%, or less than 1% of fat on a dry weight basis; or (ii) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of bitter compounds;

or both (i) and (ii).

Furanoflavonoids

The hitter compounds refer to compounds that have a bitter taste found naturally in pongamia beans. In some embodiments, bitter taste may be attributable to furanoflavonoids such as karanjin and pongamol.

In some variations of the foregoing, the hitter compounds present in the protein-enriched pongamia compositions may include karanjin and/or pongamol. Thus, in certain embodiments of the foregoing, the protein-enriched pongamia compositions have: (i) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of karanjin; or (ii) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of pongamol; or (iii) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of karanjin and pongamol combined.

In some variations, the karanjin and/or pongamol contents of the protein-enriched pongamia compositions provided herein are determined by liquid chromatography. The analytical methods to determine karanjin and/or pongamol content may include solvent extraction of the pongamia sample, followed by liquid chromatography analysis. In some variations, the extraction solvent comprises an alkyl alkanoate. In one variation, the extraction solvent comprises ethyl acetate. In certain embodiments, the liquid chromatography analysis may include high performance liquid chromatography and mass spectrometry (e.g., MS or MS/MS) or ultraviolet detection (e.g., UV. UV/Vis or DAD).

In certain variations, the solvent extraction may involve microwave-assisted solvent extraction. For example, one exemplary analytical method may include a microwave-assisted extraction of karanjin and pongamol using ethyl acetate to collect extract for subsequent high performance liquid chromatography and mass spectrometry analysis or UV spectrophotometry. A pongamia sample is added to a microwave extraction tube. Then, the extraction solvent is added to the sample tubes and vortexed to mix. Next, the samples are extracted using a microwave extractor. Once cooled, the supernatant is vacuum-filtered to remove particulates. Alternatively, the supernatant may be centrifuged to remove particulates. The extracted samples can then be analyzed by HPLC (and detected by mass spectrometry or UV spectrophotometry) to determine the level of karanjin and pongamol present in the sample.

In certain embodiments, the protein-enriched pongamia composition comprises at least 40% pongamia proteins on a dry weight basis, wherein the ingredient has: (i) less than 500 ppm of karanjin; or (ii) less than 500 ppm of pongamol; or (iii) less than 500 ppm of karanjin and pongamol combined; and wherein the ingredient has less than or equal to 40% of carbohydrates on a dry weight basis.

In certain other embodiments, the protein-enriched pongamia composition comprises at least 70% of pongamia proteins on a dry weight basis, wherein the ingredient has: (i) less than 500 ppm of karanjin; or (ii) less than 500 ppm of pongamol; or (iii) less than 500 ppm of karanjin and pongamol combined; and wherein the ingredient has less than or equal to 15% of carbohydrates on a dry weight basis.

Relative Amino Acid Profile

In certain embodiments of the foregoing, the pongamia proteins present in the protein-enriched pongamia compositions have a relative amino acid profile on the basis of protein that includes:

(i) at least about 0.5% methionine,
(ii) at least about 1% tryptophan,
(iii) at least about 1% cysteine,
(iv) at least about 2% histidine,
(v) at least about 3% threonine,
(vi) at least about 3% isoleucine,
(vii) at least about 3% tyrosine,
(viii) at least about 3% alanine,
(ix) at least about 3% glycine,
(x) at least about 4% valine,
(xi) at least about 5% proline,
(xii) at least about 5% serine,
(xiii) at least about 5% arginine,
(xiv) at least about 6% phenylalanine, (xv) at least about 8% lysine,
(xvi) at least about 9% leucine,
(xvii) at least about 12% aspartic acid,
(xviii) at least about 15% glutamic acid,
or any combination of (i)-(xviii).

In some embodiments, the protein-enriched pongamia composition has a relative amino acid profile that includes at least 15% glutamic acid, at least 12% aspartic acid, at least 9% leucine, at least 8% lysine, at least 6% phenylalanine, or any combination thereof. In some variations, the protein-enriched pongamia composition has a relative amino acid profile that includes at least 15% glutamic acid. In other variations, the protein-enriched pongamia composition has a relative amino acid profile that includes at least 12% aspartic acid. In yet other variations, the protein-enriched pongamia composition has a relative amino acid profile that includes at least 9% leucine. In still other variations, the protein-enriched pongamia composition has a relative amino acid profile that includes at least 8% lysine. In still yet other variations, the protein-enriched pongamia composition has a relative amino acid profile that includes at least 6% phenylalanine. In certain variations, the protein-enriched pongamia composition has a relative amino acid profile that includes at least 15% glutamic acid, at least 12% aspartic acid, at least 9% leucine, at least 8% lysine, and at least 6% phenylalanine.

Amino Acid Scores

In still further embodiments, the protein-enriched pongamia composition is characterized by an amino acid score for the amount of amino acids present in the composition as compared to the amount of the same amino acids present in a reference composition. The amino acid (AA) score is calculated as follows:

Amino Acid (AA) Score=(mg of limiting essential amino acid in 1 g of test protein)/(mg of same essential amino acid in 1 g of reference protein)×100.

In some embodiments, the protein-enriched pongamia composition has an AA score that is greater than or equal to 70, greater than or equal to 80, greater than or equal to 90, greater than or equal to 100, greater than or equal to 125, or greater than or equal to 150 for at least one of: the combination of cysteine and methionine; histidine, isoleucine; leucine; lysine; threonine; tryptophan; the combination of tyrosine and phenylalanine; or valine. In some, embodiments, the protein-enriched pongamia composition has an AA score that is greater than or equal to 70, greater than or equal to 80, greater than or equal to 90, greater than or equal to 100, greater than or equal to 125, or greater than or equal to 150 for each of the following: the combination of cysteine and methionine; histidine, isoleucine; leucine; lysine; threonine; tryptophan; the combination of tyrosine and phenylalanine; and valine.

Protein digestibility-corrected amino acid score (PDCAAS) is a method known in the art for evaluating protein quality based on both the amino acid requirements of humans and their ability to digest the protein. A value of "1" is the highest, whereas a value of "0" is the lowest. The formula for calculating PDCAAS as prescribed by FAO/WHO/UNU Expert Consultation is as follows:

PDCAAS=Lowest Essential Amino Acid Ratio×Fecal True Digestibility (%)

where the Lowest Essential Amino Acid Ratio is derived by:

(mg of limiting essential amino acid in 1 g of test protein)/(mg of same essential amino acid in 1 g of reference protein)

In some embodiments, the protein-enriched pongamia compositions described herein have a relatively high PDCAAS value. In some variations, the protein-enriched pongamia compositions have a PDCAAS of at least 0.7, at least 0.75, at least 0.8, at least 0.85, at least 0.9, or at least 0.95. In certain variations, the protein-enriched pongamia compositions have a PDCAAS of between 0.7 and 0.95, between 0.75 and 0.95, between 0.8 and 0.95, between 0.85 and 0.95, between 0.9 and 0.95, between 0.75 and 0.9, between 0.8 and 0.9, between 0.85 and 0.9, or between 0.8 and 0.85.

Molecular Weight

Molecular weight distributions of the proteins present in the protein-enriched pongamia compositions may be determined using any suitable techniques known in the art. For example, in one variation, molecular weight is determined in accordance with the protocol set forth in Example 3 below.

The protein-enriched pongamia compositions of the present disclosure are obtained from pongamia meal derived from pongamia beans. By virtue of their provenance from pongamia oilseeds, the protein-enriched pongamia compositions provided herein contain seed storage proteins and may be characterized by the presence of seed storage proteins in contrast to compositions obtained, for example, from pongamia leaves. The protein-enriched pongamia compositions of the present disclosure may, in some embodiments, be differentiated from protein compositions derived from other plant sources, such as pea or soy, as characterized by the molecular weight distribution of proteins present within the protein-enriched pongamia compositions.

In some embodiments, the protein-enriched pongamia compositions described herein comprise proteins having varying molecular weights. In some variations, the pongamia protein concentrates or isolates have an average molecular weight of greater than or equal to 10,000; 15,000; 20,000; 25; 000; 30,000; 35,000; 40,000; 45,000; 50,000; or 55,000 Daltons. In other variations, the protein-enriched pongamia compositions have an average molecular weight of less than or equal to 250,000; 200,000; 175,000; 150,000; 130,000; 120,000; 110,000; 100,000; 90,000; 80,000; 70,000; 60,000; or 55,000 Daltons. In certain variations, the protein-enriched pongamia compositions have an average molecular weight falling within a range wherein any of the foregoing weights can serve as the upper or lower bound of the range. For example, in one variation, the protein-enriched pongamia compositions have an average molecular weight of between 55,000 Daltons and 72,000 Daltons. In yet other variations, the protein-enriched pongamia compositions have an average molecular weight of between 5,000 Daltons and 250,000 Daltons.

In some embodiments, the protein-enriched pongamia compositions comprise seed storage proteins. In certain embodiments, the protein-enriched pongamia compositions comprise seed storage proteins, wherein about 30-40% of the proteins present are proteins having a molecular weight of between about 45 kDa and about 70 kDa, as determined by SDS-PAGE. In other embodiments, the protein-enriched pongamia compositions comprise prominent seed storage proteins having molecular weight of about 170-250 kDa, about 115-160 kDa, about 45-70 kDa, about 19-25 kDa, about 14-17 kDa, or about 10-13 kDa, or any combinations thereof.

In certain variations, the molecular weight of the protein-enriched pongamia compositions, ingredients, concentrates and isolates provided herein are determined by SDS-PAGE according to the protocol as described in Example 3.

Viscosity

The protein-enriched pongamia compositions provided herein may also be characterized by their viscosity when prepared in solution. The viscosity of such pongamia protein-enriched solutions may be suitable for certain food product applications such as beverages, for which viscosity can influence the overall perception of the thickness or thinness of a food product. High viscosity may be favored for certain food products, such as yogurt, whereas low viscosity may be more suitable to high protein beverages.

Viscosity may be measured using any suitable techniques known in the art. For example, in one variation, the viscosity of a protein solution is measured using a rheometer, in accordance with the protocol set forth in Example 4 below.

In some embodiments, the protein-enriched pongamia compositions have varying viscosities. In some variations, the protein-enriched pongamia compositions have a viscosity of at least 2 millipascal-seconds (mPa*s), at least 3 mPa*s, or at least 4 mPa*s as measured at a shear rate of 100 $s^{-1}$. In some variations, the protein-enriched pongamia compositions have a viscosity of less than or equal to 100 mPa*s, less than or equal to 75 mPa*s, less than or equal to 50 mPa*s, or less than or equal to 25 mPa*s as measured at a shear rate of 100 $s^{-1}$. In other variations, the protein-enriched pongamia compositions have a viscosity of less than or equal to about 10 mPa*s, less than or equal to 8 mPa*s, less than or equal to 7 mPa*s, less than or equal to 6 mPa*s, or less than or equal to 5 mPa*s as measured at a shear rate of 100 $s^{-1}$. In still other variations, the protein-enriched pongamia compositions have a viscosity of between about 2 mPa*s and about 100 mPa*s, between about 2 mPa*s and about 75 mPa*s, between about 2 mPa*s and about 50 mPa*s, between about 2 mPa*s and about 25 mPa*s, between about 2 mPa*s and about 10 mPa*s, between about 5 mPa*s and about 10 mPa*s, or between about 7 mPa* and 10 mPa*s at a shear rate of 100 $s^{-1}$.

In yet other variations, the protein-enriched pongamia compositions have a viscosity of at least 2 mPa*s, at least 4 mPa*s, at least 6 mPa*s, or at least 8 mPa*s as measured at a shear rate of 50 $s^{-1}$. In some variations, the protein-enriched pongamia compositions have a viscosity of less than or equal to 15 mPa*s, less than or equal to 12 mPa*s, or less than or equal to 10 mPa*s as measured at a shear rate of 50 $s^{-1}$. In yet other variations, the protein-enriched pongamia compositions have a viscosity of at least 2 mPa*s, at least 4 mPa*s, at least 6 mPa*s, or at least 8 mPa*s as measured at a shear rate of 10 $s^{-1}$. In still yet other variations, the protein-enriched pongamia compositions have a viscosity of less than or equal to 15 mPa*s, less than or equal to 12 mPa*s, or less than or equal to 10 mPa*s as measured at a shear rate of 10 $s^{-1}$.

Emulsification

The protein-enriched pongamia compositions provided herein may be further described in terms of their emulsification properties. The emulsifying properties of the protein-enriched pongamia compositions may be suitable for food products containing immiscible liquid ingredients, such as non-dairy milks or protein drinks. For example, the mouthfeel of a beverage product may be affected by the droplet size distribution within the beverage, with narrower distributions (whether single mode or bimodal) and smaller size droplets providing a smooth texture and uniform mouthfeel.

Emulsification may be measured using any suitable techniques known in the art. For example, in one variation, emulsions are analyzed for droplet size by laser diffraction, in accordance with the protocol set forth in Example 4 below.

In some embodiments, emulsions comprising the protein-enriched pongamia compositions may have varying droplet size distributions. In some embodiments, an emulsion comprising the protein-enriched pongamia composition has a unimodal droplet size distribution. In other embodiments, an emulsion comprising the protein-enriched pongamia composition has a bimodal droplet size distribution.

In some variations, an emulsion comprising the protein-enriched pongamia composition has an average droplet size of at least 1 μm, at least 2.5 μm, at least 5 μm, at least 10 μm, at least 25 μm, at least 50, or at least 75 μm. In other variations an emulsion comprising the protein-enriched pongamia composition has an average droplet size of less than or equal to 150 μm, less than or equal to 100 μm, less than or equal to 75 μm, or less than or equal to 50 μm. In certain variations, an emulsion comprising the protein-enriched pongamia composition has a bimodal droplet size distribution, wherein the bimodal distribution has a first average droplet size of about 1 μm and a second average droplet size of between about 10 μm and about 100 μm.

In some embodiments, when emulsified, the protein-enriched pongamia composition (in the form of an emulsion) has an average droplet size of at least 1 μm, at least 2.5 μm, at least 5 μm, at least 10 μm, at least 2.5 μm, at least 50, or at least 75 μm. In other embodiments, when emulsified, the protein-enriched pongamia composition has an average droplet size of less than or equal to 150 μm, less than or equal to 100 μm, less than or equal to 75 μm, or less than or equal to 50 μm. In certain variations, when emulsified, the protein-enriched pongamia composition has a bimodal droplet size distribution, wherein the bimodal distribution has a first average droplet size of about 1 μm and a second average droplet size of between about 10 μm and about 100 μm.

In some embodiments wherein the emulsion comprising the protein-enriched pongamia composition has a unimodal droplet size distribution, the protein-enriched pongamia composition (in the form of an emulsion) may be characterized as having a median droplet size. In still other embodiments, when emulsified, the protein-enriched pongamia composition (in the form of an emulsion) has a median droplet size of less than or equal to about 5 μm, less than or equal to about 4 μm, less than or equal to about 35 μm, less than or equal to about 2 μm, or less than or equal to about 1 μm. In certain embodiments, when emulsified, the protein-enriched pongamia composition (in the form of an emulsion) has a median droplet size of less than or equal to about 5 μm.

In some embodiments, emulsions comprising the protein-enriched pongamia compositions provided herein may be further characterized by their stability over time, such as several days after initial preparation. For example, in still other embodiments, when emulsified, the protein-enriched pongamia composition (in the form of an emulsion) has a median emulsion droplet size of less than or equal to about 5 μm, less than or equal to about 4 μm, less than or equal to about 35 μm, less than or equal to about 2 μm, or less than or equal to about 1 μm after 1 day, 2 days, 3 days, 4 days, 5 days, 6 days, or 7 days of storage. In certain embodiments, when emulsified, the protein-enriched pongamia composition (in the form of an emulsion) has a median droplet size of less than or equal to about 5 μm after 7 days of storage.

Foaming Properties

The protein-enriched pongamia compositions provided herein may also be described in terms of their foaming properties, including their maximum foam production (or foamability) per unit weight of the pongamia composition and their foam stability (e.g., change in foam volume after a specified period of time). The foaming properties of the protein-enriched pongamia compositions may be desirable in certain food applications, for example, as an egg substitute. The foaming properties may be determined in accordance with the protocol set forth in Example 5 below.

In some embodiments, the protein-enriched pongamia compositions have a foamability of at least about 70 mL, at least about 80 mL, at least about 90 mL, or at least about 100 mL per 60 mL of a 0.1% w/v pongamia protein solution. In certain embodiments, the protein-enriched pongamia compositions have a foamability of at least about 70 mL per 60 mL of a 0.1% w/v solution of pongamia protein. In other embodiments, the protein-enriched pongamia compositions have a foamability of less than or equal to about 150 mL, less than or equal to about 140 mL, less than or equal to about 130 mL, less than or equal to about 120 mL, or less than or equal to about 110 mL per 60 mL of a 0.1% w/v solution of pongamia protein. In certain embodiments, the protein-enriched pongamia compositions have a foamability of less than or equal to about 150 mL per 60 mL of a 0.1% w/v solution of pongamia protein. In still other embodiments, the protein-enriched pongamia compositions have a foamability of between about 70 mL and about 150 mL per 60 mL of a 0.1% w/v solution of pongamia protein, between about 70 mL and about 120 mL per 60 mL of a 0.1% w/v solution of pongamia protein, or between about 70 mL and about 100 mL per 60 mL of a 0.1% w/v solution of pongamia protein. In certain embodiments, the protein-enriched pongamia compositions have a foamability of between about 70 mL and about 150 mL per 60 mL of a 0.1% w/v solution of pongamia protein.

The foamability may be alternatively described in terms of the foam capacity. In some embodiments, the protein-enriched pongamia composition has a foam capacity of at least about 100%, at least about 110%, at least about 120%, at least about 130%, at least about 140%, or at least about 150% of volume of a 0.1% w/v pongamia protein solution. In certain embodiments, the protein-enriched pongamia composition has a foam capacity of at least about 100% of volume of a 0.1% w/v pongamia protein solution. In other embodiments, the protein-enriched pongamia composition has a foam capacity of less than or equal to about 200%, less than or equal to about 190%, less than or equal to about 180%, less than or equal to about 170%, less than or equal to about 160%, or less than or equal to about 150% of volume of a 0.1% w/v pongamia protein solution. In certain embodiments, the protein-enriched pongamia composition has a foam capacity of less than or equal to about 200% of volume of a 0.1% w/v pongamia protein solution. In still other embodiments, the protein-enriched pongamia composition has a foam capacity of between about 100% and about 200%, between about 100% and about 150% or between about 150% and about 200% of volume of a 0.1% w/v pongamia protein solution. In certain embodiments, the protein-enriched pongamia composition has a foam capacity of between about 100% and about 200% of volume of a 0.1% w/v pongamia protein solution.

In still other embodiments, the protein-enriched pongamia compositions may be characterized by their foam stability, for example, as measured as the percentage of the foam volume after 5 seconds, after 5 minutes after 10 minutes, after 15 minutes or after 1 hour with respect to the maximum foam volume after initial preparation. In some embodiments, the protein-enriched pongamia compositions have foam stability of at least about 5%, at least about 6%, at least about 7%, at least about 8%, at least about 9% or at least about 10%.

Bulk Density

The protein-enriched pongamia proteins may be further described in terms of their bulk density. The bulk density, or volumetric density, of the protein-enriched pongamia compositions provided herein may indicate the relative case of use, storage and/or packing for both large-scale food processing and consumer applications, such as for protein powder mixes.

In some embodiments, the protein-enriched pongamia composition has a bulk density of at least about 0.2 g/cm$^3$, at least about 0.25 g/cm$^3$, at least about 0.3 g/cm$^3$, at least about 0.4 g/cm$^3$, at least about 0.5 g/cm$^3$, at least about 0.6 g/cm$^3$, at least about 0.7 g/cm$^3$, at least about 0.8 g/cm$^3$, at least about 0.9 g/cm$^3$, or at least about 1 g/cm$^3$. In certain embodiments, the protein-enriched pongamia composition has a bulk density of at least about 0.2 g/cm$^3$.

Water- and Oil-Holding Capacities

In still other embodiments, the protein-enriched pongamia compositions provided herein may be characterized by their water- and/or oil-holding capacities. Water bolding capacity, also known as water-binding or water-absorption capacity, is a measure of the total amount of water that can be absorbed per unit weight of a substance, such as a protein powder or the protein-enriched pongamia composition of the present disclosure. In one variation, water holding capacity is determined in accordance with the protocol set forth in Example 5 below. Similarly, the oil holding capacity is a measure of the total amount of oil that can be absorbed per unit weight of a substance. In one variation, oil holding capacity is determined in accordance with the protocol set forth in Example 5 below.

The water and oil holding capacities of the protein-enriched pongamia compositions provided herein suggest potential utility and suitable incorporation in food products where water and oil retention are desired. For example, in non-dairy yogurts and yogurts, high water holding capacity may be favorable to avoid separation of liquid (whey) from protein (milk solids) in storage. In another example, protein-enriched pongamia compositions may find use in meat mimetics, for which high water holding capacity and oil holding capacity could contribute to certain sensory aspects (such as juiciness) that replicate the sensory properties of animal meat. The water and oil holding capacities of the protein-enriched pongamia compositions provided herein may reflect the methods used to obtain the compositions, as these properties are influenced by protein solubility, degree of denaturation of proteins and exposed hydrophobic groups on the proteins.

In some embodiments, the protein-enriched pongamia composition has a water-holding capacity of at least about 0.5 g water, at least about 0.7 g water, at least about 1 g water, at least about 1.2 g water, at least about 1.5 g water, at least about 2 g water, at least about 2.5 g water, at least about 3 g water, or at least about 3.5 g water per grain of protein-enriched pongamia ingredient. In certain embodiments, the protein-enriched pongamia composition has a water-holding capacity of at least about 1.5 g water per gram of protein-enriched pongamia ingredient.

In some embodiments, the protein-enriched pongamia composition has a water-holding capacity of at least about 0.5 g oil, at least about 0.7 g oil, at least about 1 g oil, at least about 1.2 g oil, at least about 1.5 g oil, at least about 2.5 g water, at least about 3 g water, or at least about 3.5 g oil per gram of protein-enriched pongamia ingredient. In certain embodiments, the protein-enriched pongamia composition has a water-holding capacity of at least about 1.2 g oil or at least about 1.5 g oil per gram of protein-enriched pongamia ingredient.

Gelling Properties

In still other embodiments, the protein-enriched pongamia compositions of the present disclosure may be characterized by their gelling properties. The ability of the protein-enriched pongamia compositions to form gels suggest potential incorporation into food products where semi-solid gel-like structure is desirable, such as in desserts, (non-dairy) yogurts, non-dairy cheese, puddings, sauces, dips and spreads. In one variation, minimum gelling concentration is determined in accordance with the protocol set forth in Example 5 below.

In some embodiments, the protein-enriched pongamia compositions of the present disclosure a minimum gelling concentration of at least about 5 g protein-enriched pongamia composition per 100 gram of total solution, at least about 6 g protein-enriched pongamia composition per 100 gram of total solution, at least about 7 g protein-enriched pongamia composition per 100 gram of total solution, at least about 8 g protein-enriched pongamia composition per 100 gram of total solution, at least about 9 g protein-enriched pongamia composition per 100 gram of total solution, at least about 10 g protein-enriched pongamia composition per 100 gram of total solution, at least about 11 g protein-enriched pongamia composition per 100 gram of total solution, or at least about 12 g protein-enriched pongamia composition per 100 gram of total solution. In certain embodiments, the protein-enriched pongamia compositions of the present disclosure a minimum gelling concentration of at least about 7 g protein-enriched pongamia composition per 100 gram of total solution. In certain other embodiments, the protein-enriched pongamia composition has a minimum gelling concentration of at least about 10 g protein-enriched pongamia composition per 100 gram of total solution Powder Dispersibility In some embodiments, the protein-enriched pongamia compositions may be described in terms of their powder dispersibility. Powder dispersibility, or the ability of a powder to break down into particles in water, may indicate suitability of a dried powder for reconstitution in water, such as is the case for certain beverage products (e.g. dried milk or protein shake powder). For example, in one variation, powder dispersibility is determined in accordance with the protocol set forth in Example 5 below. In some embodiments, the protein-enriched pongamia composition has a powder dispersibility of at least about 10%, at least about 12%, at least about 15% or at least about 17%. In certain embodiments, protein-enriched pongamia composition has a powder dispersibility of at least about 10%.

Taste and Color

In some embodiments, the protein-enriched pongamia compositions described herein have a clean taste profile that is free from bitterness. In certain embodiments, the protein-enriched pongamia composition has a neutral and/or non-bitter taste. In some embodiments, the concentration of hitter compounds, such as karanjin and/or pongamol, present in the protein-enriched pongamia compositions is less than 500 ppm. In certain embodiments, the concentration of bitter compounds, such as karanjin and/or pongamol, present in the protein-enriched pongamia compositions is less than 200 ppm. In certain variations, the concentration of karanjin and/or pongamol present in the protein-enriched pongamia compositions is not detectable by methods and techniques known in the art to measure karanjin and/or pongamol.

In still other embodiments, the protein-enriched pongamia compositions described herein have a white or light brown color. In certain embodiments, the protein-enriched pongamia compositions described herein have a white color. In certain other embodiments, protein-enriched pongamia compositions have a light brown color.

In some embodiments, the protein-enriched pongamia compositions have:

(i) a viscosity of between about 2 mPa*s and about 100 mPa*s at a shear rate of 100 $s^{-1}$;

(ii) a foaming capacity of between about 100% and about 200% of volume of 0.1% w/v protein solution;

(iii) a bulk density of at least about 0.2 g/$cm^3$;

(iv) a protein solubility of at least about 35% at pH 7;

(v) a median emulsion droplet size of less than or equal to about 5 μm;

(vi) a median emulsion droplet size of less than or equal to about 5 μm after 7 days of storage;

(vi) a water-holding capacity of at least about 1.5 g water per gram of protein-enriched pongamia ingredient;

(vii) an oil-holding capacity of at least about 1.5 g oil per gram of protein-enriched pongamia ingredient;

(viii) a minimum gelling concentration of at least about 10 g protein-enriched pongamia ingredient per 100 grams;

(ix) a powder dispersibility of at least about 10%;

(x) a neutral, non-bitter taste; or (xi) a white color;

or any combinations of (i)-(xi) thereof.

In other embodiments, the protein-enriched pongamia compositions have:

(i) a viscosity of between about 2 mPa*s and about 100 mPa*s at a shear rate of 100 $s^{-1}$;

(ii) a foaming capacity of between about 100% and about 200% of volume of 0.1% w/v protein solution;

(iii) a bulk density of at least about 0.2 g/$cm^3$;

(iv) a protein solubility of at least about 35% at pH 7;

(v) a median emulsion droplet size of less than or equal to about 5 μm;

(vi) a median emulsion droplet size of less than or equal to about 5 μm after 7 days of storage;

(vi) a water-holding capacity of at least about 1.5 g water per gram of protein-enriched pongamia ingredient;

(vii) an oil-holding capacity of at least about 1.5 g oil per gram of protein-enriched pongamia ingredient.

(viii) a minimum gelling concentration of at least about 10 g protein-enriched pongamia ingredient per 100 grams;

(ix) a powder dispersibility of at least about 10%; or (x) a neutral, non-bitter taste;

or any combinations of (i)-(x) thereof.

In yet other embodiments, the protein-enriched pongamia composition has:

(i) a viscosity of between about 2 mPa*s and about 100 mPa*s at a shear rate of 100 $s^{-1}$;

(ii) a foaming capacity of between about 100% and about 200% of volume of 0.1% w/v pongamia protein solution;

(iii) a bulk density of at least about 0.2 g/$cm^3$;

(iv) a protein solubility of at least about 35% at pH 7;

(v) a median emulsion droplet size of less than or equal to about 5 μm;

(vi) a median emulsion droplet size of less than or equal to about 5 μm after 7 days of storage;

(vii) a neutral, non-bitter taste;

or any combinations of (i)-(vii) thereof.

In still yet other embodiments, the protein-enriched pongamia composition has:

(i) a viscosity of between about 2 mPa*s and about 100 mPa*s at a shear rate of 100 $s^{-1}$;

(ii) a foaming capacity of between about 100% and about 200% of volume of 0.1% w/v protein solution;
(iii) a bulk density of at least about 0.2 g/cm$^3$;
(iv) a protein solubility of at least about 35% at pH 7;
(v) a median emulsion droplet size of less than or equal to about 5 μm;
(vi) a median emulsion droplet size of less than or equal to about 5 μm after 7 days of storage:
(vii) a water-holding capacity of at least about 1.5 g water per gram of protein-enriched pongamia ingredient;
(viii) a minimum gelling concentration of at least about 10 g protein-enriched pongamia ingredient per 100 grams; or
(ix) a neutral, non-bitter taste or
or any combination of (i)-(x) thereof.

In some embodiments, the protein-enriched pongamia composition has:
(i) a hulk density of at least about 0.2 g/cm$^3$;
(ii) a protein solubility of at least about 35% at pH 7;
(iii) a water-holding capacity of at least about 1.5 g water per gram of protein-enriched pongamia ingredient;
(iv) an oil-holding capacity of at least about 1.5 g oil per gram of protein-enriched pongamia ingredient;
(v) a minimum gelling concentration of at least about 10 g protein-enriched pongamia ingredient per 100 grams; or
(vi) a neutral, non-bitter taste:
or any combination of (i)-(vi) thereof.

In other embodiments, the protein-enriched pongamia composition has:
(i) a foaming capacity of between about 100% and about 200% of volume of 0.1% w/v protein solution;
(ii) a minimum gelling concentration of at least about 7 g protein-enriched pongamia ingredient per 100 grams; or
(iii) a neutral, non-bitter taste;
or any combination of (i)-(iii) thereof.

Methods of Producing Protein-Enriched Pongamia Compositions

In some aspects, provided herein are various methods of producing protein-enriched pongamia compositions (including, for example, pongamia protein concentrates or isolates). The protein-enriched pongamia compositions described herein are derived from pongamia beans. In some embodiments, such protein-enriched pongamia compositions are produced from various forms of processed pongamia meal.

Pongamia Meal

In some embodiments, the pongamia meal has:
(i) less than 1%, less than 2.5%, or less than 5% of fat on a dry weight basis; or
(ii) less than 1,000 ppm, less than 900 ppm, less than 800 ppm, less than 700 ppm, less than 600 ppm, less than 500 ppm, less than 400 ppm, less than 300 ppm, less than 200 ppm, or less than 100 ppm of bitter compounds;
or both (i) and (ii).

In certain embodiments, the pongamia meal has:
(i) less than 0.2%, less than 0.5%, or less than 1% of fat on a dry weight basis; or
(ii) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of bitter compounds;
or both (i) and (ii).

As noted above, the bitter compounds refer to compounds that have a bitter taste found naturally in pongamia beans. In some variations of the foregoing, the hitter compounds present in the pongamia meal may include karanjin and/or pongamol. Thus, in certain embodiments of the foregoing, the pongamia meal has: (x) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of karanjin; or (y) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of pongamol; or (z) less than 500 ppm, less than 200 ppm, less than 150 ppm, less than 100 ppm, less than 50 ppm, less than 25 ppm, less than 20 ppm, less than 15 ppm, less than 10 ppm, less than 5 ppm, or less than 1 ppm of karanjin and pongamol combined.

In some variations, the pongamia meal is defatted and debittered and has (i) less than 500 ppm of karanjin; or (ii) less than 500 ppm of pongamol; or (iii) less than 500 ppm of karanjin and pongamol combined. In certain variations, the pongamia meal is defatted and debittered and has (i) less than 200 ppm of karanjin, or (ii) less than 200 ppm of pongamol; or (iii) less than 200 ppm of karanjin and pongamol combined.

Pongamia meal used for the methods described herein to produce the protein-enriched pongamia compositions may be produced from various methods and techniques known in the art. With reference to FIG. 1, process 100 depicts an exemplary process to produce the protein-enriched pongamia compositions. Process 100 depicts dehulling 102, mechanically pressing 104 and grinding 106 pongamia beans to produce a reduced fat pongamia meal, which can then undergo solvent extraction 108 to produce a defatted debittered pongamia meal. This defatted debittered pongamia meal then undergoes protein extraction 110, followed by protein separation/isolation 112, neutralization 114, pasteurization 116 and drying (e.g., by spray drying or lyophilization) 118 to produce a protein-enriched pongamia composition.

Dehulling in step 102 typically involves passing pongamia beans through a dehuller to loosen the hulls from the beans, and separating the two fractions. Any suitable techniques known in the art may be employed to achieve dehulling and hull separation. For example, in some variations, dehulling is performed by passing the pongamia beans through an impact type dehuller and loosening the hulls from beans. Other types of dehulling equipment such as the abrasive/brushing type may be used for this purpose. Separation of the beans from the hulls can be performed by, for example, a gravity table or an aspirator. In some variations, the step of dehulling may be omitted.

The beans are then mechanically pressed (e.g., cold-pressed) in step 104, which typically may be performed using an expeller to remove free oil and produce reduced fat (e.g., 10-14% fat) pongamia meal. Cold-pressing can be performed using any suitable techniques known in the art. For example, cold-pressing can be performed using various pieces of equipment, such as a Farmet FL-200 expeller press. In some variations, pressing can include passing the dehulled beans through the apparatus to produce free oil and reduced fat meal. Mechanically pressing the beans produces a partially defatted bean meal that retains, in some variations, approximately 30-43% of the original pongamia oil content.

Then, the meal undergoes grinding in step 106 to disperse aggregates and produce a slightly less coarse meal (e.g., particle size ranging from 0.25 mm to 5.0 mm) that has a reduced fat content. Grinding can be performed using any suitable techniques known in the art. For example, grinding can be performed using equipment such as hammer mill, FitzMill or Quadromill.

The ground reduced fat meal can be extracted with a solvent in step 108 to produce a defatted debittered meal. In some variations, the resulting defatted debittered pongamia protein meal has less than 200 ppm karanjin and pongamol. The solvent extraction typically removes oil and intrinsic flavonoid compounds, such as karanjin and pongamol. In some variations, the solvent extraction may include exposing the reduced fat meal to a select group of solvents such as ethyl acetate, ethyl alcohol, hexane, or other Organic solvents, or any combinations thereof. The solvent extraction may be carried out at a solvent-to-solids ratio of 10:1; 9:1; 8:1; 7:1; 6:1; 5:1; 4:1; 3:1; 2:1; 1:1 or to a ratio falling within the range between any of the foregoing. In certain variations, the extraction can be held for 1, 2, 3, 5, 6, 8, or 10 hours, or for a duration of time falling within the range between any of the foregoing. In certain variations, the extraction is performed at a temperature of 25° C. 45° C., 55° C., 60° C., or 65° C. or to a temperature falling within the range between any of the foregoing. In yet other variations, the solvent extraction may be carried out in two or more sequential extractions, wherein the solvent for each extraction may be the same or different. The solvent is then removed, for example by evaporation, to produce defatted debittered pongamia protein meal, rich in protein (e.g., 30-39%) and carbohydrates (e.g., 55-60%).

In some embodiments, between steps 108 and 110 in exemplary process 100, the defatted debittered pongamia meal may be ground to a smaller, more uniform particle size. Any suitable methods or techniques may be employed to grind the meal. For example, in one variation, a coffee grinder or a grain mill/flour grinder, with or without subsequent sieving, maybe used. In certain embodiments, the defatted debittered pongamia meal is ground to particle size of less than or equal to 0.5 mm in diameter. In some embodiments, the defatted debittered pongamia meal is ground uniformly to particle size of less than or equal to 0.5 mm, less than or equal to 0.2 mm, less than or equal to 0.15 mm, or less than or equal to 0.05 mm in diameter. In one embodiment, the defatted debittered pongamia meal is ground uniformly to particle size of less than or equal to 0.5 mm in diameter.

With reference again to FIG. 1, although exemplary process 100 depicts the production of a protein-enriched pongamia composition from pongamia beans, it should be understood that in other exemplary processes, the protein-enriched pongamia composition may be produced from pongamia meal, which may be obtained from any methods or techniques known in the art or any commercially available sources. In other words, in other embodiments, the protein-enriched pongamia compositions may be produced from various forms of pongamia meal.

Figure 2A:
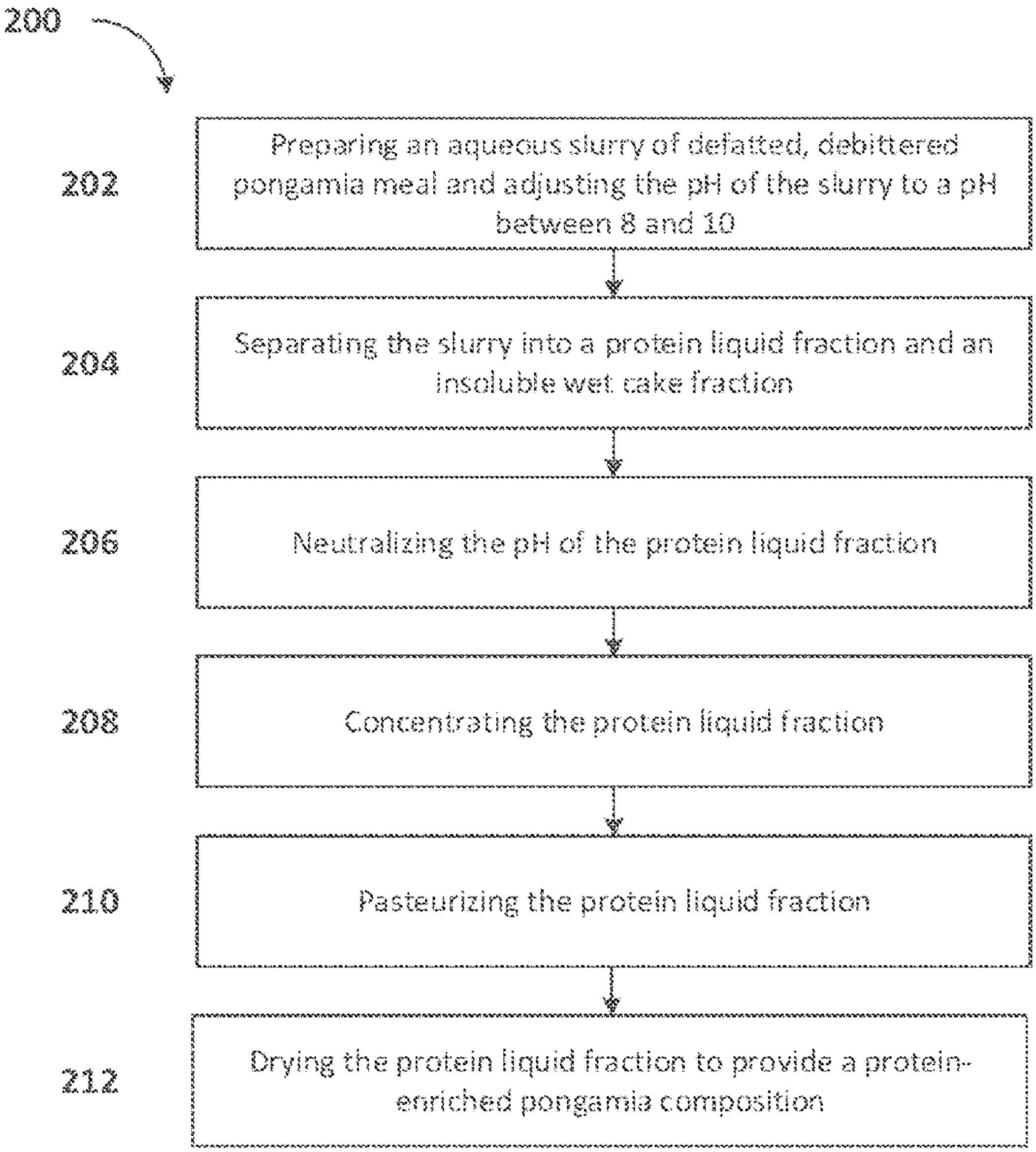
FIG. 2A depicts an exemplary process for producing pongamia protein concentrate from defatted, debittered pongamia meal by solubilization.
Figure 2B:
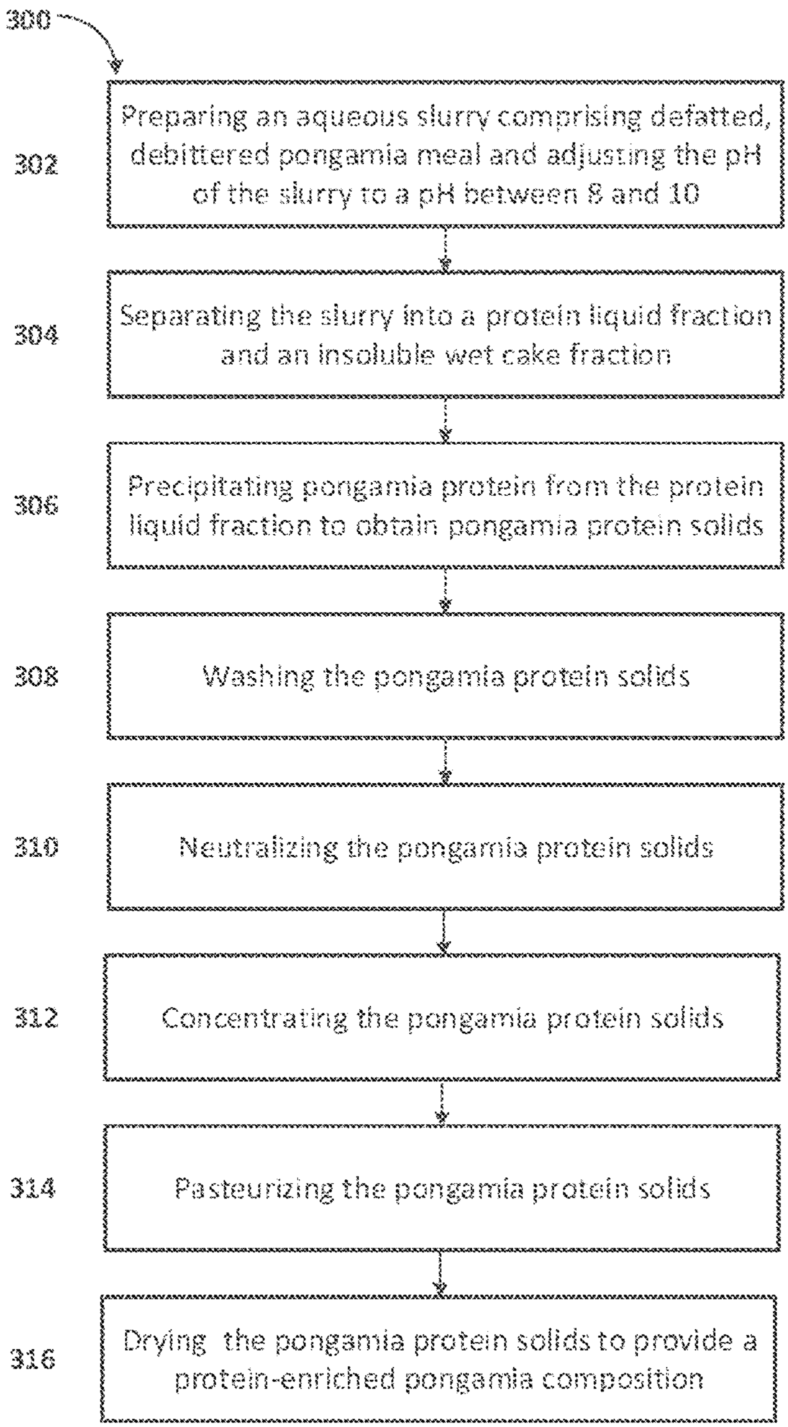
FIG. 2B depicts an exemplary process for producing pongamia protein isolate from defatted, debittered pongamia meal by isoelectric precipitation.
Figure 2C:
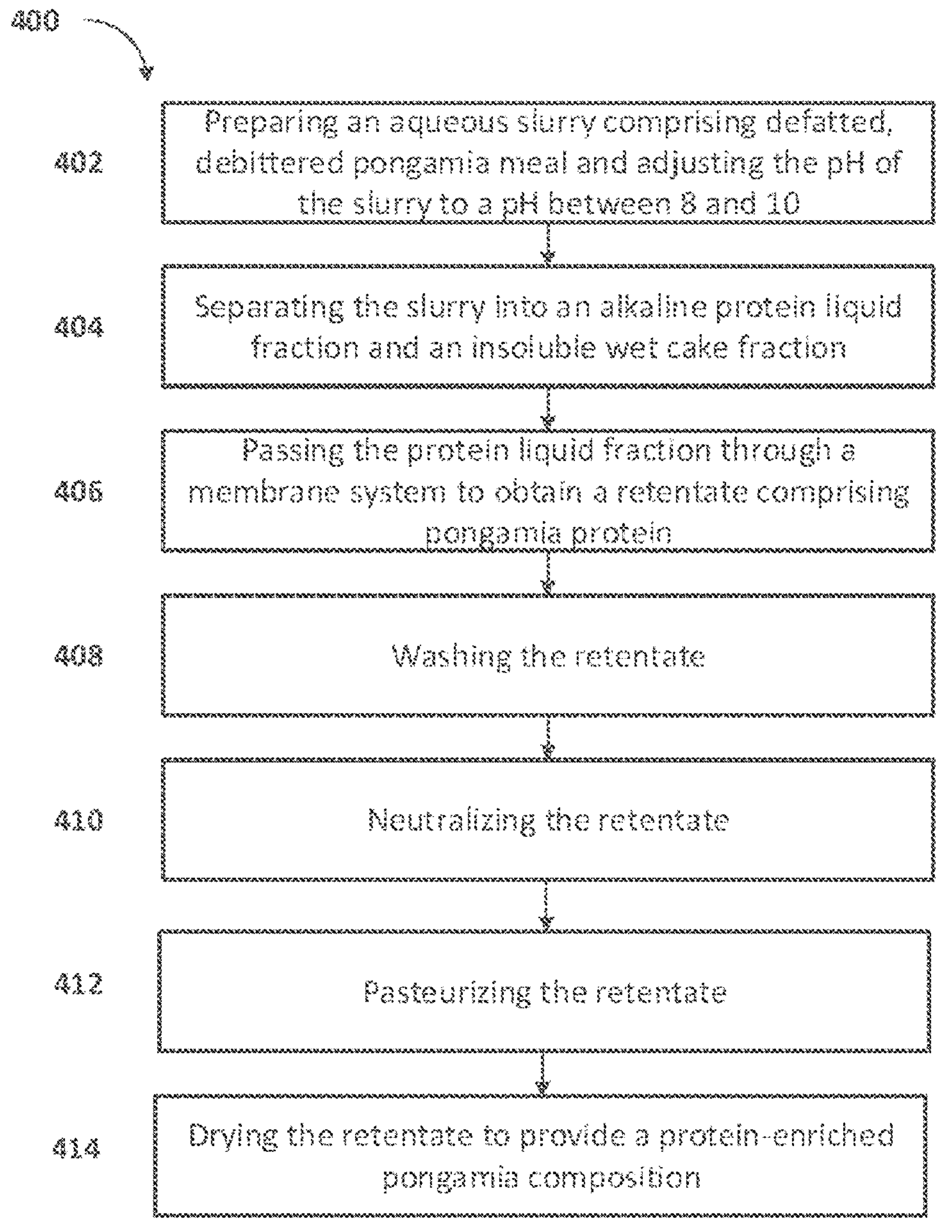
FIG. 2C depicts an exemplary process for producing pongamia protein isolate from defatted, debittered pongamia meal by membrane filtration.

Similarly, with reference to exemplary processes 200, 300 and 400 in FIGS. 2A-2C, it should be understood that although a defatted debittered pongamia meal is used as the starting material. In other variations, other forms of pongamia meal may be used. For example, in certain embodiments, the pongamia meal may be ground full fat pongamia meal or a reduced fat pongamia meal.

In some variations, the pongamia meal is obtained by dehulling and grinding pongamia beans. In one variation, the ground pongamia meal has: (i) less than or equal to 25% of pongamia protein on a dry weight basis; or (ii) at least 30% of fat on a dry weight basis; or (iii) less than or equal to 20,000 ppm of bitter compounds (such as karanjin and/or pongamol), or any combination of (i)-(iii).

In other variations, the pongamia meal is a reduced fat pongamia meal, obtained by dehulling, pressing (e.g., cold-pressing) and grinding pongamia beans. In one variation, reduced fat pongamia meal has: (i) less than or equal to 30% of pongamia protein on a dry weight basis; or (ii) less than or equal to 15% of fat on a dry weight basis; or (iii) less than or equal to 10,000 ppm of bitter compounds, or any combination of (i)-(iii).

In yet other variations, the pongamia meal is a defatted debittered pongamia meal, obtained by solvent extracting the reduced fat pongamia meal described above. For example, in certain variations, suitable solvents for such solvent extraction may include organic solvents such as esters (e.g., ethyl acetate), alcohols (e.g., methanol, ethanol, etc.) and alkanes (e.g., hexane). In one variation, defatted debittered pongamia meal has: (i) less than or equal to 40% of pongamia protein on a dry weight basis; or (ii) less than or equal to 5% of fat on a dry weight basis; or (in) less than or equal to 500 ppm of bitter compounds, or any combination of (i)-(iii). In another variation, defatted debittered pongamia meal has: (i) less than or equal to 40% of pongamia protein on a dry weight basis; or (ii) less than or equal to 5% of fat on a dry weight basis; or (iii) less than or equal to 200 ppm of bitter compounds, or any combination of (i)-(iii).

In the protein extraction step 110, the protein in the defatted debittered pongamia meal is solubilized into a liquid extract, as discussed in further detail below. Protein separation and isolation 112 may employ various solid-liquid separation techniques. For example, in some variations, decantation of the supernatant protein liquid extract from the wet pongamia bean cake (residual solids) may be employed to obtain the protein-enriched pongamia compositions. In some variations, solubilization may be employed to obtain the protein-enriched pongamia compositions. In some variations, isoelectric precipitation may be employed to obtain the protein-enriched pongamia compositions. In some variations, membrane filtration may be employed to obtain the protein-enriched pongamia compositions.

Solubilization

In one aspect, provided is a method of producing protein-enriched pongamia compositions from pongamia meal by solubilization. With reference to exemplary process 200 in FIG. 2A, in step 202, an aqueous slurry is prepared using a defatted debittered pongamia meal, and the pH is adjusted to an alkaline pH (e.g., between 8 and 10), for example with a suitable base, such as sodium hydroxide. In step 204, extraction of the pongamia protein is achieved by separating the alkaline protein liquid fraction from the insoluble wet cake fraction. In other variations of step 202, an aqueous slurry is prepared using a defatted debittered pongamia meal, and the pH is adjusted to a pH between 6 and 10, with a suitable acid or base, and the protein liquid fraction separated from the insoluble wet cake fraction.

Any suitable techniques known in the art may be used to achieve such separation. For example, such separation may be achieved using a decanter or centrifuge. A protein liquid is obtained, and in step 206, the pH of the protein liquid is neutralized by adjusting to about pH 7.0, for example; by addition of a suitable acid, such as hydrochloric acid or phosphoric acid. In step 208, the neutralized protein liquid is concentrated. In steps 210 and 212 the concentrated protein liquid undergoes pasteurization and spray drying, respectively, to obtain a protein-enriched pongamia composition. The neutralization, concentration and pasteurization steps are optionally included in the exemplary process.

In one aspect, provided herein is a method of producing a protein-enriched pongamia composition, comprising:

preparing an aqueous slurry of pongamia meal;

adjusting the pH of the aqueous slurry to a pH between 8 and 10;

separating the slum, into a protein liquid fraction and an insoluble wet cake fraction;

optionally neutralizing, concentrating and/or pasteurizing the protein liquid fraction; and drying the protein liquid to provide a protein-enriched pongamia composition.

In another aspect, provided herein is a method of producing a protein-enriched pongamia composition, comprising:

preparing an aqueous slurry of pongamia meal;

adjusting the pH of the aqueous slurry to a pH between 6 and 10;

separating the slurry into a protein liquid fraction and an insoluble wet cake fraction;

optionally neutralizing, concentrating and/or pasteurizing the protein liquid fraction; and drying the protein liquid to provide a protein-enriched pongamia composition.

In some embodiments, the step of preparing of the aqueous slurry may comprise combining pongamia meal with water. In some embodiments, the method further comprises agitating or mixing (e.g., under high shear) of the pongamia meal and water.

As discovered in the present disclosure, pongamia proteins are found to be highly soluble in basic aqueous media. The adjustment of the aqueous slurry comprising the pongamia meal to an alkaline pH facilitates the extraction, or solubilization, of pongamia proteins into solution. In some embodiments, the aqueous slurry is adjusted to a pH between 8 and 10. In other embodiments, the aqueous slurry is adjusted to a pH between 6 and 10.

The slurry is subsequently separated into an alkaline protein liquid fraction and an insoluble wet cake fraction in step 204. The separation may be achieved through solid-liquid separation techniques known in the art including for example decantation and centrifugation.

In some variations, steps 202 and 204 for adjusting the pH and separating out a protein liquid fraction may also be carried out one or more times on the wet cake fraction that is obtained to improve protein yield. That is to say, the pongamia meal may be subjected to several sequential iterations of solubilization as carried out on the residual insoluble wet cake fraction. For example, the wet cake may be prepared in a second aqueous slurry and adjusted to an alkaline pH, after which a second alkaline protein liquid fraction is separated from the insoluble cake fraction and the two liquid fractions combined. For repeated extractions, the pongamia meal can be prepared in an aqueous slurry and the pH adjusted to either an acidic pH (e.g., pH 2) or an alkaline pH (e.g., pH 8), the resulting pH-adjusted slurry separated into its protein liquid fraction and insoluble wet cake fraction, and the wet cake fraction prepared in a subsequent aqueous slurry that is subsequently adjusted to an alkaline pH and separated into an additional protein liquid fraction. Any protein liquid fractions obtained from sequential solubilizations are combined into a single protein liquid fraction prior to subsequent processing. In other variations, enzymes for digesting carbohydrates in the pongamia meal may be added to the aqueous slurry to facilitate solubilization of the proteins.

In some embodiments, the protein liquid fraction is neutralized to a pH of about pH 7. The protein liquid may be neutralized through the addition of suitable food grade acids, such as phosphoric acid or hydrochloric acid. In certain embodiments, neutralizing the protein liquid fraction comprises adding phosphoric acid or hydrochloric acid to the protein liquid fraction.

In other embodiments, the protein liquid fraction is concentrated after being neutralized. Concentration of the protein liquid fraction may involve reducing the volume of liquid in the protein liquid fraction for easier handling or downstream processing such as acid precipitation and/or membrane filtration.

In still yet other embodiments, the protein liquid fraction is pasteurized. Pasteurization is a standard food processing technique, in which products for consumption by humans are treated with mild heat, usually to less than 100° C. (212° F.), to eliminate pathogens and extend shelf life.

In still further embodiments, the protein liquid extract is dried to provide the final protein-enriched pongamia composition. The protein liquid extract may be dried by methods known in the art including, for example, spray-drying and/or lyophilization (e.g, freeze-drying).

In some variations, the protein-enriched pongamia composition obtained by the foregoing method is a pongamia protein concentrate. In certain variations, the protein-enriched pongamia composition has at least 40%, at least 50%, or between 50% and 70% of pongamia proteins on a dry weight basis. In other variations, the protein-enriched pongamia composition has at least 40% of pongamia proteins on a dry weight basis; and less than or equal to 40% of carbohydrates on a dry weight basis.

Immediate Precipitation

In another aspect, provided herein is a method of producing protein-enriched pongamia compositions from pongamia meal by precipitation without prior solubilization of pongamia proteins. By virtue of the immediate precipitation of pongamia proteins from the aqueous slurry of pongamia meal without prior solubilization, the method of the present aspect may allow for the recovery of a wider range of proteins from the pongamia meal including insoluble proteins, require fewer process steps overall, increase protein yield, and decrease water and energy use. Additionally, the recovery of a wider range of proteins in combination with the carbohydrate content of the compositions obtained by the present method may provide enhanced functionality for specific food applications.

In some embodiments of the present aspect, an aqueous slurry is prepared using a defatted debittered pongamia meal, and the pH is adjusted to an acidic pH (e.g., between 3 and 5, between 4 and 5, between pH 4 and 4.5) to induce precipitation of protein solids. The protein present in the pongamia meal is immediately precipitated out of solution as acid is added to the slurry. The precipitated protein is separated from the aqueous slurry. Any suitable techniques known in the art may be used to achieve such separation. For example, such separation may be achieved using a decanter or centrifuge.

The precipitated protein is washed with water and neutralized with base. The neutralized protein is then pasteurized and dried. Washing, neutralization, concentration and pasteurization of the proteins in the exemplary process described above are optional.

In one aspect, provided herein is a method of producing a protein-enriched pongamia composition, comprising:

preparing an aqueous slurry of pongamia meal;

adjusting the pH of the aqueous slurry to a pH between 4 and 5 to obtain pongamia protein solids;

washing, neutralizing, and pasteurizing purified protein solids; and drying the purified pongamia protein solids to provide a protein-enriched pongamia composition.

In another aspect, provided herein is a method of producing a protein-enriched pongamia composition, comprising:

preparing an aqueous slurry of pongamia meal;

adjusting the pH of the aqueous slurry to an acidic pH to obtain pongamia protein solids;

washing, neutralizing, and pasteurizing purified protein solids; and drying the purified pongamia protein solids to provide a protein-enriched pongamia composition.

As described above, pongamia proteins are precipitated from the aqueous slurry containing pongamia meal by adjusting the pH of the slurry to an acidic pH, such as between 3 and 5.5. In some embodiments, the pH of the protein liquid is adjusted to a pH of between 3 and 5.5, between 3 and 5, between 3 and 4.5, between 3 and 4, between 3 and 3.5, between 3.5 and 5.5, between 3.5 and 5, between 3.5 and 4.5, between 3.5 and 4, between 4 and 5.5, between 4 and 5, between 4 and 4.5, between 4.5 and 5.5, or between 4.5 and 5. In certain variations, the pH is adjusted to a pH between 4 and 4.5.

The pongamia protein solids are subsequently separated from the aqueous slurry. The separation may be achieved through solid-liquid separation techniques known in the art including for example decantation and centrifugation.

In certain variations, the method further comprises washing the solid purified pongamia proteins.

In some embodiments, the pongamia protein solids are neutralized to a pH of about pH 7. The purified pongamia protein solids may be neutralized through the addition of suitable food grade bases, such as sodium hydroxide. In certain embodiments, neutralizing the pongamia protein solids comprises adding sodium hydroxide to the purified pongamia protein solids.

In other embodiments, the purified pongamia protein solids are concentrated after being neutralized. It should be recognized that the neutralization of the purified pongamia protein solids may result in their partial or complete solubilization. Concentration of the purified pongamia protein solids may involve reducing the volume of liquid left over from precipitation or introduced during neutralization in the pongamia protein solids, by drying or decanting the purified pongamia protein solids introduced for easier handling or downstream processing.

In still yet other embodiments, the pongamia protein solids are pasteurized.

In still further embodiments, the pongamia protein solids are dried to provide the final protein-enriched pongamia composition. The pongamia protein solids may be dried by methods known in the art including, for example, spray-drying and/or lyophilization (e.g., freeze-drying).

In some variations, the protein-enriched pongamia composition obtained by the foregoing method is a pongamia protein concentrate. In certain variations, the protein-enriched pongamia composition has at least 40% or at least 50%; or between 40% and 50% or between 40% and 70%, of pongamia proteins on a dry weight basis. In other variations, the protein-enriched pongamia composition has at least 40% of pongamia proteins on a dry weight basis; and less than or equal to 50% of carbohydrates on a dry weight basis.

Isoelectric Precipitation

In one aspect, provided is a method of producing protein-enriched pongamia compositions from pongamia meal by isoelectric precipitation. With reference to exemplary process 300 in FIG. 2B, in step 302, an aqueous slurry is prepared using a defatted debittered pongamia meal, and the pH is adjusted to a pH between 8 and 10. In step 304, extraction of the pongamia protein is achieved by separating the alkaline protein liquid fraction from the insoluble wet cake fraction. Any suitable techniques known in the art may be used to achieve such separation. For example, such separation may be achieved using a decanter or centrifuge.

In other variations of step 302, an aqueous slurry is prepared using a defatted debittered pongamia meal, and the pH is adjusted to a pH between 6 and 10, with a suitable acid or base, and the protein liquid fraction separated from the insoluble wet cake fraction.

In some variations of step 302, the aqueous slurry may be adjusted to a pH between 6 and 10, and the protein liquid fraction isolated from the aqueous slurry. A protein liquid is obtained, and in step 306, isoelectric precipitation is employed to precipitate the bulk of alkaline-soluble pongamia proteins. In some variations, the isoelectric precipitation is performed at a that is at or below the isoelectric point of pongamia proteins (e.g., performed at a pH between 4.0 and 4.5). In step 306, the pH of the alkaline protein liquid fraction is adjusted to a pH between 4.0 and 4.5 by the addition an acid such as phosphoric acid or hydrochloric acid. The precipitated pongamia protein solids are collected. In step 308, the precipitated protein is washed. In step 310; the washed protein is neutralized by adjusting to about pH 7.0, for example with a base, such as sodium hydroxide. In step 312, the neutralized protein is concentrated. In steps 314 and 316, the concentrated protein liquid undergoes pasteurization and drying (e.g., by spray-drying or freeze-drying/lyophilization), respectively, to obtain a protein-enriched pongamia composition. Washing, neutralization, concentration and pasteurization of the proteins in the exemplary process described above are optional.

in one aspect, provided herein is a method of producing a protein-enriched pongamia composition, comprising:

preparing an aqueous slurry of pongamia meal;

adjusting the pH of the aqueous slurry to a pH between 8 and 10, separating the slurry into a protein liquid fraction and an insoluble wet cake fraction;

precipitating at least a portion of pongamia protein from the protein liquid fraction to obtain purified pongamia protein solids;

washing, neutralizing, and pasteurizing purified protein solids; and drying the purified pongamia protein solids to provide a protein-enriched pongamia composition.

In another aspect, provided herein is a method of producing a protein-enriched pongamia composition, comprising:

preparing an aqueous slurry of pongamia meal:

adjusting the pH of the aqueous slurry to a pH between 6 and 10, separating the slurry into a protein liquid fraction and an insoluble wet cake fraction;

precipitating at least a portion of pongamia protein from the protein liquid fraction to obtain purified pongamia protein solids;

washing, neutralizing, and pasteurizing purified protein solids; and drying the purified pongamia protein solids to provide a protein-enriched pongamia composition.

As described above, pongamia proteins are solubilized from the aqueous slurry containing pongamia meal by adjusting the pH of the slurry to an alkaline pH, such as between 8 and 10. In other variations, the pongamia proteins are solubilized from the aqueous slurry containing pongamia meal by adjusting the pH of the slurry to a pH between 6 and 10.

The slurry is subsequently separated into an alkaline protein liquid fraction and an insoluble wet cake fraction in step 304. The separation may be achieved through solid-liquid separation techniques known in the art including for example decantation and centrifugation.

in some variations; steps 302 and 304 for adjusting the pH and separating out a protein liquid fraction may also be carried out one or more times on the wet cake fraction that is obtained to improve protein yield. That is to say, the pongamia meal may be subjected to several sequential iterations of solubilization as carried out on the residual insoluble wet cake fraction. For example, the wet cake may be prepared in a second aqueous slurry and adjusted to an alkaline pH, after which a second alkaline protein liquid fraction is separated from the insoluble cake fraction and the two liquid fractions combined. For repeated extractions, the pongamia meal can be prepared in an aqueous slurry and the pH adjusted to either an acidic pH (e.g., pH 2) or an alkaline pH (e.g., pH 8), the resulting pH-adjusted slurry separated into its protein liquid fraction and insoluble wet cake fraction, and the wet cake fraction prepared in a subsequent aqueous slurry that is subsequently adjusted to an alkaline pH and separated into an additional protein liquid fraction. In some variations, protein liquid fractions obtained from sequential solubilizations may be combined into a single protein liquid fraction prior to subsequent processing. In some variations the solubilization is carried out by counter-current extraction. In other variations, enzymes for digesting carbohydrates (such as carbohydratases, including cellulases or amylases) in the pongamia meal may be added to the aqueous slurry to facilitate solubilization of the proteins. In some variations wherein enzymes for digesting carbohydrates are added to the aqueous slurry, the aqueous slurry may be heated to a temperature suitable to enable enzymatic activity, for example 37° C.

Figure 3:
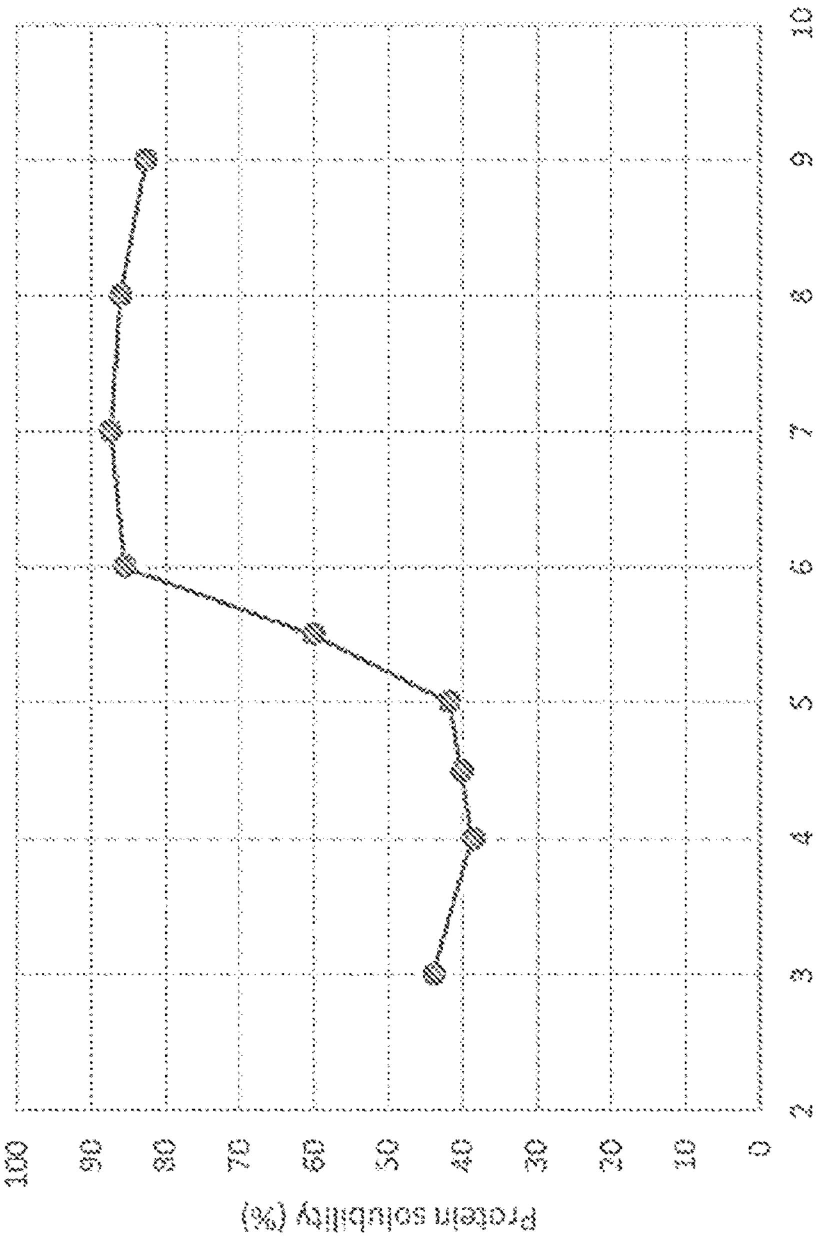
FIG. 3 depicts the solubility curve for pongamia protein present in a freeze-dried pongamia protein concentrate at varying pH values.

Isoelectric precipitation in step 306 may be carried out at a pH that is at or near the isoelectric point of pongamia proteins to provide pongamia protein solids from the protein liquid fraction. For example, as shown in FIG. 3, the solubility of pongamia proteins is substantially lower between pH 3 and pH 5.5. The addition of acid to the protein liquid obtained from step 304 to generate an acidic pH that is between 3 and 5.5 will precipitate out pongamia protein solids from solution. In some embodiments, the pH of the protein liquid is adjusted to a pH of between 3 and 5.5, between 3 and 5, between 3 and 4.5, between 3 and 4, between 3 and 3.5, between 3.5 and 5.5, between 3.5 and 5, between 3.5 and 4.5, between 3.5 and 4, between 4 and 5.5, between 4 and 5, between 4 and 4.5, between 4.5 and 5.5, or between 4.5 and 5.

In certain variations, the method further comprises washing the solid purified pongamia proteins.

In some embodiments, the pongamia protein solids are neutralized to a pH of about pH 7. The purified pongamia protein solids may be neutralized through the addition of suitable food grade bases, such as sodium hydroxide. In certain embodiments, neutralizing the pongamia protein solids comprises adding sodium hydroxide to the purified pongamia protein solids.

In other embodiments, the purified pongamia protein solids are concentrated after being neutralized. It should be recognized that the neutralization of the purified pongamia protein solids may result in their partial or complete re-solubilization. Concentration of the purified pongamia protein solids may involve reducing the volume of liquid left over from precipitation or introduced during neutralization in the pongamia protein solids, by drying or decanting the purified pongamia protein solids introduced for easier handling or downstream processing.

In still yet other embodiments, the pongamia protein solids are pasteurized.

In still further embodiments, the pongamia protein solids are dried to provide the final protein-enriched pongamia composition. The pongamia protein solids may be dried by methods known in the art including, for example, spray-drying and/or lyophilization (e.g., freeze-drying).

In some variations, the protein-enriched pongamia composition obtained by the foregoing method is a pongamia protein isolate. In certain variations, the protein-enriched pongamia composition has at least 70%, or between 70% and 90% of pongamia proteins on a dry weight basis. In other variations, the protein-enriched pongamia composition has at least 70% of pongamia proteins on a dry weight basis; and less than or equal to 20% of carbohydrates on a dry weight basis.

Membrane Filtration

In yet another aspect, provided is a method of producing protein-enriched pongamia compositions from pongamia meal by membrane filtration. With reference to exemplary process 400 in FIG. 2C, in step 402, an aqueous slurry is prepared using a defatted debittered pongamia meal, and the pH is adjusted to a pH between 6 and 10 (e.g., pH 8 and 10). In step 404, extraction of the pongamia protein is achieved by separating the (alkaline) protein liquid fraction from the insoluble wet cake fraction. Any suitable techniques known in the art may be used to achieve such separation. For example, such separation may be achieved using a decanter or centrifuge. A protein liquid is obtained, and in step 406, the protein liquid undergoes membrane filtration to obtain a retentate of the purified pongamia protein. With reference again to FIG. 2C, in steps 408, 410, 412, and 414, the retentate is washed, neutralized, pasteurized and dried, respectively, to produce a protein-enriched pongamia composition.

In one aspect, provided herein is a method of producing a protein-enriched pongamia composition, comprising:

- preparing an aqueous slurry of pongamia meal;
- adjusting the pH of the aqueous slurry to a pH between 6 and 10,
- separating the protein liquid fraction of the aqueous slurry,
- passing the isolated protein liquid fraction through a membrane system to obtain a retentate comprising pongamia protein;
- optionally washing, neutralizing and/or pasteurizing the retentate; and
- drying the retentate to provide a protein-enriched pongamia composition.

In yet another aspect, provided herein is a method of producing a protein-enriched pongamia composition, comprising:

- preparing an aqueous slurry of pongamia meal;
- adjusting the pH of the aqueous slurry to a pH between 8 and 10,
- separating the protein liquid fraction of the aqueous slurry, passing the isolated protein liquid fraction through a membrane system to obtain a retentate comprising pongamia protein;

optionally washing, neutralizing and/or pasteurizing the retentate; and drying the retentate to provide a protein-enriched pongamia composition.

As described above, pongamia proteins are solubilized from the aqueous slurry containing pongamia meal. In one aspect, the pongamia proteins are solubilized from the aqueous slurry containing pongamia meal at a pH between 6 and 10. In other aspects, the pongamia proteins are solubilized from the aqueous slurry containing pongamia meal by adjusting the pH of the slurry to an alkaline pH, such as between 8 and 10.

The slurry is subsequently separated into an alkaline protein liquid fraction and an insoluble wet cake fraction in step 404. The separation may be achieved through solid-liquid separation techniques known in the art including for example decantation and centrifugation.

In some variations, steps 402 and 404 for adjusting the pH and separating out a protein liquid fraction may also be carried out one or more tunes on the wet cake fraction that is obtained to improve protein yield. That is to say, the pongamia meal may be subjected to several sequential iterations of solubilization as carried out on the residual insoluble wet cake fraction. For example, the wet cake may be prepared in a second aqueous slurry and adjusted to an alkaline pH, after which a second alkaline protein liquid fraction is separated from the insoluble cake fraction and the two liquid fractions combined. For repeated extractions, the pongamia meal can be prepared in an aqueous slurry and the pH kept as-is or adjusted to either an acidic pH (e.g., pH 2) or an alkaline pH (e.g., pH 8), the resulting as-is or pH-adjusted slurry separated into its protein liquid fraction and insoluble wet cake fraction, and the wet cake fraction prepared in a subsequent aqueous slurry that is subsequently adjusted to an alkaline pH and separated into an additional protein liquid fraction. Any protein liquid fractions obtained from sequential solubilizations are combined into a single protein liquid fraction prior to subsequent processing. In other variations, enzymes for digesting carbohydrates in the pongamia meal may be added to the aqueous slurry to facilitate solubilization of the proteins.

With reference to FIG. 2C, in step 406, the protein liquid fraction is passed through a membrane system for filtration. Membrane filtration may be carried out using variable membranes of different cut-off sizes, variable transmembrane pressures and concentration factors and diafiltration factors. In some variations, the protein liquid is passed through a 5 kDa molecular weight cut-off (MWCO) membrane filter or a 10 kDa MWCO membrane filter. In certain variations, the protein liquid is passed through a 5 kDa MWCO membrane filter. In certain other variations, the protein liquid is passed through a 10 kDa MWCO membrane filter. In yet further variations, the protein liquid is passed through a 5 kDa MWCO membrane filter or a 10 kDa MWCO membrane filter at a concentration factor (CF) of 0-5, 0-4, 0-2, 2-5, 2-4, or 4-5, and a diafiltration factor (DF) of 0-10, 0-5, 0-4, 0-2, 2-10, 2-5, 2-4, 4-10, or 4-5.

The resulting protein-enriched retentate from membrane filtration may be further optionally washed, neutralized and/or pasteurized. In certain variations, the method further comprises washing the retentate.

In some embodiments, the retentate is neutralized to a pH of about pH 7. The retentate may be neutralized through the addition of suitable food grade acids or bases, such as phosphoric acid or hydrochloric acid and sodium hydroxide. In certain embodiments, neutralizing the retentate comprises adding phosphoric acid or hydrochloric acid and/or sodium hydroxide to the retentate.

In still yet other embodiments, the retentate is pasteurized.

In still further embodiments, the retentate is dried to provide the final protein-enriched pongamia composition. The pongamia protein solids may be dried by methods known in the art including, for example, spray-drying and/or lyophilization (e.g, freeze-drying).

In some variations, the protein-enriched pongamia composition obtained by the foregoing method is a pongamia protein isolate. In certain variations, the protein-enriched pongamia composition has at least 70%, or between 70% and 95% of pongamia proteins on a dry weight basis. In other variations, the protein-enriched pongamia composition has at least 70% of pongamia proteins on a dry weight basis; and less than or equal to 20% of carbohydrates on a dry weight basis.

Food, Beverage and Other Products

In certain aspects, provided are also food and beverage products incorporating or produced using the protein-enriched pongamia compositions herein. Such protein-enriched pongamia compositions may be used for protein fortification in various food and beverage products, including for example, in juice based high acid beverages, allergen-free non-dairy low acid beverages, plant-based yogurts, plant-based ice-creams, bakery products, baked snacks, cream soups, meat analogs, and cheese analogs.

In some embodiments, suitable food products may include, for example, soups, sauces, salad dressings, hummus, breads, cookies, crackers, nutritional bars, meal replacement products, and snacks. In some variations, the food product incorporating or produced from the protein-enriched pongamia compositions herein is a bakery product.

In some embodiments, beverages may include, for example, high-acid beverages, neutral beverages, carbonated beverages, non-carbonated beverages, high protein beverages, and meal replacement beverages.

In one aspect, provided herein is a food product, a beverage product, a dietary supplement product or other product, comprising a protein-enriched pongamia ingredient as provided herein, wherein the protein-enriched pongamia ingredient has (i) a viscosity of between about 2 mPa*s and about 100 mPa.*s at a shear rate of 100 $s^{-1}$;

(ii) a foaming capacity of between about 100% and about 200% of volume of 0.1% w/v protein solution;

(iii) a bulk density of at least about 0.2 g/$cm^3$;

(iv) a protein solubility of at least about 35% at pH 7:

(v) a median emulsion droplet size of less than or equal to about 5 μm:

(vi) a median emulsion droplet size of less than or equal to about 5 μm after 7 days of storage;

(vi) a water-holding, capacity of at least about 1.5 g water per gram of protein-enriched pongamia ingredient:

(vii) an oil-holding capacity of at least about 1.5 g oil per gram of protein-enriched pongamia ingredient:

(viii) a minimum gelling concentration of at least about 10 g protein-enriched pongamia ingredient per 100 grams:

(ix) a powder dispersibility of at least about 10%; or (x) a neutral, non-hitter taste;

or any combinations of (i)-(x) thereof.

As described herein, the properties of the protein-enriched pongamia compositions may be used as ingredients in various food applications. The protein-enriched pongamia compositions, or ingredients, as provided herein possess a number of favorable properties in addition to their high protein content; which makes them suitable for a wide-array of food and beverage products. With respect to certain applications, the protein-enriched pongamia ingredients provided herein demonstrate superior properties as compared to other plant-based protein ingredients in the market (such as pea and soy), and thus may be advantageously incorporated into specific food products over competitor protein sources. Exemplary products may include but are not limited to beverage products such as ready-to-drink beverages or protein shake powders, dairy product substitutes including plant-based yogurt, cheese or milks, meat substitute products such as plant-based burgers, and egg substitutes.

In yet other embodiments, provided herein is a beverage product, comprising a protein-enriched pongamia ingredient, wherein the protein-enriched pongamia ingredient has:

(i) a viscosity of between about 2 mPa*s and about 100 mPa*s at a shear rate of 100 $s^{-1}$;
(ii) a foaming capacity of between about 100% and about 200% of volume of 0.1% w/v pongamia protein solution;
(iii) a bulk density of at least about 0.2 $g/cm^3$;
(iv) a protein solubility of at least about 35% at pH 7:
(v) a median emulsion droplet size of less than or equal to about 5 μm:
(vi) a median emulsion droplet size of less than or equal to about 5 μm after 7 days of storage;
(vii) a neutral, non-bitter taste;
or any combinations of (i)-(vii) thereof.

In still yet other embodiments, provided herein is a dairy product substitute, comprising a protein-enriched pongamia ingredient, wherein the protein-enriched pongamia ingredient has:

(i) a viscosity of between about 2 mPa*s and about 100 mPa*s at a shear rate of 100 $s^{-1}$;
(ii) a foaming capacity of between about 100% and about 200% of volume of 0.1% w/v protein solution;
(iii) a hulk density of at least about 0.2 $g/cm^3$;
(iv) a protein solubility of at least about 35% at pH 7;
(v) a median emulsion droplet size of less than or equal to about 5 μm;
(vi) a median emulsion droplet size of less than or equal to about 5 μm after 7 days of storage;
(vii) a water-holding capacity of at least about 1.5 g water per gram-of protein-enriched pongamia ingredient;
(viii) a minimum gelling concentration of at least about 10 g protein-enriched pongamia ingredient per 100 grams; or
(ix) a neutral, non-bitter taste or
or any combination of (i)-(x) thereof.

In some embodiments, provided herein is a meat substitute product, comprising a protein-enriched pongamia ingredient, wherein the protein-enriched pongamia ingredient has:

(i) a bulk density of at least about 0.2 $g/cm^3$;
(ii) a protein solubility of at least about 35% at pH 7;
(iii) a water-holding capacity of at least about 1.5 g water per gram of protein-enriched pongamia ingredient:
(iv) an oil-holding capacity of at least about 1.5 g oil per gram of protein-enriched pongamia ingredient;
(v) a minimum gelling concentration of at least about 10 g protein-enriched pongamia ingredient per 100 grams; or
(vi) a neutral, non-bitter taste;
or any combination of (i)-(vi) thereof.

In other aspects, provided herein is an egg-substitute, comprising a protein-enriched pongamia ingredient, wherein the protein-enriched pongamia ingredient has:

(i) a foaming capacity of between about 100% and about 200% of volume of 0.1% w/v protein solution;
(ii) a minimum gelling concentration of at least about 7 g protein-enriched pongamia ingredient per 100 grams; or
(iii) a neutral, non-bitter taste;
or any combination of (i)-(iii) thereof.

In some variations of the foregoing, the food or beverage products have at least 1, at least 2, at least 3, at least 4, at least 5, at least 6, at least 7, at least 8, at least 9, at least 10 grams, at least 12 g, at least 15 g, or at least 17 g of pongamia protein per serving. In some variations, the food or beverage products have between 1 g and 20 g of pongamia protein per serving. In certain variations, at least 10%, at least 20%, at least 25%, at least 30%, at least 40%, at least 50%, at least 60%, at least 70%, at least 75%, at least 80%, at least 90%, or at least 95% by weight of the protein in the food or beverage product is from pongamia protein. In some variations of the foregoing, the pongamia protein has a PDCAAS of at least 0.7. In other variations of the foregoing, the pongamia protein has a PDCAAS of at least 0.85.

The food and beverages products can include various other components other than the protein-enriched pongamia compositions described herein. For example, the food and beverage products may include, for example, water, flour, fats and oils, sweeteners (such as sugar), salt, leavening agents, fruit and vegetable juices, thickeners (such as pectin and other hydro colloids), anti-foaming agents, natural and artificial flavorings, preservatives, and coloring agents.

In another aspect, provided is a method of preparing food and/or beverages products. Such methods may include one or more of mixing/blending, pasteurizing and/or sterilizing, baking, fermenting, carbonating, leavening, and packaging.

In other aspects, the protein-enriched pongamia compositions herein may be used as or incorporated into pharmaceutical products. In certain variations of the foregoing aspect, the protein-enriched pongamia compositions have a pharmaceutical-grade purity. In other variations, the protein-enriched pongamia compositions have a protein purity of greater than or equal to 99%.

In other aspects, the protein-enriched pongamia compositions herein may be used as or incorporated into dietary supplement products. In certain variations of the foregoing aspect, the protein-enriched pongamia compositions have a dietary supplement-grade purity. In other variations, the protein-enriched pongamia compositions have a protein purity of greater than or equal to 99%.

In other aspects, the protein-enriched pongamia compositions herein may be used as or incorporated into cosmetic products. In certain variations of the foregoing aspect, the protein-enriched pongamia compositions have a cosmetic-grade purity. In other variations, the protein-enriched pongamia compositions have a protein purity of greater than or equal to 99%.

In other aspects, the protein-enriched pongamia compositions herein may be used as or incorporated into medical foods. In certain variations of the foregoing aspect, the protein-enriched pongamia compositions have a medical food-grade purity. In other variations, the protein-enriched pongamia compositions have a protein purity of greater than or equal to 99%.

In other aspects, the protein-enriched pongamia compositions herein may be used as or incorporated into infant formula products. In certain variations of the foregoing aspect, the protein-enriched pongamia compositions have an infant formula-grade purity. In other variations, the protein-enriched pongamia compositions have a protein purity of greater than or equal to 99%.

ENUMERATED EMBODIMENTS

The following enumerated embodiments are representative of some aspects of the invention.

1. A protein-enriched pongamia composition, comprising at least 45% of pongamia proteins on a dry weight basis.
2. The composition of embodiment 1, wherein the composition has between 45% and 70% of pongamia proteins on a dry weight basis.
3. The composition of embodiment 1, wherein the composition is a pongamia protein concentrate.
4. The composition of any one of embodiments 1 to 3, wherein the composition is derived from pongamia meal, wherein the protein-enriched pongamia composition has at least 1.25 times greater pongamia protein content than the pongamia meal.
5. The composition of any one of embodiments 1 to 4, wherein the composition has less than 5% of fat on a dry weight basis.
6. The composition of any one of embodiments 1 to 5, wherein the composition has less than 2% of fat on a dry weight basis.
7. The composition of any one of embodiments 1 to 6, wherein the composition has less than 200 ppm of bitter compounds naturally derived from pongamia.
8. The composition of any one of embodiments 1 to 6, wherein the composition has: (i) less than 200 ppm of karanjin; or (ii) less than 200 ppm of pongamol; or (iii) less than 200 ppm of karanjin and pongamol combined.
9. The composition of any one of embodiments 1 to 8, wherein the composition has a relative amino acid profile that includes at least 15% glutamic acid, at least 12% aspartic acid, at least 9% leucine, at least 8% lysine, at least 6% phenylalanine, or any combination thereof.
10. The composition of any one of embodiments 1 to 9, wherein the at least 50% of the proteins present in the composition are soluble in water at a pH of at least pH 6.
11. The composition of any one of embodiments 1 to 10, wherein the composition has a viscosity of at least 2 mPa*s at a shear rate of 100 $s^{-1}$.
12. The composition of any one of embodiments 1 to 11, wherein the composition, when emulsified, produces an emulsion having an average droplet size of at least 1 μm.
13. The composition of any one of embodiments 1 to 12, wherein the composition has a protein digestibility-corrected amino acid score of at least 0.7.
14. The composition of any one of embodiments 1 to 13, wherein the composition has an average molecular weight distribution of protein between 10,000 Daltons and 250,000 Daltons.
15. A method of producing a protein-enriched pongamia composition, comprising:
    - preparing an aqueous slurry of pongamia meal;
    - adjusting the pH of the aqueous slurry to a pH between 8 and 10;
    - separating the slurry into a protein liquid fraction and an insoluble wet cake fraction;
    - neutralizing; concentrating and/or pasteurizing the protein liquid fraction; and
    - drying the protein liquid fraction to provide a protein-enriched pongamia composition.
16. The method of embodiment 15, wherein the protein-enriched pongamia composition comprises at least 50% of pongamia proteins on a thy weight basis.
17. The method of embodiment 15, wherein the protein-enriched pongamia composition is a pongamia protein concentrate.
18. The method of any one of embodiments 15 to 17, further comprising dehulling and grinding pongamia beans to produce the pongamia meal.
19. The method of any one of embodiments 15 to 17, further comprising:
    - dehulling pongamia beans to produce dehulled pongamia beans; and
    - pressing the dehulled pongamia beans to remove at least a portion of free oil in the pongamia beans to produce the pongamia meal, wherein the pongamia meal has a reduced fat content.
20. The method of embodiment 19, further comprising grinding the pongamia meal.
21. The method of any one of embodiments 15 to 17, further comprising:
    - dehulling pongamia beans to produce dehulled pongamia beans;
    - pressing the dehulled pongamia beans to remove at least a portion of free oil in the pongamia beans to produce a reduced fat pongamia meal; and
    - combining the reduced fat pongamia meal with solvent to produce the pongamia meal, wherein the pongamia meal is defatted and debittered.
22. The method of embodiment 21, further comprising grinding the reduced fat pongamia meal prior to combining with solvent.
23. A protein-enriched pongamia composition produced according the method of any one of embodiments 15 to 22.
24. A food product, a beverage product, a dietary supplement product, or other product, comprising: the protein-enriched pongamia composition of any one of embodiments 1 to 14 and 23.
25. The product of embodiment 24, wherein the product is a baked good, a protein supplement, a protein bar, or a non-dairy beverage.
26. The product of embodiment 24, wherein the product is a medical food, an infant formula, a cosmetic or a pharmaceutical product.
27. A protein-enriched pongamia composition, comprising at least 70% of pongamia proteins on a dry weight basis.
28. The composition of embodiment 27, wherein the composition has between 70% and 90% of pongamia proteins on a dry weight basis.
29. The composition of embodiment 27, wherein the composition is a pongamia protein isolate.
30. The composition of any one of embodiments 27 to 29, wherein the composition is derived from pongamia meal, wherein the protein-enriched pongamia composition has at least 1.25 times greater pongamia protein content than the pongamia meal.
31. The composition of any one of embodiments 27 to 30, wherein the composition has less than 5% of fat on a dry weight basis.
32. The composition of any one of embodiments 27 to 31, wherein the composition has less than 2% of fat on a dry weight basis.
33. The composition of any one of embodiments 27 to 32, wherein the composition has less than 200 ppm of bitter compounds naturally derived from pongamia.
34. The composition of any one of embodiments 27 to 33, wherein the composition has (i) less than 200 ppm of karanjin; or (ii) less than 200 ppm of pongamol, or (iii) less than 200 ppm of karanjin and pongamol combined.
35. The composition of any one of embodiments 27 to 34, wherein the composition has a relative amino acid profile that includes at least 15% glutamic acid, at least 12% aspartic acid, at least 9% leucine, at least 8% lysine, at least 6% phenylalanine, or any combination thereof.

36. The composition of any one of embodiments 27 to 35, wherein the at least 50% of the proteins present in the composition are soluble in water at a pH of at least pH 6.

37. The composition of any one of embodiments 27 to 36, wherein the composition has a viscosity of at least 2 mPa*s at a shear rate of 100 $s^{-1}$.

38. The composition of any one of embodiments 27 to 37, wherein the composition, when emulsified, produces an emulsion having an average droplet size of at least 1 μm.

39. The composition of any one of embodiments 27 to 38, wherein the composition has a protein digestibility-corrected amino acid score of at least 0.7.

40. The composition of any one of embodiments 27 to 39, wherein the composition has an average molecular weight distribution of protein between 10,000 Daltons and 250,000 Daltons.

41. A method of producing a protein-enriched pongamia composition, comprising:
   preparing an aqueous slurry of pongamia meal;
   adjusting the pH of the aqueous slurry to a pH between 8 and 10,
   separating the slurry into a protein liquid fraction and an insoluble wet cake fraction;
   precipitating at least a portion of pongamia protein from the protein liquid fraction to obtain purified pongamia protein solids;
   neutralizing and pasteurizing the purified pongamia protein solids; and
   drying the purified pongamia protein solids to provide a protein-enriched pongamia composition.

42. The method of embodiment 41, further comprising washing the pongamia protein solids prior to drying.

43. The method of embodiment 41 or 42, wherein the precipitation step is performed by isoelectric precipitation.

44. The method of any one of embodiments 41 to 43, wherein the protein-enriched pongamia composition comprises at least 70% of pongamia proteins on a dry weight basis.

45. The method of any one of embodiments 41 to 43, wherein the protein-enriched pongamia composition is a pongamia protein isolate.

46. The method of any one of embodiments 41 to 45, further comprising dehulling and grinding pongamia beans to produce the pongamia meal.

47. The method of any one of embodiments 41 to 45, further comprising:
   dehulling pongamia beans to produce dehulled pongamia beans; and
   pressing the dehulled pongamia beans to remove at least a portion of free oil in the pongamia beans to produce the pongamia meal, wherein the pongamia meal has a reduced fat content.

48. The method of embodiment 47, further comprising grinding the pongamia meal.

49. The method of any one of embodiments 41 to 45, further comprising:
   dehulling pongamia beans to produce dehulled pongamia beans;
   pressing the dehulled pongamia beans to remove at least a portion of free oil in the pongamia beans to produce a reduced fat pongamia meal and
   combining the reduced fat pongamia meal with solvent to produce the pongamia meal, wherein the pongamia meal is defatted and debittered.

50. The method of embodiment 49, further comprising grinding the reduced fat pongamia meal prior to combining with solvent.

51. A protein-enriched pongamia composition produced according the method of any one of embodiments 41 to 50.

52. A food product, a beverage product, a dietary supplement product, or other product, comprising: the protein-enriched pongamia composition of any one of embodiments 27 to 40 and 51.

53. The product of embodiment 52, wherein the product is a baked good, a protein supplement, a protein bar, or a non-dairy beverage.

54. The product of embodiment 52, wherein the product is a medical food, an infant formula, or a pharmaceutical product.

55. A protein-enriched pongamia composition, comprising at least 70% of pongamia proteins on a dry weight basis.

56. The composition of embodiment 55, wherein the composition has between 70% and 90% of pongamia proteins on a dry weight basis.

57. The composition of embodiment 55, wherein the composition is a pongamia protein isolate.

58. The composition of any one of embodiments 55 to 57, wherein the composition is derived from pongamia meal, wherein the protein-enriched pongamia composition has at least 1.25 times greater pongamia protein content than the pongamia meal.

59. The composition of any one of embodiments 55 to 58, wherein the composition has less than 5% of fat on a dry weight basis.

60. The composition of any one of embodiments 55 to 59, wherein the composition has less than 2% of fat on a dry weight basis.

61. The composition of any one of embodiments 55 to 60, wherein the composition has less than 200 ppm of bitter compounds naturally derived from pongamia.

62. The composition of any one of embodiments 55 to 61, wherein the composition has (i) less than 200 ppm of karanjin; or (ii) less than 200 ppm of pongamol; or (iii) less than 200 ppm of karanjin and pongamol combined.

63. The composition of any one of embodiments 55 to 62, wherein the composition has a relative amino acid profile that includes at least 15% glutamic acid, at least 12% aspartic acid, at least 9% leucine, at least 8% lysine, at least 6% phenylalanine, or any combination thereof.

64. The composition of any one of embodiments 55 to 63, wherein the at least 50% of the proteins present in the composition are soluble in water at a pH of at least pH 6.

65. The composition of any one of embodiments 55 to 64, wherein the composition has a viscosity of at least 2 mPa*s at a shear rate of 100 $s^{-1}$.

66. The composition of any one of embodiments 55 to 65, wherein the composition, when emulsified, produces an emulsion having an average droplet size of at least 1 μm.

67. The composition of any one of embodiments 55 to 66, wherein the composition has a protein digestibility-corrected amino acid score of at least 0.7.

68. The composition of any one of embodiments 55 to 67, wherein the composition has an average molecular weight distribution of protein between 10,000 Daltons and 250,000 Daltons.

69. A method of producing a protein-enriched pongamia composition, comprising:
   preparing an aqueous slurry of pongamia meal;
   adjusting the pH of the aqueous slurry to a pH between 8 and 10, separating the slurry into a protein liquid fraction and an insoluble wet cake fraction;

passing the protein liquid fraction through a membrane system to obtain a retentate comprising pongamia protein;

optionally washing, neutralizing and/or pasteurizing the retentate; and drying the retentate to provide a protein-enriched pongamia composition.

70. The method of embodiment 69, wherein the protein-enriched pongamia composition comprises at least 70% of pongamia proteins on a dry weight basis.

71. The method of embodiment 69, wherein the protein-enriched pongamia composition is a pongamia protein isolate.

72. The method of any one of embodiments 69 to 71 further comprising dehulling and grinding pongamia beans to produce the pongamia meal.

73. The method of any one of embodiments 69 to 71, further comprising:

dehulling pongamia beans to produce dehulled pongamia beans; and pressing the dehulled pongamia beans to remove at least a portion of free oil in the pongamia beans to produce the pongamia meal, wherein the pongamia meal has a reduced fat content.

74. The method of embodiment 73, further comprising grinding the pongamia meal.

75. The method of any one of embodiments 69 to 71, further comprising:

dehulling pongamia beans to produce dehulled pongamia beans;

pressing the dehulled pongamia beans to remove at least a portion of free oil in the pongamia beans to produce a reduced fat pongamia meal; and combining the reduced flit pongamia meal with solvent to produce the pongamia meal, wherein the pongamia meal is defatted and debittered.

76. The method of embodiment 75, further comprising grinding the reduced fat pongamia meal prior to combining with solvent.

77. A protein-enriched pongamia composition produced according the method of any one of embodiments 69 to 76.

78. A food product, a beverage product, a dietary supplement product or other product, comprising: the protein-enriched pongamia composition of any one of embodiments 55 to 68 and 77.

79. The product of embodiment 78, wherein the product is a baked good, a protein supplement, a protein bar, or a non-dairy beverage.

80. The product of embodiment 78, wherein the product is a medical food, an infant formula, a cosmetic or a pharmaceutical product.

81. A protein-enriched pongamia ingredient, comprising at least 40% of pongamia proteins on a dry weight basis, wherein the ingredient has: (i) less than 500 ppm of karanjin, or (ii) less than 500 ppm of pongamol; or (iii) less than 500 ppm of karanjin and pongamol combined; and wherein the ingredient has less than 40% of carbohydrates on a dry weight basis.

82. The ingredient of embodiment 81, wherein the ingredient has between 40% and 70% of pongamia proteins on a dry weight basis.

83. The ingredient of embodiment 81, wherein the ingredient is a pongamia protein concentrate.

84. The ingredient of embodiment 81, comprising at least 70% of pongamia proteins on a dry weight basis, wherein the ingredient has: (i) less than 500 ppm of karanjin; or (ii) less than 500 ppm of pongamol; or (iii) less than 500 ppm of karanjin and pongamol combined; and wherein the ingredient has less than or equal to about 20% of carbohydrates on a dry weight basis.

85. The ingredient of embodiment 84, wherein the ingredient has between 70% and 90% of pongamia proteins on a dry weight basis.

86. The ingredient of embodiment 85, wherein the ingredient is a pongamia protein isolate.

87. A protein-enriched pongamia ingredient, comprising at least 40% of pongamia proteins on a dry weight basis, wherein the ingredient has: (i) less than 500 ppm of karanjin; or (ii) less than 500 ppm of pongamol; or (iii) less than 500 ppm of karanjin and pongamol combined; and wherein the ingredient has less than 50% of carbohydrates on a dry weight basis.

88. The ingredient of any one of embodiments 81 to 87, wherein the ingredient is derived from pongamia meal, wherein the protein-enriched pongamia ingredient has at least 1.25 times greater pongamia protein content than the pongamia meal.

89. The ingredient of any one of embodiments 81 to 88, wherein the ingredient has less than 5% of fat on a dry weight basis.

90. The ingredient of any one of embodiments 81 to 89, wherein the ingredient has less than 2% of fat on a dry weight basis.

91. The ingredient of any one of embodiments 81 to 90, wherein the ingredient has a relative amino acid profile that includes at least 15% glutamic acid, at least 12% aspartic acid, at least 9% leucine, at least 8% lysine, at least 6% phenylalanine, or any combination thereof.

92. The ingredient of any one of embodiments 81 to 91, wherein the at least 35% of the proteins present in the ingredient are soluble in water at a pH of at least pH 6.

93. The ingredient of any one of embodiments 81 to 92, wherein the ingredient has a viscosity of at least 2 mPa*s at a shear rate of 100 $s^{-1}$.

94. The ingredient of any one of embodiments 81 to 93, wherein the ingredient, when emulsified, produces an emulsion having an average droplet size of at least 1 μm.

95. The ingredient of any one of embodiments 81 to 94, wherein the ingredient has a protein digestibility-corrected amino acid score of at least 0.7.

96. The ingredient of any one of embodiments 81 to 95, wherein the ingredient has an average molecular weight of protein between 10,000 Daltons and 250,000 Daltons.

97. The ingredient of any one of embodiments 81 to 96, wherein the ingredient comprises seed storage proteins, and wherein 30-40% of the proteins present are proteins having a molecular weight of between 45 kDa and about 70 kDa, as determined by SDS-PAGE.

98. The ingredient of embodiment 97, wherein the ingredient further comprises seed storage proteins having molecular weight of 170-250 kDa, 115-160 kDa, 45-70 kDa, 19-25 kDa, 14-17 kDa, or 10-13 kDa, or any combinations thereof.

99. The ingredient of any one of embodiments 81 to 98, wherein the ingredient has:

(i) a viscosity of between 2 mPa*s and 100 mPa*s at a shear rate of 100 $s^{-1}$;

(ii) a foaming capacity of between 100% and 200% of volume of 0.1% protein solution;
(iii) a bulk density of at least 0.2 g/cm$^3$;
(iv) a protein solubility of at least 35% at pH 7;
(v) a median emulsion droplet size of less than or equal to 5 μm;
(vi) a median emulsion droplet size of less than or equal to 5 μm after 7 days of storage;
(vi) a water-holding capacity of at least 1.5 g water per gram of protein-enriched pongamia ingredient;
(vii) an oil-holding capacity of at least 1.5 g oil per gram of protein-enriched pongamia ingredient;
(viii) a minimum gelling concentration of at least 10 g protein-enriched pongamia ingredient per 100 grams;
(ix) a powder dispersibility of at least 10%; or
(x) a neutral, non-hitter taste;
or any combinations of (i)-(x) thereof.

100. The ingredient of embodiment 99, wherein the ingredient has:
(i) a viscosity of between 2 mPa*s and 100 mPa*s at a shear rate of 100 s$^{-1}$;
(ii) a foaming capacity of between 100% and 200% of volume of 0.1% w/v pongamia protein solution;
(iii) a bulk density of at least 0.2 g/cm$^3$;
(iv) a protein solubility of at least 35% at pH 7;
(v) a median emulsion droplet size of less than or equal to 5 μm;
(vi) a median emulsion droplet size of less than or equal to 5 μm after 7 days of storage;
(vii) a neutral, non-bitter taste;
or any combinations of (i)-(vii) thereof.

101. The ingredient of embodiment 99, wherein the ingredient has:
(i) a viscosity of between 2 mPa*s and 100 mPa*s at a shear rate of 100 s$^{-1}$;
(ii) a foaming capacity of between 100% and 200% of volume of 0.1% w/v protein solution
(iii) a bulk density of at least 0.2 g/cm$^3$;
(iv) a protein solubility of at least 35% at pH 7;
(v) a median emulsion droplet size of less than or equal to 5 μm;
(vi) a median emulsion droplet size of less than or equal to 5 μm after 7 days of storage;
(vii) a water-holding capacity of at least 1.5 g water per gram of protein-enriched pongamia ingredient;
(viii) a minimum gelling concentration of at least 10 g protein-enriched pongamia ingredient per 100 grams; or
(ix) a neutral, non-bitter taste or
or any combination of (i)-(x) thereof.

102. The ingredient of embodiment 99, wherein the ingredient has:
(i) a bulk density of at least 0.2 g/cm$^3$;
(ii) a protein solubility of at least 35% at pH 7;
(iii) a water-holding capacity of at least 1.5 g water per gram of protein-enriched pongamia ingredient;
(iv) an oil-holding capacity of at least 1.5 g oil per gram of protein-enriched pongamia ingredient;
(v) a minimum gelling concentration of at least 10 g protein-enriched pongamia ingredient per 100 grams; or
(vi) a neutral, non-bitter taste;
or any combination of (i)-(vi) thereof.

103. The ingredient of embodiment 99, wherein the ingredient has:
(i) a foaming capacity of between 100% and 200% of volume of 0.1% w/v protein solution;
(ii) a minimum gelling concentration of at least 7 g protein-enriched pongamia ingredient per 100 grams; or
(iii) a neutral, non-bitter taste;
or any combination of (i)-(iii) thereof.

104. A method of producing a protein-enriched pongamia composition, comprising:
preparing an aqueous slurry of pongamia meal, wherein the pongamia meal is defatted and debittered and has (i) less than 500 ppm of karanjin; or (ii) less than 500 ppm of pongamol; or (iii) less than 500 ppm of karanjin and pongamol combined:
adjusting the pH of the aqueous slurry to a pH between 6 and 10;
separating the slurry into a protein liquid fraction and an insoluble wet cake fraction;
neutralizing, concentrating and/or pasteurizing the protein liquid fraction; and
drying the protein liquid fraction to provide a protein-enriched pongamia composition.

105. The method of embodiment 104, wherein the protein-enriched pongamia composition comprises at least 50% of pongamia proteins on a dry weight basis.

106. A method of producing a protein-enriched pongamia ingredient, comprising:
preparing an aqueous slurry of pongamia meal, wherein the pongamia meal is defatted and debittered and has (i) less than 500 ppm of karanjin; or (ii) less than 500 ppm of pongamol; or (iii) less than 500 ppm of karanjin and pongamol combined;
adjusting the pH of the aqueous slurry to a pH between 6 and 10,
separating the slurry into a protein liquid fraction and an insoluble wet cake fraction;
precipitating at least a portion of pongamia protein from the protein liquid fraction to obtain purified pongamia protein solids;
neutralizing and pasteurizing the purified pongamia protein solids; and
drying the purified pongamia protein solids to provide a protein-enriched pongamia ingredient.

107. The method of embodiment 106 further comprising washing the pongamia protein solids prior to drying.

108. The method of embodiment 106 or 107, wherein the precipitation step is performed by isoelectric precipitation.

109. The method of any one of embodiments 106 to 108, wherein the protein-enriched pongamia ingredient comprises at least 70% of pongamia proteins on a dry weight basis.

110. The method of any one of embodiments 106 to 109, further comprising:
dehulling pongamia beans to produce dehulled pongamia beans; and
pressing the dehulled pongamia beans to remove at least a portion of free oil in the pongamia beans to produce the pongamia meal, wherein the pongamia meal has a reduced fat content.

111. The method of embodiment 110, further comprising grinding the pongamia meal.

112. The method of any one of embodiments 106 to 111, further comprising:
dehulling pongamia beans to produce dehulled pongamia beans;
pressing the dehulled pongamia beans to remove at least a portion of free oil in the pongamia beans to produce a reduced fat pongamia meal; and combining the reduced fat pongamia meal with solvent to produce the pongamia meal, wherein the pongamia meal is defatted and debittered.

113. The method of embodiment 112, further comprising grinding the reduced fat pongamia meal prior to combining with solvent.

114. The method of embodiment 112 or embodiment 113, wherein the solvent comprises ethyl acetate, ethyl alcohol, or a combination thereof.

115. A method of producing a protein-enriched pongamia ingredient, comprising:
preparing an aqueous slurry of pongamia meal;
adjusting the pH of the aqueous slurry to a pH between 6 and 10,
separating the slurry into a protein liquid fraction and an insoluble wet cake fraction;
passing the protein liquid fraction through a membrane system to obtain a retentate comprising pongamia protein;
optionally washing, neutralizing and/or pasteurizing the retentate; and
drying the retentate to provide a protein-enriched pongamia ingredient.

116. The method of embodiment 115, wherein the protein-enriched pongamia ingredient comprises at least 70% of pongamia proteins on a dry weight basis.

117. The method of embodiment 115 or embodiment 116, further comprising:
dehulling pongamia beans to produce dehulled pongamia beans; and
pressing the dehulled pongamia beans to remove at least a portion of free oil in the pongamia beans to produce the pongamia meal, wherein the pongamia meal has a reduced fat content.

118. The method of embodiment 117, further comprising grinding the pongamia meal.

119. The method of any one of embodiments 115 to 117, further comprising:
dehulling pongamia beans to produce dehulled pongamia beans;
pressing the dehulled pongamia beans to remove at least a portion of free oil in the pongamia beans to produce a reduced fat pongamia meal; and
combining the reduced fat pongamia meal with solvent to produce the pongamia meal, wherein the pongamia meal is defatted and debittered.

120. The method of embodiment 119, further comprising grinding the reduced fat pongamia meal prior to combining with solvent.

121. A method of producing a protein-enriched pongamia composition, comprising:
preparing an aqueous slurry of pongamia meal;
adjusting the pH of the aqueous slurry to a pH between 4 and 5 to obtain pongamia protein solids:
washing, neutralizing, and pasteurizing purified protein solids; and
drying the purified pongamia protein solids to provide a protein-enriched pongamia composition.

122. A protein-enriched pongamia ingredient produced according the method of any one of embodiments 103 to 121.

123. A food product, a beverage product, a dietary supplement product or other product, comprising: the protein-enriched pongamia ingredient of arty one of embodiments 81 to 103 and 122.

124. The product of embodiment 123, wherein the product is a baked good, a protein supplement, a protein bar, or a non-dairy beverage.

125. The product of embodiment 123, wherein the product is a medical food, an infant formula, a cosmetic or a pharmaceutical product.

126. The product of embodiment 123, wherein the product is a beverage product, a dairy-product substitute, a meat substitute product; or an egg substitute.

127. The product of embodiment 126, wherein the beverage product is a fruit smoothie, a meal replacement beverage, a protein drink, an instant shake.

128. The product of any one of embodiments 123, 126 and 127, wherein the product is a beverage product comprising at least 20 g of protein-enriched pongamia ingredient per serving.

129. The product of embodiment 126, wherein the dairy-product substitute is a non-dairy milk, non-dairy cheese, non-dairy coffee whitener or creamer, non-dairy yogurt, non-dairy Greek yogurt, non-dairy drinkable yogurt.

EXAMPLES

The presently disclosed subject matter will be better understood by reference to the following examples, which are provided as exemplary of the invention, and not by way of limitation.

Example 1

Preparation of Defatted Debittered Pongamia Meal

This example demonstrates the preparation of defatted debittered pongamia meal, and generally follows the process described in FIG. 1. Pongamia beans were pressed through an oil-press to remove free oil, thereby producing a reduced fat pongamia meal with about 15-25% fat. The reduced fat pongamia meal was then extracted with ethanol (5:1; solvent:solids ratio) for 3 hours at 50-65° C. using an oil extractor. The residual solvent was removed by drying. The solvent-extracted meal was subjected to various assays to analyze the pongamia meal for various components (e.g., moisture, crude fat; protein; carbohydrates; ash, fiber, amino acids, sugars, etc.). The assays used to evaluate the pongamia meal in the present disclosure were taken from AOAC International analytical methods. The assays are summarized briefly and shown in Table 1 below.

TABLE 1

Assays for Proximate and Amino Acid Analysis of Pongamia Meal and Protein-Enriched Pongamia Compositions

| Assay | Reference |
|---|---|
| Moisture - Forced Draft Oven | AOCS Ba 2a-38 |
| Crude Fat by Petroleum Ether Extraction | AOCS Ba 3-38 Mod. |
| Protein - Combustion | AOAC 992.15; AOAC 990.03; AOCS Ba 4e-93 |
| Carbohydrates, Calculated | CFR 21-calc. |
| Ash | AOAC 942.05 |
| Fiber, Crude | AOAC 962.09; AOCS Ba 6-84 |
| Tryptophan (AOAC, Most Matrices) | AOAC 988.15 mod. |
| Cysteine & Methionine (AOAC, Most Matrices) | AOAC 994.12 mod. |
| Amino Acids by AH (AOAC, Most Matrices) | AOAC 982.30 mod. |
| Sugar Profile (AOAC, Most Matrices) - Total Sugars, Fructose, Glucose, Sucrose, Maltose, Lactose | AOAC 982.14, mod |

Proximate analysis was carried out as follows: Total protein content was determined by placing the pongamia meal samples in the combustion chamber of a protein analyzer, measuring the total nitrogen content of the gas produced by combustion, and calculating the protein from the observed nitrogen content (protein content=6.25×nitrogen content). The total fat content was determined by solvent extraction under reflux with petroleum ether (AOCS BA3-38 reference method, modified).

Total carbohydrate content was calculated as the remaining percentage of the pongamia meal (100%) less the sum of the total ash content (%), total protein content (%), total moisture content (%), and total fat (%). The total ash content was determined by placing the pongamia meal samples (2 g) into a crucible, drying the samples in an oven, asking the samples in a muffle furnace at 600° C., and measuring the weight of the ash (AOAC 942.05 reference method). The total moisture content was determined by heating a weighed sample at 130° C. for 2 hours in a forced draft oven, and determining the difference in sample weight, with the % difference calculated as moisture content (AOCS BA 2A-38 reference method).

The karanjin and pongamol content of the pongamia sample was determined by solvent extraction of karanjin and pongamol from the sample, followed by HPLC analysis as described herein.

The solvent-extracted meal was analyzed for crude fat, protein, karanjin, and pongamol content. Results are shown in Table 2. The defatted, debittered pongamia meal was observed to have less than 0.5% fat, and karanjin and pongamol levels of less than about 10 ppm. The treated meal was observed to be free from off-flavors and had no bitterness.

TABLE 2

Proximate composition of various forms of pongamia bean meal raw material.

| Raw Material | Crude Fat (%) | Protein (%) | Karanjin (ppm) | Pongamol (ppm) | Taste |
|---|---|---|---|---|---|
| Ground dehulled pongamia meal, full fat | 41.1 | 19.7 | 11621 | 1741 | Extreme Bitterness |
| Ground dehulled pongamia meal, reduced fat | 25.7 | 27.0 | 6006 | 309 | High Bitterness |
| Defatted debittered pongamia protein meal | 0.1 | 38.8 | <10 | <10 | No Bitterness |

Example 2A

Preparation of Pongamia Protein Concentrate by Solubilization

This example demonstrates protein extraction and production of pongamia protein concentrate from defatted debittered pongamia meal, and generally follows the exemplary process described in FIG. 2A.

The defatted debittered pongamia meal was obtained according to the method set forth in Example 1 above using ethyl acetate as the solvent. The resulting ethyl acetate-extracted pongamia meal was used as the starting material for protein extraction in this example. An aqueous slurry of defatted debittered pongamia meal was prepared with water (1:6; 15% solids) using a high shear mixer. The pH of the slurry was adjusted to pH 8 with NaOH (10 M NaOH (aq), about 40% aqueous solution) and continually stirred for 2 hours at 25° C. The slurry was separated by centrifugation into a protein containing liquid phase and wet cake. The pH of the protein solution was adjusted to neutral pH (7.0) and freeze dried to produce pongamia protein concentrate. This process resulted in extracting and recovering 70-75% of total protein from the meal by weight. Pongamia protein concentrate contained 50% protein by weight.

The protein content was determined by total nitrogen using the general conversion factor of 6.25. The nitrogen content was determined using the combustion analysis method as described in Example 1 above.

The proximate composition, the relative amino acid profile, protein digestibility-corrected amino acid score (PDCAAS) of the pongamia protein concentrate is provided in Tables 3, 4, and 5 below. The proximate composition and amino acid profile were determined by the protocols described in Example 1 above. The PDCAAS was calculated using a reference amino acid pattern for human milk as a reference protein. The pongamia protein concentrate produced in this example was observed to have similar and comparable amino acid profile to soy protein (U.S. Department of Agriculture Food Data Central Database, soy protein concentrate produced by acid wash (Item 16420)) and pea protein (PURIS™ pea protein 870).

TABLE 3

Pongamia protein concentrate composition, as dry weight (except moisture)

| Parameter | % |
|---|---|
| Moisture | 4.35 |
| Crude Fat | 0.99 |
| Crude Protein (dry basis) | 51.42 |
| Total Carbohydrate | 39.16 |
| Crude Fiber | 0.30 |
| Total Sugars | 24 58 |
| Sucrose | 22.15 |
| Fructose | 2.43 |
| Glucose | <0.16 |
| Lactose | <0.16 |
| Maltose | <0.16 |
| Ash | 8.42 |

TABLE 4

Relative amino acid profile - Pongamia, Soy, and Pea Proteins

| Amino Acid | Pongamia Protein Concentrate | Soy Protein Concentrate | Yellow Pea Protein Isolate |
|---|---|---|---|
| Glutamic Acid | 16.4% | 19.1% | 16.6% |
| Aspartic Acid | 12.7% | 11.5% | 11.7% |
| Leucine* | 9.2% | 7.8% | 8.5% |
| Lysine (total)* | 8.3% | 6.2% | 7.6% |
| Phenylalanine* | 6.1% | 5.2% | 4.8% |
| Arginine | 5.8% | 7.4% | 8.5% |
| Serine | 5.7% | 5.4% | 4.8% |
| Proline | 5.4% | 5.2% | 4.4% |
| Valine* | 4.8% | 4.9% | 5.3% |
| Glycine | 4.1% | 4.3% | 4.1% |
| Alanine | 4.0% | 4.3% | 4.3% |
| Tyrosine* | 3.6% | 3.7% | 4.8% |
| Isoleucine* | 3.5% | 4.7% | 5.1% |
| Threonine* | 3.4% | 3.9% | 3.8% |
| Histidine* | 2.7% | 2.5% | 2.5% |
| Cysteine* | 1.8% | 1.4% | 1.1% |

TABLE 4-continued

| Relative amino acid profile - Pongamia, Soy, and Pea Proteins | | | |
|---|---|---|---|
| Amino Acid | Pongamia Protein Concentrate | Soy Protein Concentrate | Yellow Pea Protein Isolate |
| Tryptophan* | 1.6% | 1.3% | 1.0% |
| Methionine* | 0.9% | 1.3% | 1.1% |

Note:
*denotes Essential Amino Acids

TABLE 5

| Pongamia Protein Concentrate Amino Acid Score | | | |
|---|---|---|---|
| Amino Acid | mg/g Pongamia Protein | mg/g Reference Protein | AA Score |
| Cvsteine + Methionine | 27.4 | 25 | 110 |
| Histidine | 26.5 | 19 | 140 |
| Isoleucine | 34.7 | 28 | 124 |
| Leucine | 92.4 | 66 | 140 |
| Lysine | 83.1 | 58 | 143 |
| Threonine | 33.8 | 34 | 99 |
| Tryptophan | 15.7 | 11 | 143 |
| Tyrosine + Phenylalanine | 96.5 | 63 | 153 |
| Valine | 48.1 | 35 | 137 |

Limiting Amino Acid = Threonine
Limiting Amino Acid Score = 99
Digestibility Factor = 0.87;
PDCAAS = 0.87

Example 2B

Preparation of Pongamia Protein Isolate by Isoelectric Precipitation

This example demonstrates protein extraction and production of a protein-enriched pongamia composition (pongamia protein isolate) from defatted debittered pongamia meal, and generally follows the exemplary process described in FIG. 2B.

Process Run A

Defatted debittered pongamia meal was used as the starting material for protein extraction in this example. The defatted debittered pongamia meal was obtained according to the method set forth in Example 1 above, except that ethyl acetate was used as the solvent.

An aqueous slurry of defatted debittered pongamia meal was prepared with water (1:6; 15% solids) using a high shear mixer. The pH of the slurry was adjusted to pH 8 with 10 M NaOH and continually stirred for 2 hours at 25° C. The slurry was separated by centrifugation into a protein containing liquid phase and wet cake. The pH of the protein solution was adjusted to pH 4.5 with phosphoric acid (85% aqueous solution) and stirred for 30 minutes to form protein precipitate. The precipitated protein was collected by centrifugation, resuspended in water to 40% solids, adjusted to pH 7.0 with 1 M NaOH, and freeze dried into a protein isolate powder. This process resulted in extracting about 70-75% and recovering about 40-50% of total protein from the defatted debittered pongamia meal by weight. Pongamia protein isolate contained about 70% protein by weight. About 38% of total protein in the starting material was recovered. The proximate composition and amino acid profile of the pongamia protein isolate was determined according the protocols described in Example 1 above. The moisture, crude fat, protein, carbohydrate and ash content of the pongamia protein isolate are shown in Table 6. The relative amino acid profile of the pongamia protein isolate is provided in Table 7.

TABLE 6

| Pongamia protein isolate composition, as dry weight (except moisture). | |
|---|---|
| Parameter | % |
| Moisture - Forced Draft Oven | 5.96 |
| Crude Fat by Petroleum Ether Extraction | <0.11 |
| Protein - Combustion | 76.70 |
| Carbohydrate, Calculated | 14.08 |
| Ash | 9.22 |

Pongamia protein isolate prepared from ethyl acetate-extracted meal by isoelectric precipitation.

TABLE 7

| Relative amino acid profile for pongamia protein isolate | |
|---|---|
| Amino Acid | g/100 g protein |
| Glutamic Acid | 16.26 |
| Aspartic Acid | 12.26 |
| Leucine* | 9.93 |
| Lysine (total)* | 8.69 |
| Phenvlalanine* | 6.61 |
| Arginine | 5.66 |
| Serine | 6.03 |
| Proline | 5.26 |
| Valine* | 4.94 |
| Glycine | 3.70 |
| Alanine | 3.67 |
| Tyrosine* | 3.95 |
| Isoleucine* | 3.68 |
| Threonine* | 3.22 |
| Histidine* | 2.61 |
| Cysteine* | 1.31 |
| Tryptophan* | 1.27 |
| Methionine* | 0.965 |

Note:
*denotes Essential Amino Acids

Process Run B

Defatted debittered pongamia meal was used as the starting material for protein extraction in this example. The defatted debittered pongamia meal was obtained according to the method set forth in Example 1 above, using ethanol as the solvent.

An aqueous slurry of defatted debittered pongamia meal was prepared with water (1:6; 15% solids) using a high shear mixer. The pH of the slurry was adjusted to pH 8 with 10% NaOH and continually stirred for 1 hour at 25° C. The slurry was separated using a decanter centrifuge into a protein-containing liquid phase and wet cake. The wet cake was again resuspended in water, adjusted to pH 8, and stirred for additional 1 hour at 25° C. The slurry was again separated by decanter centrifuge into a protein-containing liquid phase and wet cake. The two protein-containing liquid phases were combined together, and adjusted to pH 4.5 with phosphoric acid (85% aqueous solution) and stirred for 30 minutes to form protein precipitate. The precipitated protein was collected by centrifugation, washed with water, resuspended in water (~16% solids), adjusted to pH 7.0 with 10% NaOH, pasteurized and finally spray dried into a protein isolate powder.

During the first extraction, ~45% of the total proteins present in the starting meal was extracted. By washing the insoluble material (wet cake) from the first extraction, an additional 10-14% of starting protein was recovered, resulting in a combined 54-59% extraction of the total amount of initial protein. About 35-47% of the extracted protein was recovered during the acid precipitation step, resulting in an overall yield of 15-26% of total protein from the defatted debittered pongamia meal by weight.

The above process was carried out twice to obtain two pongamia protein isolate samples. Both pongamia protein isolates contained about 80% protein by weight. The proximate composition and amino acid profile of the pongamia protein isolates were determined according the protocols described in Example 1 above. The moisture, crude fat, protein, carbohydrate and ash content of the pongamia protein isolate are shown in Table 8. The relative amino acid profile of the pongamia protein isolate is provided in Table 9.

TABLE 8

Pongamia protein isolate compositions, as dry weight (except moisture).

| Parameter | Pongamia Protein Isolate, Run #B1 | Pongamia Protein isolate, Run #B2 |
|---|---|---|
| Moisture - Forced Draft Oven | 4.8% | 3.6% |
| Crude Fat by Petroleum Ether Extraction | 0.8% | 0.8% |
| Protein - Combustion | 83.9% | 81.7% |
| Carbohydrate, Calculated | 12.2% | 13.2% |
| Ash | 3.1% | 4.3% |
| Furanoflavonoids | 115 ppm | 80 ppm |

TABLE 9

Relative Amino Acid Profiles of Pongamia Protein Isolate produced at Pilot S

| Parameter | Pongamia Protein, Run #1 Relative AA % |
|---|---|
| Glutamic Acid | 16.9 |
| Aspartic Acid | 12.7 |
| Leucine* | 10.4 |
| Lysine (total)* | 8.2 |
| Phenylalanine* | 7.0 |
| Serine | 6.1 |
| Arginine | 5.6 |
| Proline | 5.4 |
| Valine* | 5.0 |
| Tyrosine* | 4.1 |
| Isoleucine* | 3.7 |
| Glycine | 3.4 |
| Alanine | 3.3 |
| Threonine* | 2.9 |
| Histidine* | 2.6 |
| Cysteine* | 1.1 |

TABLE 9-continued

Relative Amino Acid Profiles of Pongamia Protein Isolate produced at Pilot S

| Parameter | Pongamia Protein, Run #1 Relative AA % |
|---|---|
| Tryptophan* | 1.0 |
| Methionine* | 0.8 |
| Total Amino Acids | 100.0 |

*denotes essential amino acids.

Example 2C

Preparation of Pongamia Protein Isolate by Membrane Filtration

This example demonstrates protein extraction and production of a protein-enriched pongamia composition (pongamia protein isolate) from defatted debittered pongamia meal by membrane filtration, and generally follows the exemplary process described in FIG. 2C.

Defatted debittered pongamia meal was used as the starting material for protein extraction in this example. The defatted debittered pongamia meal was obtained according to the method set forth in Example 1 above, except that ethyl acetate was used as the solvent.

An aqueous slurry of &fatted debittered pongamia meal was prepared with water (1:6; 15% solids) using a high shear mixer. The pH of the slurry was adjusted to pH 8 with 2 M NaOH (~8% aqueous solution) and continually stirred for 2 hours at 25° C. The slurry was separated using a decanter into a protein containing liquid phase and wet cake. The protein containing liquid phase was filtered using a 10 kDa molecular weight cut-off (MWCO) hollow fiber membrane module (420 $cm^2$) or a 5 kDa MWCO flat sheet cassette (1000 $cm^2$) with a lab-scale membrane filtration setup. Permeate flow and trans membrane pressure (~2.8 bar) were selected to obtain a reasonable permeate flux. Membrane filtration was carried out at concentration factor (CF) of 4-5 and diafiltration factor (DF) of 2-4. The obtained retentate was further washed and freeze-dried into a protein isolate powder.

This process resulted in extracting about 70-75% and recovering about 30% of total protein from the meal by weight. Pongamia protein isolate produced by membrane filtration contained about 80% protein by weight.

In one experiment performed, trials involving either a 5 kDa or 10 kDa membrane were performed on a protein containing liquid phase (produced according to the protocol described above). The conditions and results are provided in Table 10 below.

TABLE 10

Summary of Protein Purity and Yield from Membrane Filtration

| MWCO | CF | DF | Feed (g) | Protein in feed (%) | Retentate (g) | Protein in retentate (%) | Protein in powder (%) | Yield (%) | Overall Yield (%) |
|---|---|---|---|---|---|---|---|---|---|
| 10 kDa | 5 | 2 | 733 | 4.7 | 118 | 12.1 | 76 | 47.9 | 32 |
| 10 kDa | 4.3 | 4.3 | 674 | 4.7 | 153 | 10.0 | 80 | 42.6 | 29 |
| 5 kDa | 5 | 5 | 618 | 4.7 | 145 | 6.8 | 79 | 35.3 | 24 |

Example 3

Molecular Weight Characterization of Pongamia Protein

This example demonstrates the molecular weight characterization of proteins present in (i) pongamia beans, (ii) cold-pressed pongamia meal, (iii) defatted debittered pongamia meal obtained according to the method set forth in Example 1 above, and (iv) protein-enriched pongamia compositions obtained according to the methods set forth in Examples 2A-2C above. The molecular weights of pongamia proteins obtained after various processing stages are shown in comparison to the molecular weight characterization of a soy protein isolate and proteins extracted from partially defatted soybean meal.

Figure 5A:
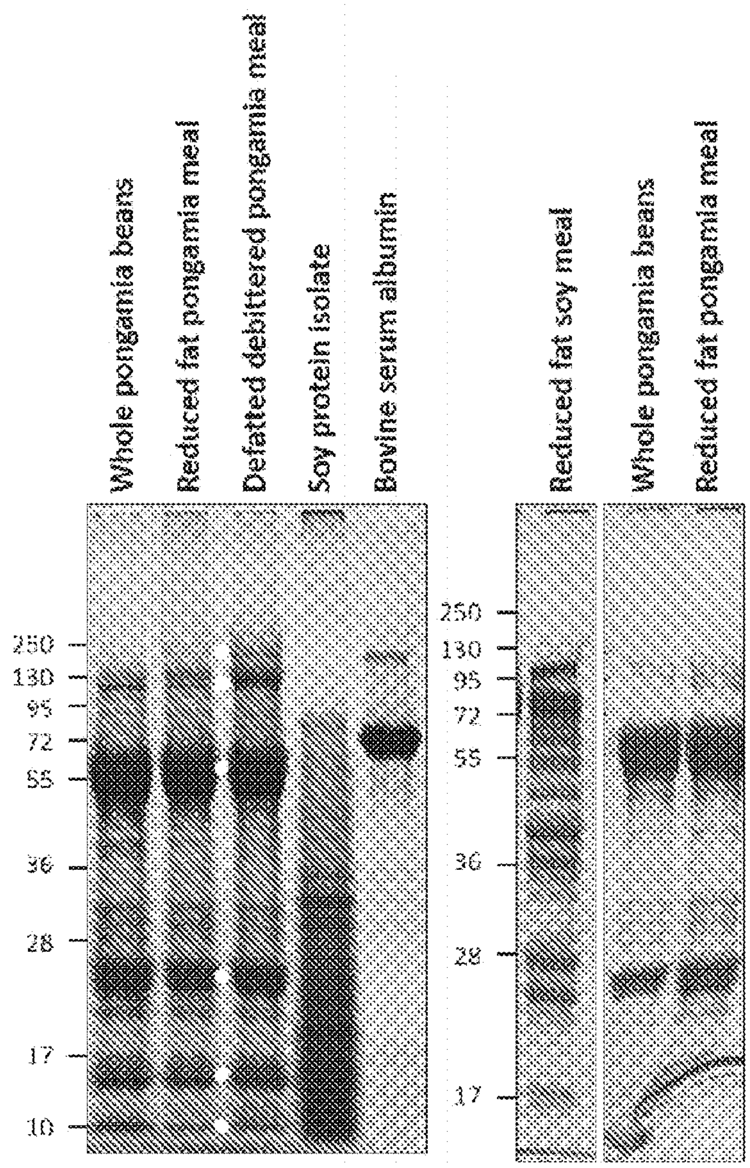
FIGS. 5A-5D depict protein constituents resolved by SDS-PAGE, showing the molecular weight distribution of various pongamia bean proteins to illustrate process stability, integrity and to distinguish pongamia bean protein relative to soy protein.
Figure 5B:
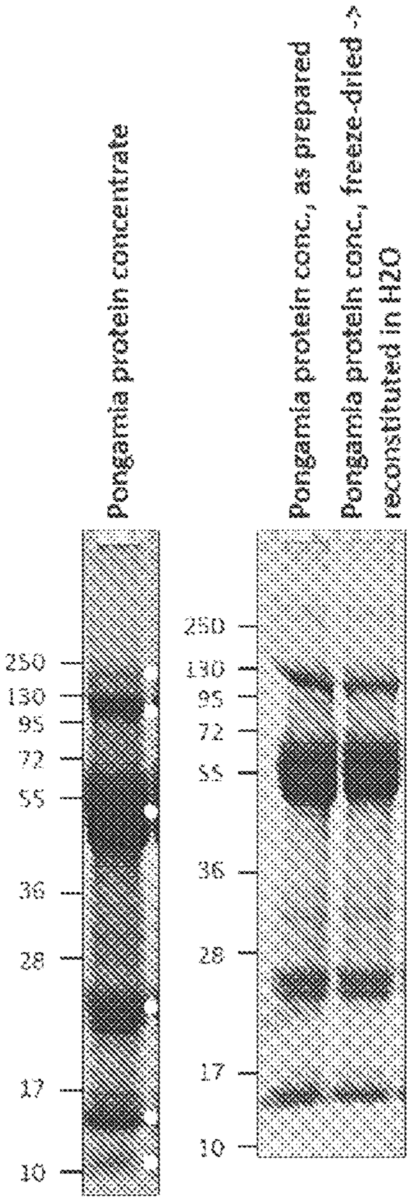
Figure 5C:
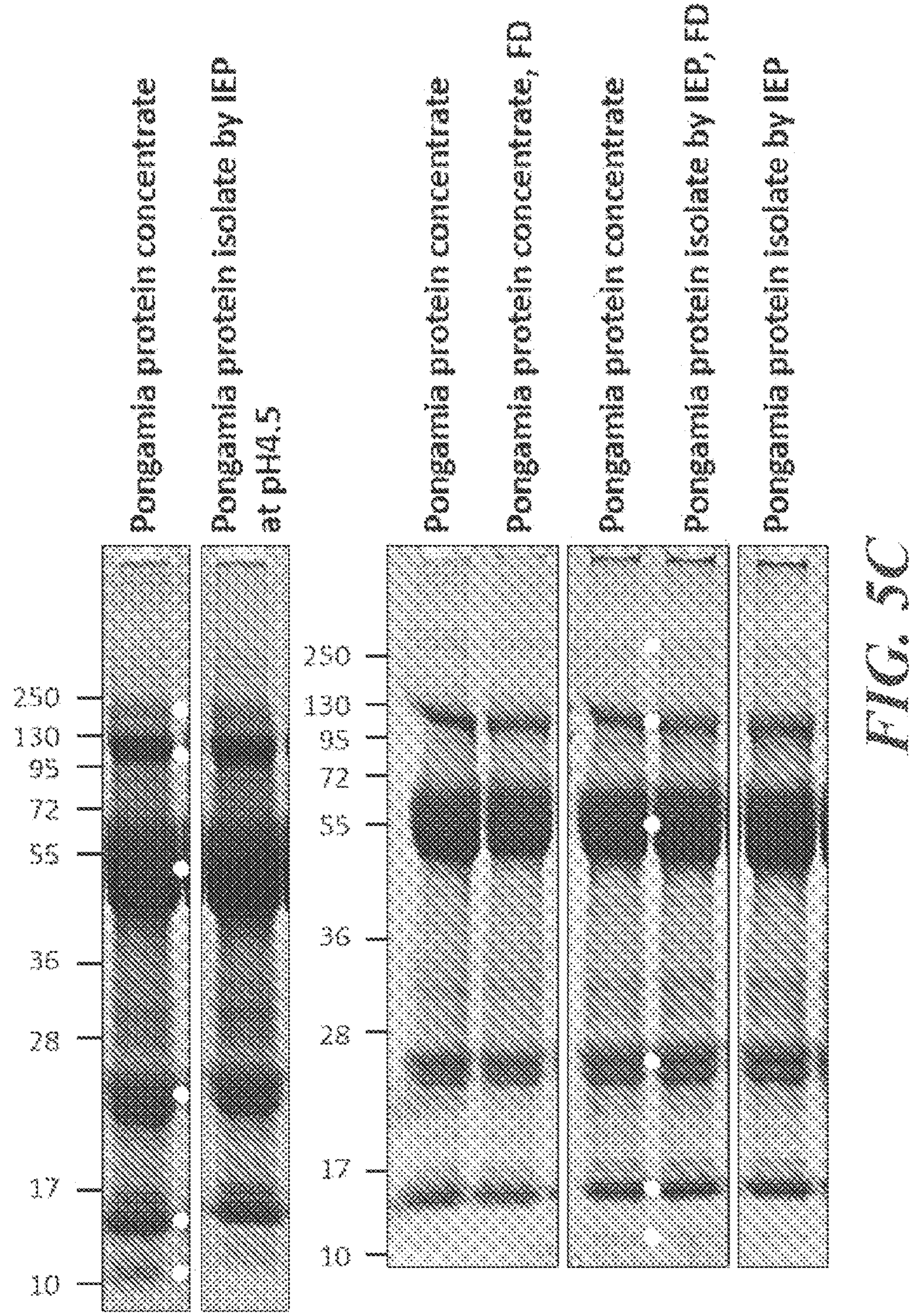
Figure 5D:
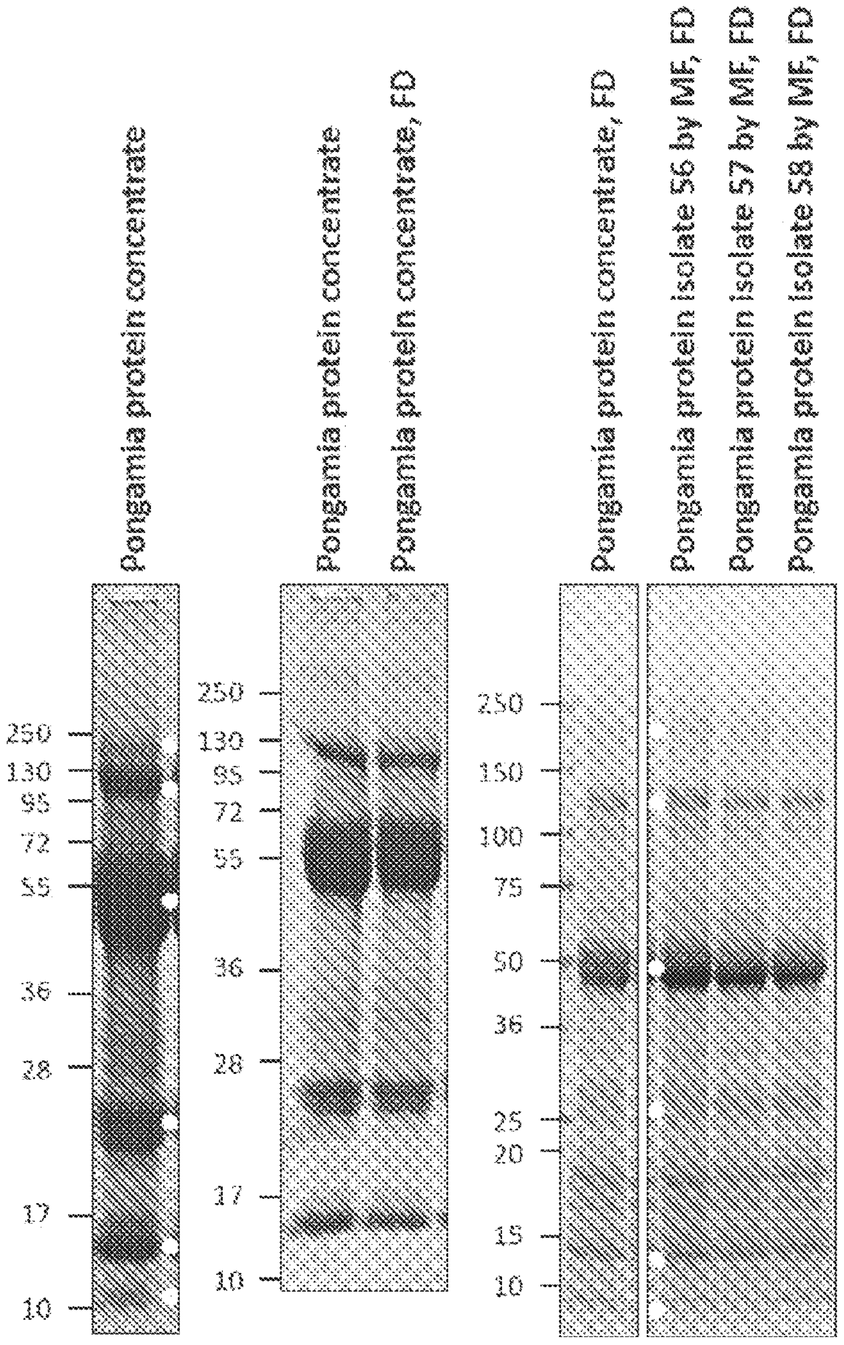

With reference to FIGS. 5A-5D, the size distribution and relative abundance of proteins present in pongamia beans and materials derived therefrom were determined by SDS-PAGE. Molecular weight was determined generally in accordance with the following protocol. For FIG. 5A, protein extracts in these panels were prepared by mechanical disruption of the indicated materials in protein extraction buffer containing 50 mM TRIS-HCl, pH 8.3, 100 mM NaCl, 2 mM EDTA, 1% SDS, and 1 mM PMSF. Protein concentration in each extract was determined using the Bradford assay with bovine serum albumin (BSA) as a standard. Extracts were diluted and mixed with denaturing SDS-PAGE sample buffer prior to loading onto a 12% SDS-PAGE gel (about 30 μg per lane). Pure BSA from a commercial stock was diluted directly into SDS-PAGE sample buffer and was included as an unstained molecular weight marker (about 66 kDa), as well as a protein amount reference (about 6 μg per lane). Soy protein isolate was SUPRO XT40 Isolated Soy Protein Product from Solae (10002061). Reduced fat soy meal was made in-house by cold-pressing commercially available soybeans (soya). Prestained molecular weight standards (not shown) were Thermo Scientific PageRuler Plus Prestained Protein Ladder (26619). With reference to FIGS. 5B-5D, protein samples in these panels were taken from various stages in the preparation of pongamia protein-enriched compositions. Freeze-dried (FD) powder for pongamia protein concentrate, isolate by isoelectric precipitation, or isolate by membrane filtration was reconstituted in water at 20 mg/ml (2% w/v). Protein concentration in each sample was determined by Bradford or BCA assay using bovine serum albumin (BSA) as a standard. Aliquots were diluted in $H_2O$ and mixed with denaturing SDS-PAGE sample buffer prior to loading protein samples onto an SDS-PAGE gel. Note, for the panel that compares protein profiles in freeze-dried isolates generated by membrane filtration of a simple pH 8 extract to the corresponding "parental" freeze-dried pH 8 extract (concentrate), relatively less protein was loaded per lane and a different gel system was used.

Pongamia beans were found to contain several readily dissemble proteins that range in size from about 10 kDa to 250 kDa. The single most abundant protein species (representing 30-40% of total protein) is a doublet at about 55 kDa. In addition, there are five other prominent classes at 250 kDa, 130 kDa, 25 kDa, 15 kDa, and 10 kDa. Together these six classes, which likely correspond to pongamia seed storage proteins, have been found to have the greatest impact on the functionality of pongamia meals and flours, as well as protein concentrates or isolates prepared therefrom. The prominent proteins (as well as most other proteins) found in pongamia beans were observed to remain largely intact throughout the processing steps described in the preceding examples to produce edible flour. Importantly, it was observed that these proteins can be readily extracted from defatted and/or debittered pongamia meals using aqueous extraction protocols, isoelectric precipitation protocols, or membrane filtration protocols described herein (Examples 2A-2C).

Example 4

Functional Properties of Pongamia Protein in this example, the solubility, viscosity, and emulsification properties of the pongamia protein compositions produced according to the method set forth in Example 2 above were characterized and compared against soy, pea, lupin and sunflower seed proteins.

Protein Solubility

To measure the solubility of pongamia protein compositions, 2% w/v protein solutions (based on nitrogen *5.7) were prepared in water, adjusted to the indicated pH values using acid or base, and stirred for 2 hours at room temperature. The samples were centrifuged at 20,000 g for 10 min at 20° C. and the supernatant was collected. The nitrogen content of the supernatant was determined by the Kjeldahl method. Protein solubility (e.g., protein present in the 20,000 g supernatant) was expressed as a percentage of the initial amount of protein added in solution. Protein solubility can also be expressed as the mass of dissolved solute per volume of solvent (g/L).

Figure 4A:
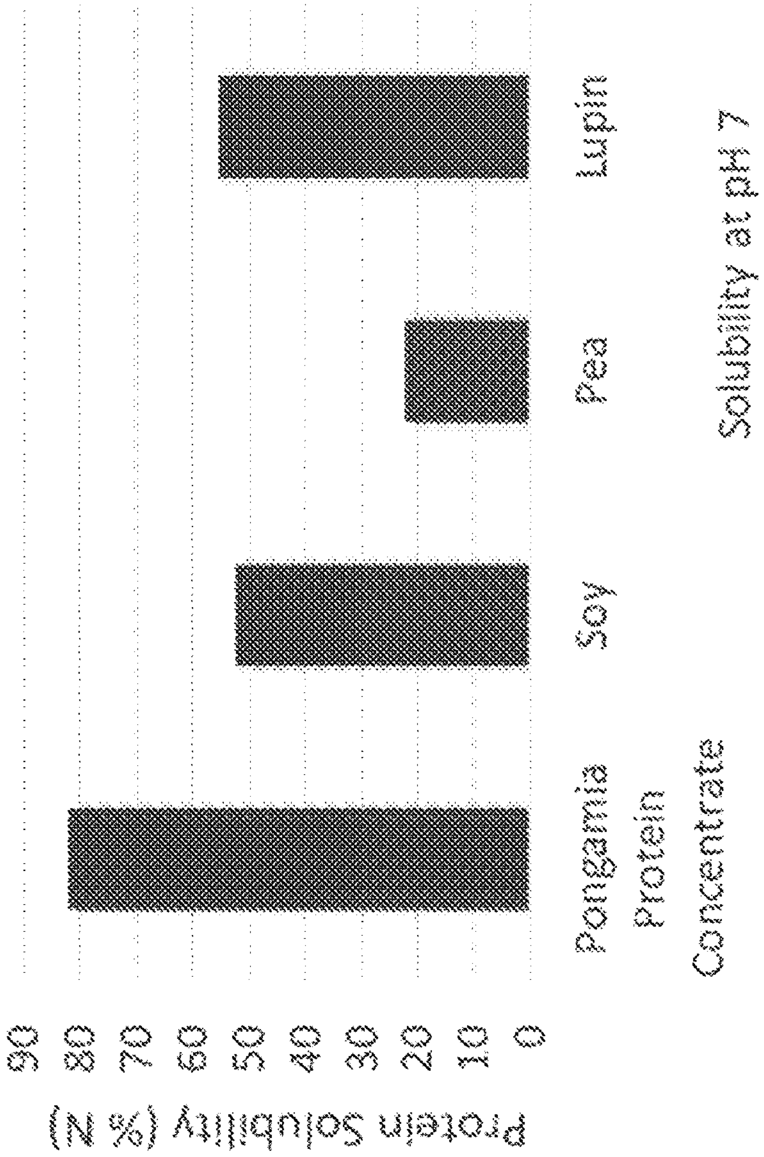
FIGS. 4A-4C depict graphs showing the functional properties comparison of exemplary pongamia protein concentrates against commercial proteins (soy, pea and lupin) with respect to solubility (FIG. 4A), viscosity at a shear rate of 100 $s^{-1}$ (FIG. 4B), and against commercial proteins (soy, pea and sunflower) with respect to emulsion (FIG. 4C).
Figure 4B:
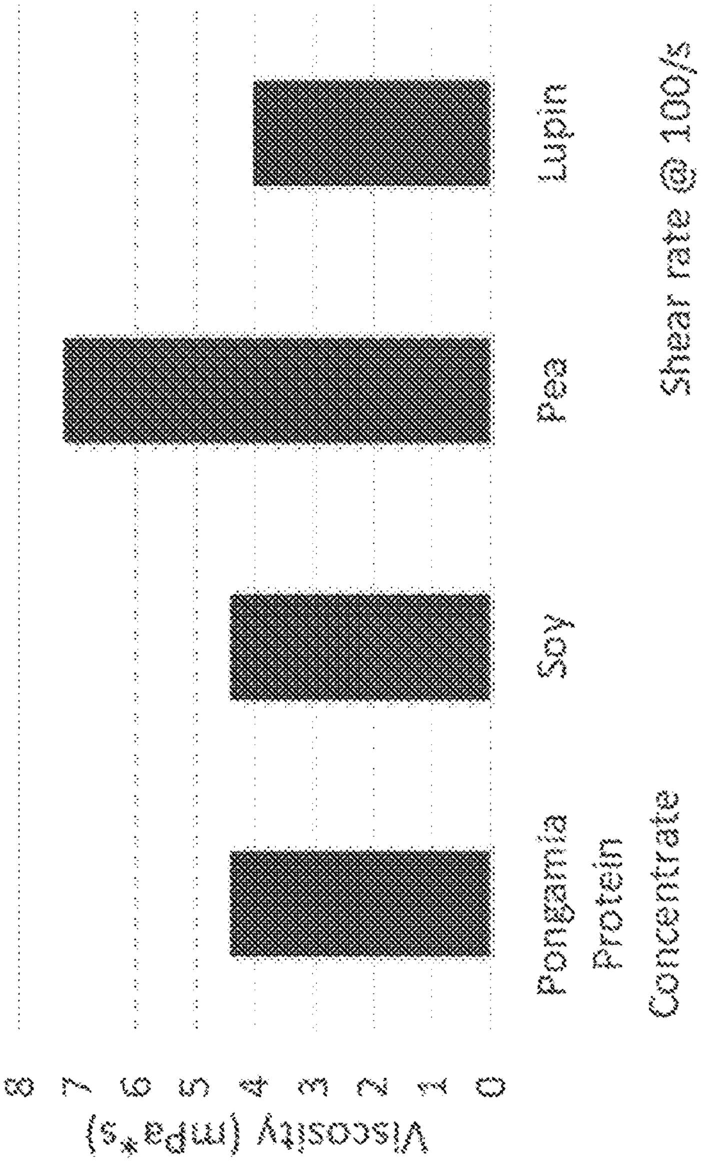
Figure 4C:
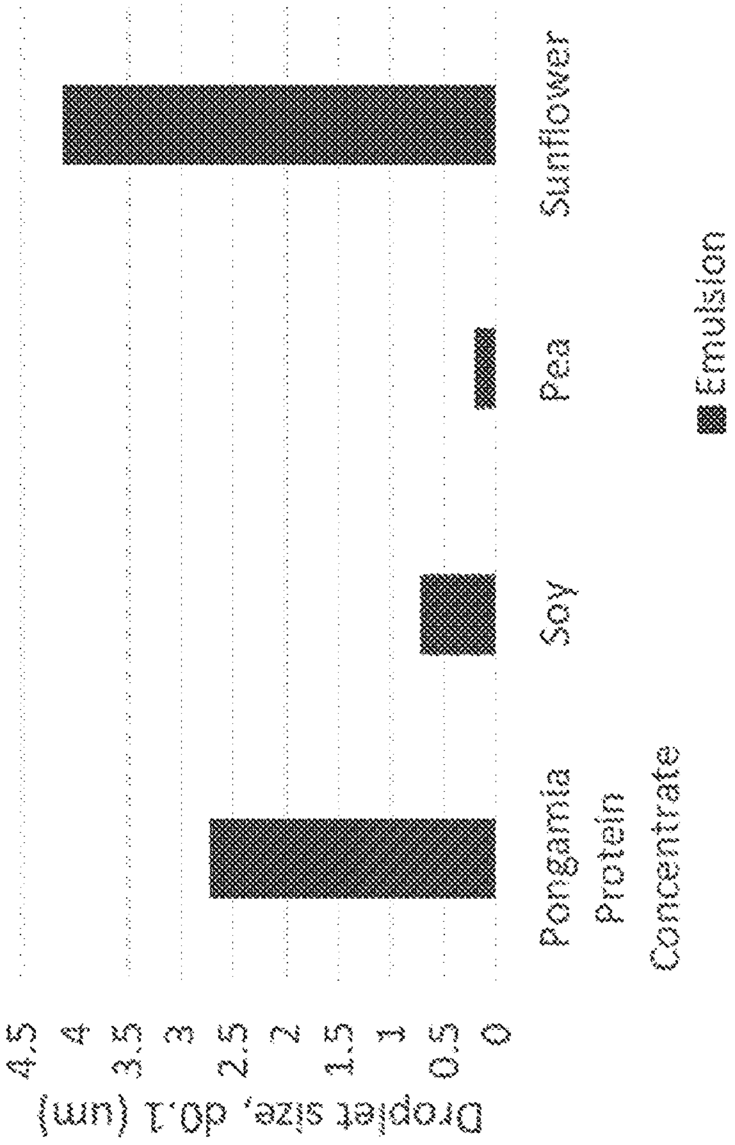
Figure 4D:
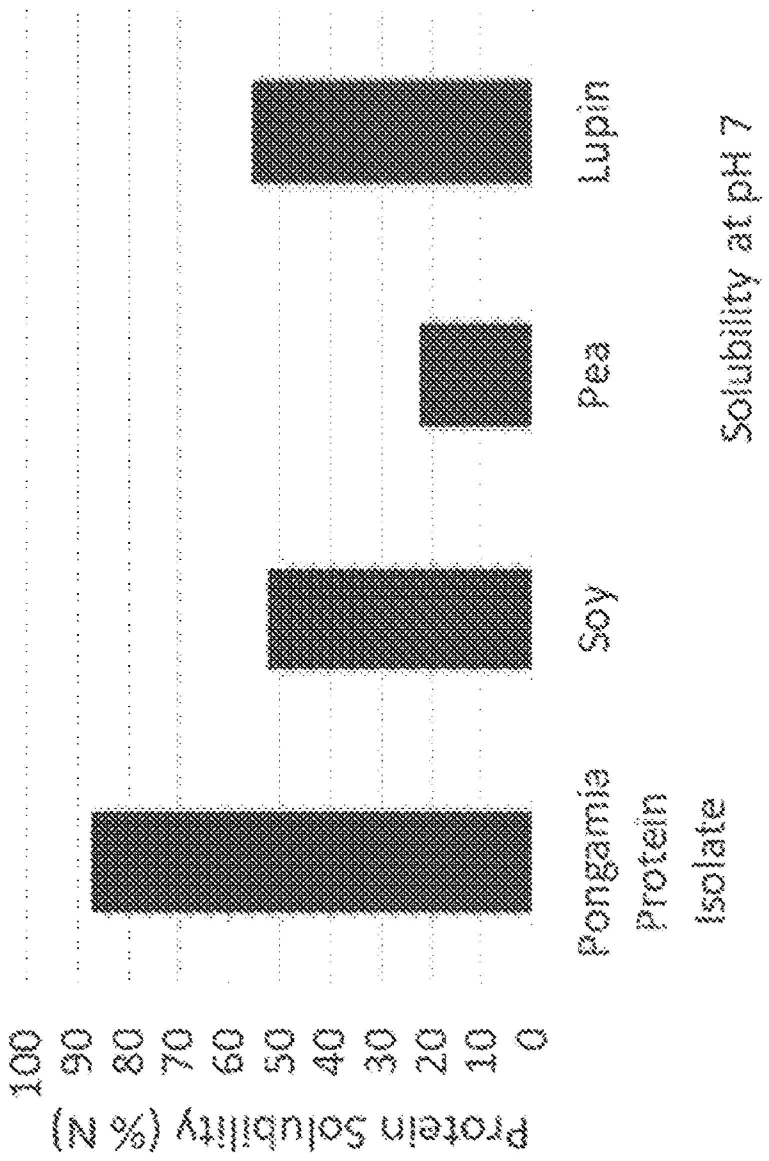
FIGS. 4D-4F depict graphs showing the functional properties comparison of exemplary pongamia protein isolates against commercial proteins (soy, pea and lupin) with respect to solubility (FIG. 4D), viscosity at a shear rate of $100\ s^{-1}$ (FIG. 4E), and against commercial proteins (soy, pea and sunflower) with respect to emulsion (FIG. 4F).

FIG. 3 shows the protein solubility curve for pongamia proteins present in a pongamia protein concentrate in water at various pH values. The solubility curve was prepared by adjusting the pH of a 2% w/w protein solution in water (based on nitrogen*5.7) to desired values (pH 3 to pH 9) with HCl or NaOH. The suspension was stirred for 2 hours at room temperature, then centrifuged to remove insoluble material. FIGS. 4A and 4D compare the solubility at pH 7.0 of proteins in a pongamia protein concentrate or isolate to that of commercial plant protein compositions.

Viscosity

Figure 4E:
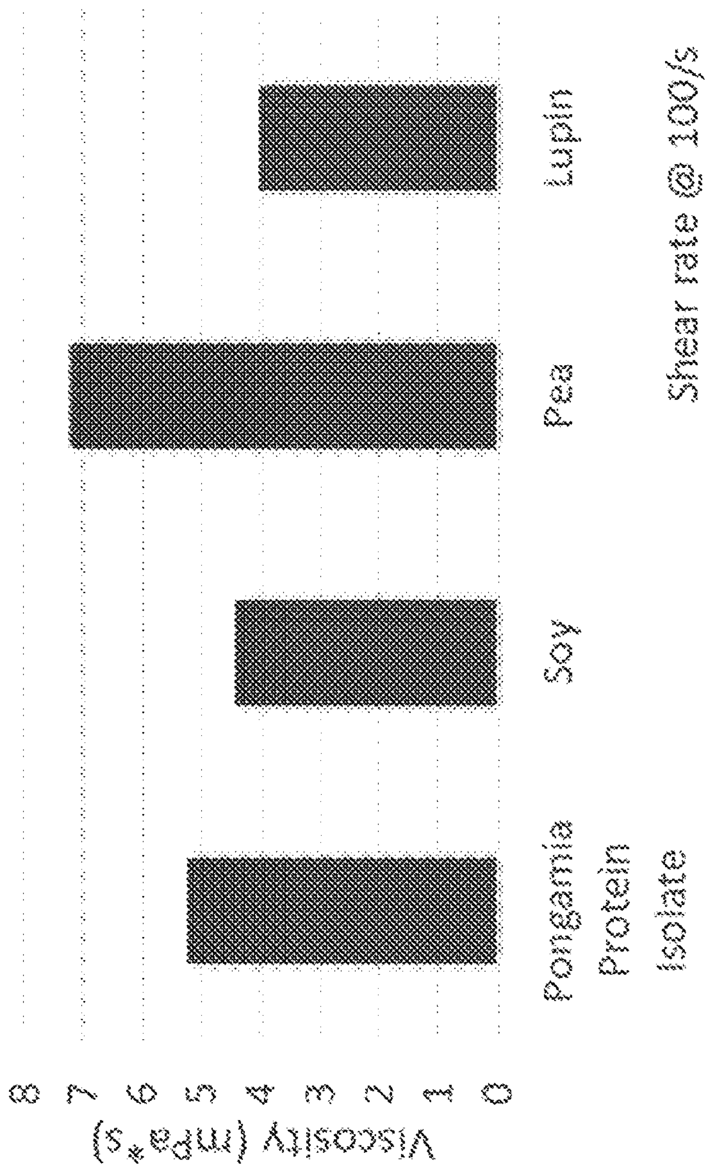
Figure 4F:
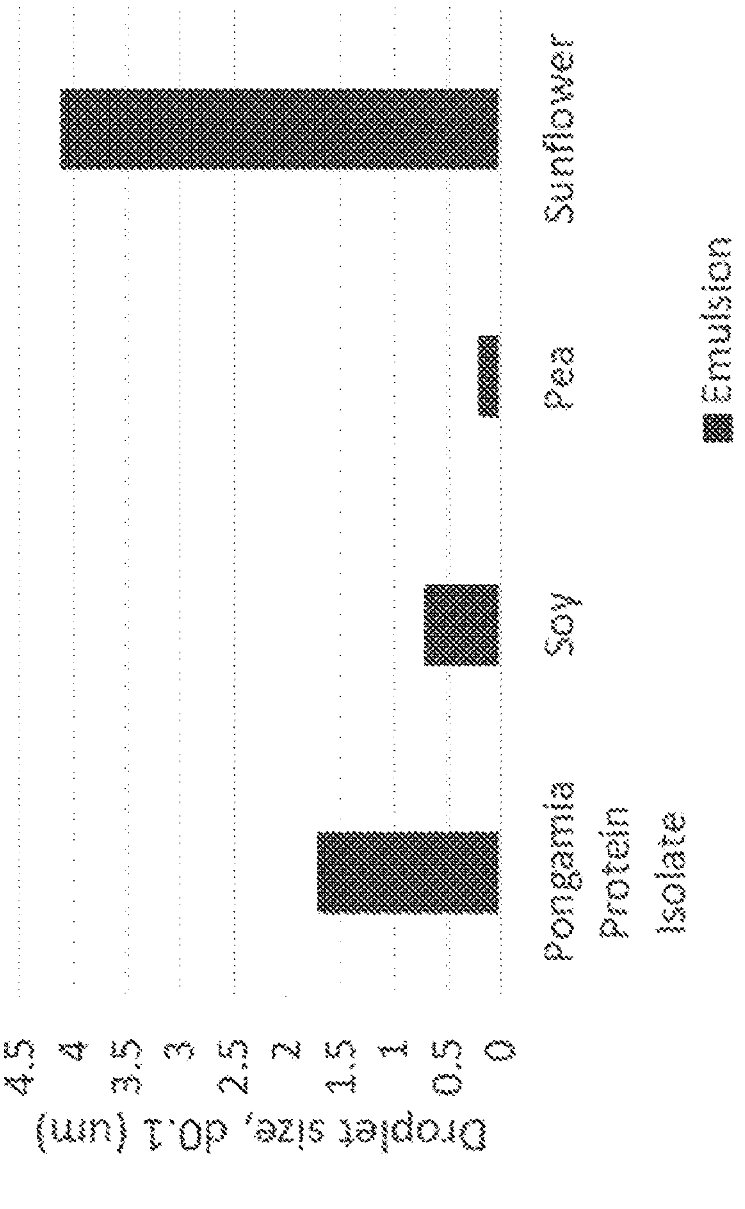

To measure the viscosity of protein-enriched pongamia compositions, a 4% w/w protein solution (based on nitrogen *5.7) was prepared and stirred for 30 minutes at room temperature. The protein solution was then heated for 15 minutes at 90° C. and cooled to room temperature. Viscosity was measured using a rheometer at 20° C. at shear rates from 0 $s^{-1}$ to 1000 $s^{-1}$. FIGS. 4B and 4E compare the viscosity at a shear rate of 100 $s^{-1}$ for a solution prepared from pongamia protein concentrate or isolate to those prepared with commercial plant protein compositions.

Protein Emulsification

Emulsions were prepared using a protein to fat ratio of 1:10. A 1% protein concentration was used with 10% sunflower oil in aqueous solution. The protein was hydrated first, and fat was added slowly while mixing at high shear (15,000 rpm) for 2 minutes. The water-protein-oil mixtures were homogenized at 300/30 bar to form stable emulsions. Emulsions were analyzed for droplet size by laser diffraction. The droplet sizes observed are shown in FIGS. 4C and 4E.

The functional property results for solubility, viscosity and emulsification properties are shown in FIGS. 4A-4F. The pongamia protein concentrate or isolate was found to have superior solubility (about 80%) as compared to the commercial legume proteins tested. The pongamia protein (either concentrate or isolate) was found to be comparable to pea and soy proteins in viscosity and emulsification properties.

Example 5

Additional Functional Studies of Pongamia Protein

The present example details functionality evaluation of pongamia protein isolates prepared generally in accordance with the protocol as provided in Example 2B, runs A and B (sample B1). Pongamia protein isolates produced were assessed fir their emulsification properties, viscosity, water-holding capacity, oil holding capacity, gelling properties, foaming properties, powder dispersibility, and solubility at pH 7 as compared to the same properties observed for commercially available soy protein isolate and pea protein isolate.

Protein Solubility

Solubility was determined on protein suspensions prepared at 2% protein content at pH 7, and the solubility was estimated by the Kjedahl method on the supernatant after centrifugation at 15000 g for 10 minutes.

Table 11 shows the observed solubilities for the pongamia protein isolates. Both pongamia protein isolates exhibited high protein solubility of 38% and 57% respectively. The observed solubilities were significantly higher than the pea protein solubility and comparable (or higher for the pongamia protein isolate from Run B1) than the same for soy protein.

Viscosity

To measure the viscosity of protein-enriched pongamia compositions, a 10% w/w protein solution (based on nitrogen *5.7) was prepared and stirred. Viscosity was measured using a rheometer at 25° C. at shear rates from 0.1 $s^{-1}$ to 1000 $s^{-1}$.

Table 11 shows the observed viscosities for the pongamia protein isolates. The pongamia protein isolates were found to exhibit relatively constant viscosity with shear rate, corresponding to Newtonian behavior. The viscosity of pongamia protein isolate was observed to be relatively low, on the order of $10^{-2}$ Pa*s, which is slightly higher than that of water and comparable to pea protein isolate.

Figure 6A:
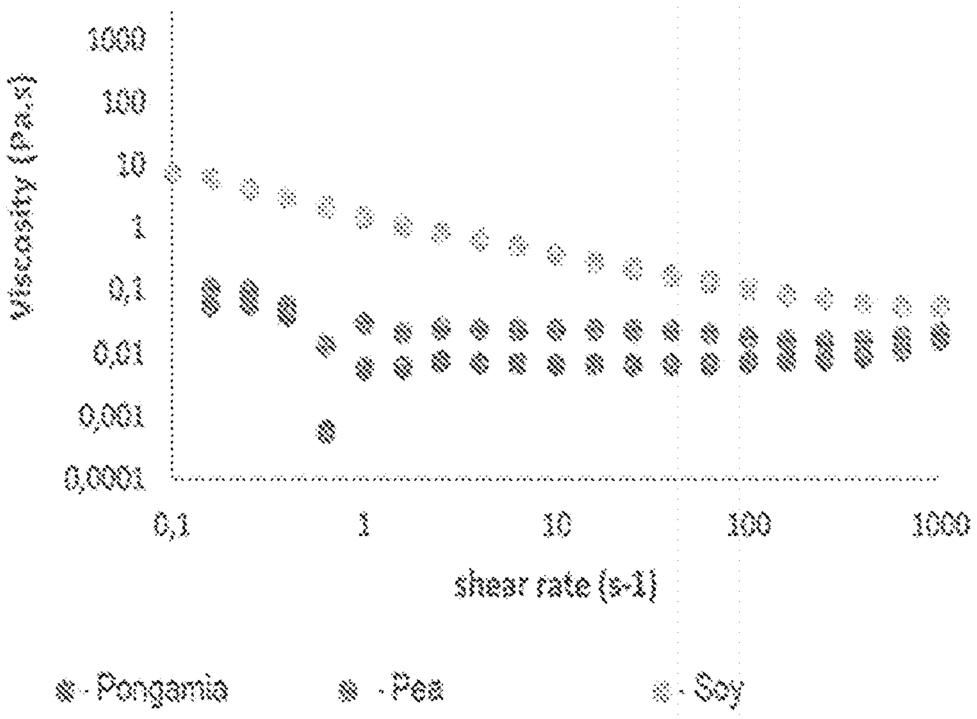
FIGS. 6A and 6B depict viscosity properties and emulsification properties of pongamia protein isolate produced at pilot-scale, as compared to pea and soy protein isolates.

FIG. 6A shows the viscosity measured for a solution of pongamia protein isolate (obtained from Run B1) at different shear rates and as compared to solutions prepared pea protein isolate or soy protein isolate. At all measured shear rates, pongamia protein isolate exhibited lower viscosities than both pea protein and soy protein isolates.

TABLE 11

Protein Solubility of Pongamia Protein, Pea Protein and Soy Protein Isolates

| Sample | Solubility (%, at pH 7) | Viscosity at 100 $s^{-1}$ ($10^{-3}$ Pa · s) |
|---|---|---|
| Pongamia Protein Isolate, Ex. 2B, Run A | 38 | 9 |
| Pongamia Protein Isolate, Ex. 2B, Run B1 | 57 | 7 |
| Pea Protein Isolate | 21 | 17 |
| Soy Protein Isolate | 42 | 103 |

Protein Emulsification

The emulsifying properties of a protein sample is measured by producing an oil-in-water emulsion. A solution containing 1% protein is prepared in water. The emulsion is produced by mixing protein solution with oil in a proportion of 75/25 followed by sonication. The size distribution of the oil droplets is then measured on a particle size analyser (Mastersizer, Malvern) with two dispersants (water and SDS) following procedure PR-14010. A refraction index of 1.46 is used for sunflower oil and 1.33 for water. An absorption index of 0.01 is used for sunflower oil.

For the emulsification assessment, the emulsifying properties of the pongamia protein isolates, pea protein isolates and soy protein isolates were assessed immediate after preparation (Day 0) and after 7 days of storage (Day 7). Table 12 shows the observed particle size distribution D50 value for the pongamia protein isolates at Day 0 and Day 7. As provided herein, the D50 value indicates the droplet size at which 50% of particles in the sample are greater than the indicated value.

Figure 6B:
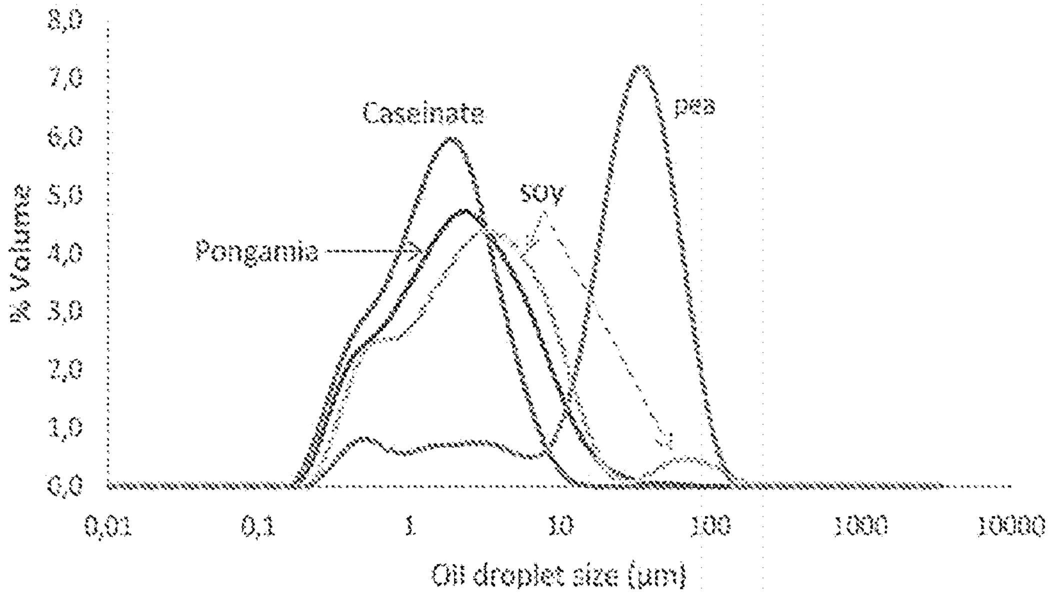

The pongamia protein isolates were observed to produce a fine emulsion immediate after preparation (median size below 5 μm) and were stable after 7 days of storage. The pongamia protein samples had very good emulsifying properties, similar to soy protein and milk caseinate. FIG. 6B shows the droplet size distribution the an emulsion of pongamia protein isolate (prepared at pilot-scale) as compared to emulsions prepared with sodium caseinate (as a reference), pea protein isolate or soy protein isolate. As shown in FIG. 6B, the droplet size distribution of the pongamia emulsion was unimodal and similar in median droplet size and droplet size distribution to sodium caseinate.

TABLE 12

Emulsion Stability and D50 values

| Sample | Day 0 | | | Day 7 | | |
|---|---|---|---|---|---|---|
| | D50 in water (μm) | D50 in SDS (μm) | Flocculation Index (ratio $D50_{SDS}$ to $D50_{water}$) | D50 in water (μm) | D50 in SDS (μm) | Flocculation Index (ratio $D50_{SDS}$ to $D50_{water}$) |
| Sodium caseinate (reference) | 2.15 | 2.00 | 0.93 | 2.00 | 1.80 | 0.90 |
| Pongamia Protein Isolate, Ex. 2B, Run A | 2.93 | 1.92 | 0.65 | 2.78 | 2.01 | 0.72 |
| Pongamia Protein Isolate, Ex. 2B, Run B1 | 2.90 | 2.47 | 0.85 | 2.91 | 2.38 | 0.82 |
| Pea Protein Isolate | 31.1 | 2.28 | 0.07 | 68.8 | 2.49 | 0.12 |
| Soy Protein Isolate | 3.04 | 1.75 | 0.58 | 3.18 | 1.82 | 0.57 |

Water and Oil Holding Capacities

The water and oil holding capacities of pongamia protein isolates were measured by adding each sample to oil or water at a concentration of 20 mg/ml of dry matter. Suspensions were blended for 1 hour under stirring. After centrifugation at 15000 g for 10 mm, the water and oil content in the pellet was measured and compared with the initial weight of material. The results are expressed as the number of times that sample is able to retain its weight in water or oil. As shown in Table 13, the pongamia protein isolates had medium water holding capacity, but lower than pea and soy protein isolates; the pongamia protein isolates had slightly higher oil binding properties compared to soy and pea proteins.

TABLE 13

| Water- and Oil-Holding Capacities | | |
|---|---|---|
| Sample | Water Holding Capacity (g water/g sample) | Oil Holding Capacity (g oil/g sample) |
| Pongamia Protein Isolate, Ex. 2B, Run A | 3.9 | 1.2 |
| Pongamia Protein Isolate, Ex. 2B, Run B1 | 1.7 | 2.1 |
| Pea Protein Isolate | 3.1 | 1.6 |
| Soy Protein Isolate | 4.3 | 1.6 |

Foaming Properties

Foaming properties were evaluated with a Foamscan (Teclis Scientific) using a 0.1% w/v protein solution at pH 7 (60 mL). Foam was formed by bubbling air in the solution at a flow rate of 200 ml/min for 30 seconds. The foam volume and its stability were then recorded during 10 min. Egg white was used as a reference for this test. Table 14 shows the results from the Egg white (as a reference) produced a high volume of foam, which was very stable over time. Pongamia protein produced a high volume of foam but had a significant decrease in foam volume over time.

TABLE 14

| Foaming Properties | | | |
|---|---|---|---|
| Sample | Max Foam Volume (ml) | Foam Volume after 10 min (ml) | Foam Stability (%) |
| Egg White | 110 | 74 | 67 |
| Pongamia Protein Isolate, Ex. 2B, Run A | 100 | 8 | 8 |
| Pongamia Protein Isolate, Ex. 2B, Run B1 | 96 | 6 | 6 |
| Pea Protein Isolate | 58 | 0 | 0 |
| Soy Protein Isolate | 35 | 0 | 0 |

Gelling Properties

Minimum gelling concentration was measured by preparing solutions from 2% to 20% protein content in test tubes. After solubilization, solutions were heated 1 h in a waterbath at 85° C. and then cooled 2 h at 4° C. The protein solution was considered to have formed a gel if it behaved like a liquid before heating (i.e. free-flowing) but did not flow when the testtube was put upside-down after heating.

The minimum gelling concentration results for the pongamia protein isolates are shown in Table 15. Pongamia protein isolates were found to exhibit comparable gelling to pea protein and soy protein.

Powder Dispersibility

Powder dispersibility was measured as follows. Five (5) g of sample was added to 100 ml of water under mixing at 500 rpm (vortex). The dispersion was mixed for 5 min, then filtered through a 30 μm pore size filter. The filter and any retained content were dried at 105° C. for 4 h and weighed. The proportion of material retained on the filter (undispersed product) per g sample was calculated.

The dispersibility results for the pongamia protein isolates are shown in Table 15. As shown in Table 15, pongamia protein were observed to have superior dispersibility as compared to soy and pea.

TABLE 15

| Dispersibility and Gelling Properties | | |
|---|---|---|
| Sample | Dispersibility (%) | Minimum Gelling Concentration (g protein/100 g solution) |
| Pongamia Protein Isolate. Ex. 2B, Run A | 12.3 | 10 |
| Pongamia Protein Isolate, Ex 2B, Run B1 | 17.7 | 12 |
| Pea Protein Isolate | <5 | 14 |
| Soy Protein Isolate | <5 | 10 |
| Milk Powder (reference) | 99.6 | — |
| Gluten (reference) | 21.2 | — |

"—" - indicates not measured

Example 6

Individual Food Uses and Levels for Protein-Enriched Pongamia Compositions

The protein-enriched pongamia compositions (e.g., pongamia protein concentrates or isolates) as described herein may be used as direct protein replacement of animal or vegetable proteins in a variety of conventional food and beverage products across multiple categories. Exemplary food categories and use levels are summarized in Table 16 below.

TABLE 16

| Exemplary foods and levels of use | | |
|---|---|---|
| Food Category | Proposed Food-Uses | Pongamia Protein (g)/Serving |
| Bakery Products | Breads, Bagels, Pastries | 2-4 |
| | Cookies and Crackers | 2 |
| | Breakfast Cereal Bars | 3 |
| | Meal replacement nutritional bars | 10-20 |
| Beverages | Fruit Smoothies | 10-16 |
| | Meal replacement beverages | 10-16 |
| | Protein drinks | 20 |
| | Instant shakes | 10 |
| Daily Product Substitutes | Non-dairy cheese | 5 |
| | Non-dairy milk | 8 |
| | Non-dairy coffee whiteners | 1 |
| | Non-dairy yogurt, drinkable yogurts | 6 |
| | Non-dairy Greek yogurt | 15 |
| Desserts | Non-dairy ice cream | 3 |
| | Frozen desserts/yogurt | 3 |
| | Puddings | 4 |
| Egg Substitutes | Egg product analogs | 5 |
| Grain Products and Pasta | Pasta | 10 |
| | Noodles | 10 |
| Meat Substitutes | Meat analogs | 16 |
| | Plant-based meat crumbles, meatballs or burgers | 16 |
| Sauces, Dips, and Condiments | Bean dips and spreads | 3 |
| | Sauces | 2 |
| Snack Foods | Chips, Extruded Snacks, Candy | 2-8 |

Example 7

Plant-Based Milk Beverage

This example describes the preparation of a plant-based milk beverage using a protein-enriched pongamia composition (e.g., pongamia protein concentrates or isolates) as described herein, including the protein compositions obtained in accordance with the methods in Examples 2A-2C above.

A pongamia protein milk is prepared by hydrating a protein-enriched pongamia composition, for example, pongamia protein isolate (70-80 wt % protein) at 5.5-6% by weight (10 g protein per serving), in hot water (e.g., 140-160° F.) for about 15-20 minutes using a high shear mixer. To the hydrated aqueous protein, canal/soybean oil, sugar, thickeners, and flavorings are added and mixed for additional 5-10 minutes. The mixture is then homogenized to form a uniform emulsion, and pasteurized.

Example 8

Plant-Based Yogurt

This example describes the preparation of a plant-based yogurt using a protein-enriched pongamia composition (e.g., pongamia protein concentrates or isolates) as described herein, including the protein compositions obtained in accordance with the methods in Examples 2A-2C above.

A pongamia protein milk is prepared by hydrating a protein-enriched pongamia composition, for example, pongamia protein isolate (70 wt % protein) at 9-10% by weight, in hot water (e.g., 140-160° F.) for about 15-20 minutes using a high shear mixer. To the hydrated aqueous protein, the other optional ingredients such as canola/soybean oil, sugar, thickeners, and flavorings are added and mixed for additional 5-10 minutes. The mixture is then homogenized to a uniform emulsion, pasteurized, and cooled to about 100° F. A vegan yogurt culture is added and fermented for about 6-10 hours. After the yogurt reaches the desired pH range of 4.5, it is stirred and filled into containers and stored refrigerated.

Example 9

Fortified White Bread

This example describes the production of white bread fortified with the protein-enriched pongamia compositions (e.g., pongamia protein concentrates or isolates) as described herein, including the protein compositions obtained in accordance with the methods in Examples 2A-2C above.

Pongamia Protein Concentrate: Two bread doughs are prepared: (1) a control dough with no protein fortification (3 g protein per serving); and (2) a test dough with the protein-enriched pongamia composition (6 g protein per serving). In the test dough, at least a portion (20 wt %) of wheat flour is replaced with the protein-enriched pongamia composition (e.g., concentrate). The other optional ingredients in the formulation include salt, sugar, yeast, oil, butter, non-fat dry milk and water. The doughs are mixed, weighed, formed, placed in pans, proofed, and baked at about 420° F. for about 25-30 minutes. The breads are then evaluated. The loaf volume, texture, and taste of the control and fortified bread are evaluated.

Pongamia Protein Isolate: Two bread doughs are prepared: (a) control—no protein added (b) protein enriched with pongamia protein. In the protein enriched formulation, wheat flour is replaced by 10 wt % with protein-enriched pongamia composition (pongamia protein isolate, about 70-80 wt % protein). The optional ingredients include sugar, salt, butter, yeast and water. The ingredients are mixed into a dough, weighed, formed and placed in baking pans, proofed, and baked at about 42.0° F. for about 25-30 minutes.

Example 10

Fortified Crackers

This example describes the production of crackers fortified with protein-enriched pongamia compositions (e.g., pongamia protein concentrates or isolates) as described herein, including the protein compositions obtained in accordance with the methods in Examples 2A-2C above.

Two cracker doughs are prepared: (1) a control dough with no protein fortification (3 g protein per serving); and (2) a test dough with the protein-enriched pongamia composition (5 g protein per serving). In the test dough, a portion (20%) of wheat flour is replaced with the protein-enriched pongamia composition (e.g., pongamia protein concentrate, about 50 wt % protein). The other optional ingredients in the formulation include salt, sugar, sesame seeds, oil, leavening agent (e.g., sodium bicarbonate) and water. The doughs are prepared, sheeted to desired thickness (~1.5 mm), cut into desired shapes, and baked. The texture and taste of the control and fortified crackers are evaluated.

Wheat Cracker with Added Pongamia Protein or Soy Protein

Three cracker doughs were prepared: (A) a control dough with no protein fortification (2.1 g protein per serving); (B) a test dough with the protein-enriched pongamia composition (4.9 g protein per serving, with 2.9 g protein from the pongamia protein isolate); and (C) a test dough with enriched with soy protein (2.7 g protein from the soy protein). The control dough was prepared using whole wheat and all-purpose flour in 50:50 blend. In the test dough (B) using pongamia protein isolate, the whole wheat/all-purpose flour blend was replaced with the pongamia protein isolate at 8.7%; in the test dough (C) using soy protein enrichment, the whole wheat flour/all-purpose flour was replaced with the soy protein isolate at 7.4%. The other ingredients in the formulations included salt, sugar, malt barley, canola oil, cornstarch, baking soda and water. Additional water was added to the two test doughs to achieve a similar texture to the control dough; all other ingredients excepting flour were kept constant across the control and test doughs. The doughs were prepared, sheeted to desired thickness 1.5 mm), cut into 1.5-inch squares, and baked. The texture and taste of the control and fortified crackers were evaluated. Table 17 below shows the sensory evaluation summary.

The fortified cracker containing pongamia protein had a darker color and stronger whole wheat flavor than the control cracker.

TABLE 17

| Sensory Evaluation | | | |
|---|---|---|---|
| | Sample | | |
| Variable | A - Control wheat cracker | B - Pongamia protein-fortified wheat cracker | C - Soy protein-fortified wheat cracker |
| Color/Appearance | Light tan cracker with dark brown, whole wheat particulates throughout | Darker brown, more monochromatic than control, without whole wheat particulates showing through | Slightly more golden brown with lighter background with whole wheat particulates showing through |
| Aroma | Mild wheat baked cracker aroma | Whole grain aroma more prominent, similar to graham cracker | Wheat aroma slightly stronger than in control |
| Flavor | Mild neutral wheat flavor with sweetness and salt in the finish | Heavier whole grain flavor with sweetness in the finish. flavor similar to graham cracker | Mild neutral wheat flavor with more sweetness in the middle and finish; comparable to control |
| Texture | Crisp even texture throughout. Cracker has a more tender bite than the protein options. | Harder bite and crispness than the control. 'fire bite is slightly harder and dense than the soy option. | Harder bite and crispness than the control. |
| Overall Acceptability | Control | Somewhat acceptable | Acceptable |

Example 11

Plant-Based Ready to Drink Protein Beverage

This example describes the preparation of a plant-based ready to drink (RTD) chocolate protein beverage using a protein-enriched pongamia composition (e.g., pongamia protein isolate) as described herein, including the protein compositions obtained in accordance with the methods in Example 2A-2C above.

Three ready to drink chocolate beverages—(A) with 16 g/serving of pongamia protein, (B) with 20 g/serving of pongamia protein; and (C) with 20 g/serving of pea protein were prepared. First, cocoa was hydrated in hot water, separately. Pongamia protein along with dipotassium phosphate was hydrated in warm water for 15 minutes. To the hydrated aqueous protein, hydrated cocoa, sunflower oil, lecithin, sugar, natural sweeteners, thickeners, and flavorings are added and mixed for additional 5 minutes. The mixture is then homogenized to form a uniform emulsion, pasteurized, and filled into bottles and stored at refrigerated temperature for further evaluation.

The beverages were evaluated for the following characteristics: visual appearance (including color, physical appearance, stability), aroma, texture and mouthfeel (including creamy, smooth, gritty, chalky, thick, thin), flavor and taste (including sweetness, salty, aftertaste, off-notes) and overall liking (acceptable/not acceptable). Table 18 below shows the summary of the sensory evaluation. The two pongamia protein beverages were more preferred over pea protein beverage.

TABLE 18

| Sensory Evaluation Summary - Ready to Drink Chocolate Protein Beverage | | | | | |
|---|---|---|---|---|---|
| | Variable | | | | |
| Sample | Color/ Appearance | Aroma | Texture | Taste | Overall Liking |
| A -16 g Pongamia protein/ serving | Dark brown Foamy, Cocoa settled to bottom | Dark chocolate aroma | Thin, Lacks body | Less sweet, Rich chocolate taste, Slight bitterness at the end | Acceptable. |
| B-20 g Pongamia protein/ serving | Dark brown Foamy, Cocoa settled to bottom | Dark chocolate aroma | Creamier than 16 g pongamia sample. Thin texture | Rich chocolate taste. Balanced sweetness, Less bitterness, No off notes | Acceptable |

TABLE 18-continued

Sensory Evaluation Summary - Ready to Drink Chocolate Protein Beverage

| Sample | Variable | | | | |
|---|---|---|---|---|---|
| | Color/ Appearance | Aroma | Texture | Taste | Overall Liking |
| C- 20 g Pea protein/ serving | Light brown/Milk chocolate type No cocoa settling observed. | Milk chocolate Aroma | Slightly creamy than 16 g pongamia sample Chalky | Unbalanced sweet and salty taste, Slightly rancid, Pea and bitter afternotes | Not acceptable (too salty/off flavors) |

Example 12

Protein Powdered Drink Mix

This example describes the preparation of a powdered chocolate protein drink mix using a protein-enriched pongamia composition (e.g., pongamia protein isolate) as described herein, including the protein compositions obtained in accordance with the methods in Examples 2A-2C above.

This example describes the preparation of a powdered chocolate protein drink mix using a protein-enriched pongamia composition (e.g., pongamia protein isolate) as described herein, including the protein compositions obtained in accordance with the methods in Examples 2A-2C above.

Two chocolate protein powdered mixes—(1) 15 g of pongamia protein and (2) 15 g of pea protein, per serving were prepared. The other ingredients include cocoa, sugar, natural sweetener, salt, and flavorings. All the ingredients were added to blender and mixed for 10 minutes, until all ingredients were uniformly mixed. The product was packaged in metallized pouch for further use. The powdered products were mixed with 12 fl. oz. of water and evaluated for sensory. The reconstituted pongamia protein and pea protein drinks were evaluated for the following characteristics: visual appearance (including color, physical appearance, and stability), aroma, texture and mouthfeel (including creamy, smooth, gritty, chalky, thick, and thin), flavor and taste (including sweetness, salty, aftertaste, and off-notes) and overall liking (acceptable/not acceptable). Table 19 below shows the summary of the sensory evaluation. The pongamia chocolate powder was more preferred over the chocolate pea protein powder.

TABLE 19

Sensory Evaluation Summary - Chocolate Protein Drink Mix (Reconstituted)

| Sample | Variable | | | | |
|---|---|---|---|---|---|
| | Color/ Appearance | Aroma | Texture | Taste | Overall Liking |
| Pongamia Protein (15 g protein/ 12 fl. oz serving) | Dark brown Dark chocolate Significant foam after mixing | Dark chocolate aroma with faint vanilla | Creamier titan pea protein sample, Thick and aerated | Mild chocolate flavor upfront, Less sweet, Slight bitterness, No protein after taste | Acceptable |

TABLE 19-continued

Sensory Evaluation Summary - Chocolate Protein Drink Mix (Reconstituted)

| Sample | Variable | | | | |
|---|---|---|---|---|---|
| | Color/ Appearance | Aroma | Texture | Taste | Overall Liking |
| Control - Pea (15 g protein/ 12 fl. oz serving) | Light brown, Milk chocolate, Product Settles fast, Small amount of foam after mixing | Typical milk chocolate aroma, Pea aroma | Watery and thin, Slightly chalky | Strong cocoa flavor Strong pea taste Less sweet, Slight bitterness | Moderately acceptable |

The term "about" as used herein refers to the usual error range for the respective value readily known to the skilled person in this technical field. Reference to "about" a value or parameter herein includes (and describes) embodiments that are directed to that value or parameter per se. For example, "about x" includes and describes "x" per se. In some embodiments, the term "about" when used in association with a measurement, or used to modify a value, a unit, a constant, or a range of values, refers to variations of +/−5% of the stated value or parameter.

Reference to "between" two values or parameters herein includes (and describes) embodiments that include those two values or parameters per se. For example, description referring to "between x and y" includes description of "x" and "y" per se.

What is claimed is:

1. A method of producing a protein-enriched pongamia composition, comprising:

preparing an aqueous slurry of pongamia meal, wherein the pongamia meal is defatted and debittered and has (i) less than 500 ppm of karanjin; or (ii) less than 500 ppm of pongamol; or (iii) less than 500 ppm of karanjin and pongamol combined;

adjusting the pH of the aqueous slurry to a pH between 6 and 10;

separating the slurry into a protein liquid fraction and an insoluble wet cake fraction;

neutralizing, concentrating and/or pasteurizing the protein liquid fraction; and drying the protein liquid fraction to provide a protein-enriched pongamia composition.

2. The method of claim 1, wherein the protein-enriched pongamia composition comprises at least 50% of pongamia proteins on a dry weight basis.

3. A method of producing a protein-enriched pongamia ingredient, comprising:

preparing an aqueous slurry of pongamia meal, wherein the pongamia meal is defatted and debittered and has (i) less than 500 ppm of karanjin; or (ii) less than 500 ppm of pongamol; or (iii) less than 500 ppm of karanjin and pongamol combined;

adjusting the pH of the aqueous slurry to a pH between 6 and 10, separating the slurry into a protein liquid fraction and an insoluble wet cake fraction;

precipitating at least a portion of pongamia protein from the protein liquid fraction to obtain purified pongamia protein solids;

neutralizing and pasteurizing the purified pongamia protein solids; and drying the purified pongamia protein solids to provide a protein-enriched pongamia ingredient.

4. The method of claim 3, wherein the protein-enriched pongamia ingredient comprises at least 70% of pongamia proteins on a dry weight basis.

5. A method of producing a protein-enriched pongamia ingredient, comprising:

preparing an aqueous slurry of pongamia meal;

adjusting the pH of the aqueous slurry to a pH between 6 and 10, separating the slurry into a protein liquid fraction and an insoluble wet cake fraction;

passing the protein liquid fraction through a membrane system to obtain a retentate comprising pongamia protein;

optionally washing, neutralizing and/or pasteurizing the retentate; and drying the retentate to provide a protein-enriched pongamia ingredient, wherein the protein-enriched pongamia ingredient comprises at least 70% of pongamia proteins on a dry weight basis.

* * * * *